(12) United States Patent
Futa et al.

(10) Patent No.: US 7,486,789 B2
(45) Date of Patent: Feb. 3, 2009

(54) DEVICE AND METHOD FOR CALCULATION ON ELLIPTIC CURVE

(75) Inventors: Yuichi Futa, Osaka (JP); Motoji Ohmori, Hirakata (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 10/314,316

(22) Filed: Dec. 9, 2002

(65) Prior Publication Data
US 2003/0142820 A1 Jul. 31, 2003

(30) Foreign Application Priority Data

Jan. 28, 2002 (JP) ............................. 2002-019071
Mar. 29, 2002 (JP) ............................. 2002-094081

(51) Int. Cl.
*H04K 1/00* (2006.01)
*H04L 9/30* (2006.01)
*G06F 7/52* (2006.01)
*H04L 9/00* (2006.01)
*G06F 7/38* (2006.01)

(52) U.S. Cl. ........................... 380/30; 380/28; 708/490; 708/650; 713/174; 713/180

(58) Field of Classification Search ........................ None
See application file for complete search history.

(56) References Cited

U.S. PATENT DOCUMENTS 6,035,041 A * 3/2000 Frankel et al. ................ 380/30

(Continued)

FOREIGN PATENT DOCUMENTS

JP  11-102158  4/1999

(Continued)

OTHER PUBLICATIONS

Wu, Huapeng. "Montgomery Multiplier and Squarer For A Class of Finite Fields". May 2002. Relevant pp. 521-529. IEEE Transactions on Computers, vol. 51, Issue 5. Found on the World Wide Web at: http://ieeexplore.ieee.org/iel5/12/21690/01004591.pdf?tp=&isnumber=21690&arnumber=1004591&punumber=12.*

(Continued)

*Primary Examiner*—Christopher A Revak
*Assistant Examiner*—Jeremiah Avery
(74) *Attorney, Agent, or Firm*—Wenderoth, Lind & Ponack, L.L.P.

(57) ABSTRACT

In scalar multiplication method using a Montgomery-type elliptic curve, a high-speed elliptic curve calculation device effectively uses a table that stores coordinates of certain scalar multiple points like points multiplied by exponentiation of two to a certain point G and so forth. The elliptic curve calculation device receives an arbitrary integer k of n bits and outputs scalar-multiplied points against a point G on a Montgomery-type elliptic curve E on a finite field F that is given in advance. The elliptic curve calculation device includes a calculation procedure generation unit that generates a calculation procedure that addition on the elliptic curve E with either of $G, 2*G, 2^2*G, \ldots, 2^{n-1}*G$ as the first addition element is repeated and a scalar multiplication unit that calculates the scalar-multiplied points $k*G$ by repeating addition on the elliptic curve E, referring to a table memorizing unit that stores values (coordinates) of exponentiation of two against the point G and complying with the generated calculation procedure.

20 Claims, 33 Drawing Sheets

U.S. PATENT DOCUMENTS

| | | | |
|---|---|---|---|
| 6,088,453 A * | 7/2000 | Shimbo | 380/28 |
| 6,263,081 B1 | 7/2001 | Miyaji et al. | |
| 6,466,668 B1 * | 10/2002 | Miyazaki et al. | 380/30 |
| 6,480,606 B1 * | 11/2002 | Kurumatani | 380/30 |
| 6,666,381 B1 * | 12/2003 | Kaminaga et al. | 235/492 |
| 6,721,771 B1 * | 4/2004 | Chang | 708/492 |
| 6,738,478 B1 * | 5/2004 | Vanstone et al. | 380/28 |
| 6,748,410 B1 * | 6/2004 | Gressel et al. | 708/491 |
| 6,772,184 B2 * | 8/2004 | Chang | 708/491 |
| 6,816,594 B1 * | 11/2004 | Okeya | 380/59 |
| 2003/0156714 A1 | 8/2003 | Okeya | |

FOREIGN PATENT DOCUMENTS

| | | |
|---|---|---|
| JP | 2002-207424 | 7/2002 |

OTHER PUBLICATIONS

Bednara, M. Daldrup, M. Teich, J. von zur Gathen, J. Shokrollahi, J. "Tradeoff Analysis of FPGA Based Elliptic Curve Cryptography". May 2002. Relevant pp. 797-800. IEEE ISCAS, 2002. vol. 5. Found on the World Wide Web at: http://ieeexplore.ieee.org/iel5/7897/21767/01010824.pdf?tp=&isnumber=21767&arnumber=1010824&punumber=7897.*

D. Hankerson, et al., entitled "*Software Implementation of Elliptic Curve Cryptography Over Binary Fields*", Cryptographic Hardware and Embedded Systems. 2nd International Workshop, Ches 2000, Worchester, MA, Aug. 17-18, 2000 Proceedings, Lecture Notes in Computer Science, Berlin: Springer, DE, vol. 1965, Aug. 17, 2000, pp. 1-24, XP001049125.

T. Hasegawa, et al., entitled "*A Practical Implementation of Elliptic Curve Cryptosystems Over GF (P) on a 16-Bit Microcomputer*", Public Key Cryptography. International Workshop on Practice and Theory in Public Key Cryptography, Feb. 5, 1999, pp. 182-194, XP000998747.

P.L. Montgomery, "*Speeding the Pollard and Elliptic Curve Methods of Factorization*", Math. of Comp. vol. 48, No. 177, pp. 243-264, 1987.

Efficient Exponentiation on Montgomery-Type Elliptic Curves, Proceedings of the 2002 Symposium on Cryptography and Information Security, vol. I of II, p. 515-519, Jan. 29, 2002.

On the Power of Multidoubling in Speeding Up Elliptic Scalar Multiplication, Lecture Notes on Computer Science, vol. 2259, p. 268-283, 2001.

Two Algorithms for Modular Exponentiation Using Nonstandard Arithmetics, The Institue of Electronics Information and Communication Engineers, vol. 93, No. 525, p. 11-17, Mar. 18, 1994, CSDB No. 1999-00644-002.

European Office Action mailed Dec. 21, 2007 for European Application No. 02 026 894.2-1243.

K. Okeya and K. Sakurai, "Efficient Elliptic Curve Cryptosystems from a Scalar Multiplication Algorithm with Recovery of the y-Coordinate on a Montgomery-Form Elliptic Curve", CHES 2001, Third International Workshop Proceedings, May 14-16, 2001, Paris, France, pp. 126-141.

Y. Tsuruoka and K. Koyama, "Fast Computation Over Elliptic Curves $E(Fq^n)$ Based on Optimal Additional Sequences", IEICE Transactions on Fundamentals of Electronics, Communications and Computer Sciences, Engineering Sciences Society, Tokyo, Japan, vol. E84-A, No. 1, Jan. 2001, pp. 114-119.

Okeya et al., "A Scalar Multiplication Algorithm on a Montgomery-form Elliptic Curve", The 2001 Symposium on Cryptography and Information Security, vol. I of II, p. 305-310, Osio, Japan, Jan. 23-26, 2001 w/ English Abstract.

Futa et al. "Efficient exponentiation on Montgomery-type elliptic Curves", The 2002 Symposium on Cryptography and Information Security, Jan. 29 - Feb. 1, 2002 w/ English Abstract.

Futa et al. "Efficient exponentiation on Montgomery-type elliptic Curves (2)", The Institute of Electronics Information and Communication Engineers, vol. 102, No. 212, p. 123-129, Jul. 12, 2002 w/ English Abstract.

Futa et al. "Efficient exponentiation on Montgomery-type elliptic Curves (2)", IPSJ SIG Notes, vol. 2002, No. 68, p. 267-273, Jul. 18, 2002 w/ English Abstract.

* cited by examiner

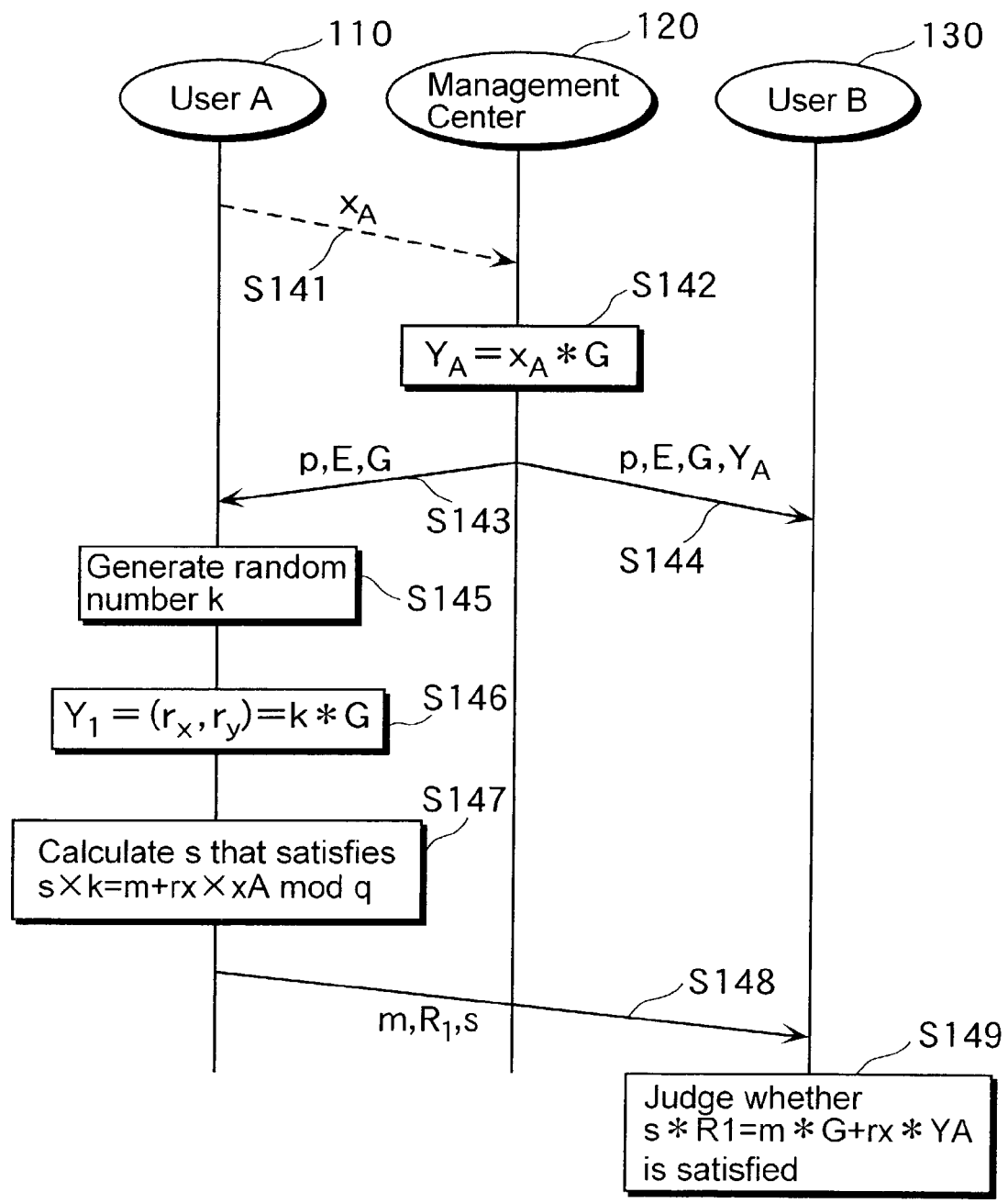

Fig. 2

[Concrete example] Calculation of 87*G $2*G \xrightarrow{(1)} G$
$\downarrow①$
$2*G$
$3*G \xrightarrow{(2)}$
$\downarrow②$
$5*G$
$6*G$
$10*G \xrightarrow{(3)}$
$\downarrow③$
$11*G$
$21*G \xrightarrow{(4)}$
$\downarrow④$
$22*G$
$43*G$
$44*G \xrightarrow{(5)}$
$\downarrow⑤$
$\downarrow⑥$
$87*G$ Calculate in consequence from coordinates of right points →

[Calculation quantity]

Addition: 6 times, Double calculation: 5 times (Only x coordinates)

Fig. 8

Approach 2

[Guideline for dividing coefficients] Calculation of $(2^n+c)*G$

① In case of $c \leq 2^{n-1}$: Plus representation $(2^n+c)*G = (2^{n-1}+c)*G + 2^{n-1}*G$ ⇒ is calculated from $(2^{n-1}+c)*G$ and $2^{n-1}*G$ $2^n+c$
↙ ↓ ↘
$2^{n-1}$  $2^{n-1}$  $c(=(2^{n-1}+c)-2^{n-1})$ ② In case of $c > 2^{n-1}$: Minus representation $(2^n+c)*G = (2^{n+1}-(2^n-c))*G$
$= (2^{n+1}-d)*G$  $(d=2^n-c)$ ⇒ is calculated from $2^n*G$ and $(2^n-d)*G$ $2^{n+1}-d$
↙ ↓ ↘
$2^n$  $2^n-d$  $d(=2^n-(2^n-d))$

[Concrete example] Calculation of $87*G$    Division of coefficients →

$87 = 2^6 + 23$
↙ ↓
$2^5+23=2^6-9$
↙ ↓
$2^5$   $23(=2^4+7)$ $2^5-9=2^4+7$
↓ ↘
$2^4$   $-(2^4-9)$
         $23=2^5-9$ $2^3+7=2^4-1$
↙ ↓
$2^3$  $7(=2^3-1)$ $2^3-1=2^2+1$
↙ ↓
$2^2$  $1$ $2^2-1=2+1$
↙ ↓
$2$  $1$
$1$

← Elliptic curve addition

Fig. 9
Comparison with Prior Art
[Prior Art]
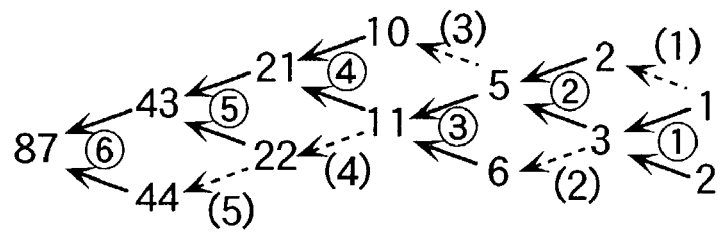
Addition: 6 times, Double calculation: 5 times
→Calculation quantity: 50.6M
[Present embodiment]
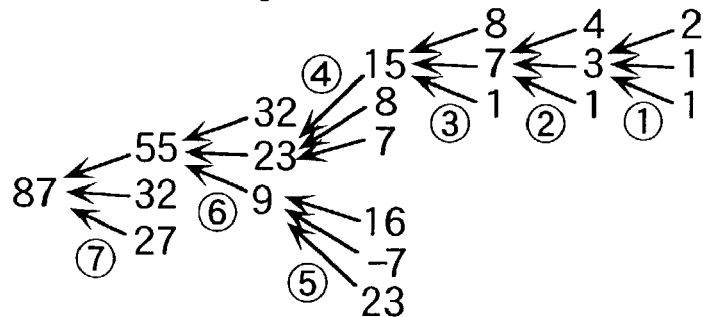
Addition: 7 times
→Calculation quantity: 39.2M (1.3 times faster)

Fig. 13

[Guideline for dividing coefficients]
When representation of bit is (10...), plus representation
When representation of bit is (11...), minus representation

[Concrete example] Calculation of 102*G $102 = 2^6 + 38 = 2^7 - 2^6$
(1100110)

Minus: $2^6$ $2^6 - 2^6 = 2^5 + 6$
(100110)

Plus: $2^5$, $-6$, $2^5 + 6$ $2^4 + 6$
(10110)

Plus: $2^3$, $2^3$, $2^4$, 6

$2^3 + 6 = 2^4 - 2$
(1110)

Minus: $2^3$, $2^3 - 2$
(110)

2

$2^2 - 2 = 2$
(110)

Minus: $2^2$, 2

The difference of two points changes when representation modes are switched
$2^6 \Rightarrow 6$ Execute only in case of change from minus to plus

[Value of generation array] Information about switch of representation modes

S[ ]
- Plus ⇒ Plus · · · 0
- Plus ⇒ Minus · · · 1
- Minus ⇒ Minus · · · 2
- Minus ⇒ Plus · · · 3

(Only x coordinates)

(x coordinates and y coordinates)

DEVICE AND METHOD FOR CALCULATION ON ELLIPTIC CURVE

BACKGROUND OF THE INVENTION (1) Field of the Invention

The present invention relates to a device that performs a calculation on an elliptic curve, and in particular relates to a device that calculates a scalar-multiplied point that is generated by multiplying a scalar against a point on a Montgomery-type elliptic curve.

(2) Description of the Prior Art

1. Public-Key Encryption

Recently, data communication based on computer technology and communication technology has become widely available, and in this data communication, a secret communication mode or a digital signature mode is used. Here, the secret communication mode is a mode to communicate without leaking communication contents to a person other than the other specified party of the communication. Moreover, the digital signature mode is a mode that shows the correctness of communication contents to the other party of the communication and certifies the identity of the originator.

In the secret communication mode or digital signature mode, an encryption mode called a public-key encryption is used. The public-key encryption is a mode to easily manage encryption keys that are different to each of the other parties of communication when the other parties of communication are many, to be an indispensable fundamental technology to communicate with the many other parties of communication. In the secret communication using the public-key encryption, an encryption key and a decryption key are different, and the decryption key is secret while the encryption key is public.

As a base of security of this public-key encryption, a discrete logarithm problem is used. As for the discrete logarithm problem, there are what is defined on a finite field and what is defined on an elliptic curve as representatives. Moreover, the discrete logarithm problem is described in detail in "A Course in Number theory and Cryptography" by Neal Koblitz, Springer-Verlag, 1987.

2. The Discrete Logarithm Problem on an Elliptic Curve

The discrete logarithm problem on an elliptic curve is described below. Here, p is a prime number and an elliptic curve defined on a finite field GF (p) is E. When we think a set that is obtained by adding a formal point O to the whole points both of x coordinates and y coordinates of which belong to GF (p) among the points on E, this set makes a group with the point O as a zero element. The order of an elliptic curve shows the number of the elements in the above-mentioned set. When $G=(gx, gy)$, $-G$ is defined as $-G=(gx,-gy)$.

The discrete logarithm problem on the elliptic curve is such that, in the case that the elliptic curve E is divisible by a large prime number, element G included in the elliptic curve is a base point. In this case, it is a question that in the case that an integer x that satisfies (Equation 1) $Y=x*G$ to an arbitrary element Y included in the elliptic curve exists, seek x.

Here, p is a prime number and GF (p) is a finite field that has p pieces of element. Additionally, within this patent specification, the symbol * shows calculation to add element included in the elliptic curve plural times, $x*G$, as the below-mentioned equation shows, means that element G is added x times.

$$x*G=G+G+G+\ldots+G$$

A point like $x*G$ is called a scalar-multiplied point.

The reason that this makes the discrete logarithm problem a premise of the security of the public-key encryption is that the above-mentioned problem to the finite field that has many elements is extremely difficult.

3. ElGamal Signature that Applies the Discrete Logarithm Problem on the Elliptic Curve Hereafter, the digital signature mode by ElGamal signature that applies discrete logarithm problem on the elliptic curve is explained by using FIG. 1.

This figure is a sequence diagram that shows procedures of the digital signature mode by the above-mentioned ElGamal signature. A user A 110, a management center 120 and a user B 130 are connected by network. Here, p is a prime number and an elliptic curve defined on a finite field GF (p) is E. Assume that a base point of E is G and the order of E is q. In other words, q is the smallest positive integer to satisfy (Equation 2) $q*G=0$.

(1) Generation of the Public Keys by the Management Center 120

The management center 120 generates the public key YA of the user A 110, using the secret key xA of the user A 110 that is notified in advance, and complying with the equation 3 (Step S141~S142). (Equation 3) $YA=xA*G$ Thereafter, the management center 120 releases the prime number p, the elliptic curve E and the base point G to the public as system parameters, and releases the public key YA of the user A 110 to another user B 130 (Step S143~S144).

(2) Generation of a Signature by the User A 110

The user A 110 generates a random number k (Step S145). Then, the user A 110 calculates (Equation 4) $R_1=(rx, ry)=k*G$ (Step S146) and calculates s from (Equation 5) $s\times k=m+rx\times xA \pmod{q}$. Here, m is a message that the user A 110 transmits to the user B 120. Here, × indicates multiplication.

Furthermore, the user A 110 transmits obtained $(R_1, s)$ as a signature with the message m to the user B 130 (Step S148).

(3) The Verification of the Signature by the User B 130

The user B 130 confirms the identity of the user A 110 by judging whether (Equation 6) $s*R_1=m*G+rx*YA$ is satisfied or not (Step S149). This is obvious because $$\begin{aligned}s*R_1 &= \{((m+rx\times xA)/k)\times k\}*G \quad \text{(Equation 7)}\\&= (m+rx\times xA)*G\\&= m*G+(rx\times xA)*G\\&= m*G+rx*YA\end{aligned}$$

satisfies.

4. Addition of Points on the Elliptic Curve and Calculation Quantity by Double Calculation In each generation of the public key, the generation of the signature and the verification of the signature in the digital signature mode that is represented above by ElGamal signature that applies the discrete logarithm problem on the elliptic curve, the calculation of scalar multiplication of points on the elliptic curve is carried out. For example, "$xA*G$" represented in the equation 3, "$k*G$" represented in the equation 4, "$s*R_1$", "$m*G$" and "$rx*YA$" represented in the equation 6 are the calculation of the scalar multiplication of the points on the elliptic curve.

The calculation formula of the elliptic curve is explained in detail in "Efficient elliptic curve exponentiation" (written by Miyaji, Ono, and Cohen, Advances in cryptology-proceedings of ICICS, 97, Lecture notes in computer science, 1997, Springer-Verlag, 282-290).

Hereafter, the calculation formula of the elliptic curve is explained. Here, the equation of the elliptic curve is $y^2=x^3+ax+b$, the coordinates of an arbitrary point P are $(x_1, y_1)$ and the coordinates of an arbitrary point Q are $(x_2, y_2)$. Assume that the coordinates of the point R fixed by R=P+Q are $(x_3, y_3)$.

In the case of P≠Q, R=P+Q becomes the calculation of addition. The formulae of addition are as follows:

$$x_3 = \{(y_2 - y_1)/(x_2 - x_1)\}^2 - x_1 - x_2$$
$$y_3 = \{(y_2 - y_1)/(x_2 - x_1)\}(x_1 - x_3) - y_1$$

In the case of P=Q, R=P+Q=P+P=2×P is satisfied, and R=P+Q becomes a double calculation.

The formulae of double calculation are as follows:

$$x_3 = \{(3x_1^2 + a)/2y_1\}^2 - 2x_1$$
$$y_3 = \{(3x_1^2 + a)/2y_1\}(x_1 - x_3) - y_1$$

Moreover, the above-mentioned calculation is a calculation on the finite field in which elliptic curve is defined. As was represented above, in 2-term coordinates or affine coordinates, namely, the coordinates described until now, in case that addition (hereafter, it is also called "elliptic curve addition") is performed, every one addition on the elliptic curve needs one inverse number calculation. In general, an inverse number calculation needs about 10 times the calculation quantity as compared with a multiplication on a finite field.

Then, to reduce the calculation quantity, 3-term coordinates called projection coordinates are used. Projection coordinates are coordinates comprising three terms X, Y, Z, in relation to the coordinate (X, Y, Z) and the coordinate (X', Y', Z'), a given number n exists and there is a relationship X'=n X, Y'=n Y, Z'=n Z that is satisfied, and (X, Y, Z)=(X', Y', Z') that is satisfied.

An affine coordinate (x, y) and a projection coordinate (X, Y, Z) correspond to each other in the below-mentioned relationship.

(x,y)→(x,y,1)

(X,Y,Z)→(X/Y,Y/Z) (in the case of Z≠0)

Here, the symbol → is used with the below-mentioned meaning. When an element $P_1$ corresponds to one element in an element $P_2$, the relationship is represented by $P_1 \rightarrow P_2$. A zero element O can be represented in the projection coordinates and O=(0, 1, 0).

Hereafter, all the calculations of the elliptic curve are in the projection coordinates. Next, the addition formulae and the double calculation formulae on the projection coordinates are explained. These formulae have, of course, consistency with the addition formulae and the double calculation formulae in the affine coordinates. Exponentiation (scalar multiplication of a point on an elliptic curve) is realized by the repeated calculation of the addition and the double calculation on the elliptic curve. Out of these calculations of scalar multiplication, the calculation quantity of addition does not depend on the parameters of the elliptic curve, but the calculation quantity of the double calculation depends on the parameters of the elliptic curve.

Here, p is a prime number of 160 bits and the elliptic curve is E: $y^2=x^3+ax+b$, and when the elements P, Q on the elliptic curve are represented by $P=(X_1, Y_1, Z_1)$ and $Q=(X_2, Y_2, Z_2)$, $R=(X_3, Y_3, Z_3)=P+Q$ is obtained as follows:

(i) in the case of P≠Q

In this case, it is a calculation of an addition.

(Step 1-1) The Calculation of an Intermediate Value

The below-mentioned equations are calculated.

$$U_1 = X_1 \times Z_2^2 \qquad \text{(Equation 8)}$$

$$U_2 = X_2 \times Z_1^2 \qquad \text{(Equation 9)}$$

$$S_1 = Y_1 \times Z_2^3 \qquad \text{(Equation 10)}$$

$$S_2 = Y_2 \times Z_1^3 \qquad \text{(Equation 11)}$$

$$H = U_2 - U_1 \qquad \text{(Equation 12)}$$

$$r = S_2 - S_1 \qquad \text{(Equation 13)}$$

(Step 1-2) The calculation of $R=(X_3, Y_3, Z_3)$

The below-mentioned equations are calculated.

$$X_3 = -H^3 - 2 \times U_1 \times H^2 + r^2 \qquad \text{(Equation 14)}$$

$$Y_3 = -S_1 \times H^3 + r \times (U_1 \times H^2 - X_3) \qquad \text{(Equation 15)}$$

$$Z_3 = Z_1 \times Z_2 \times H \qquad \text{(Equation 16)}$$

(ii) in the case of P=Q (namely, R=2P)

In this case, it is a calculation of double calculation.

(Step 2-1) The calculation of an intermediate value

The below-mentioned equations are calculated.

$$S = 4 \times X_1 \times Y_1^2 \qquad \text{(Equation 17)}$$

$$M = 3 \times X_1^2 + a \times Z_1^4 \qquad \text{(Equation 18)}$$

$$T = -2 \times S + M^2 \qquad \text{(Equation 19)}$$

(Step 2-2) The calculation of $R=(X_3, Y_3, Z_3)$

The below-mentioned equations are calculated.

$$X_3 = T \qquad \text{(Equation 20)}$$

$$Y_3 = -8 \times Y_1^4 + M \times (S-T) \qquad \text{(Equation 21)}$$

$$Z_3 = 2 \times Y_1 \times Z_1 \qquad \text{(Equation 22)}$$

Next, the calculation quantity in the case of the addition and the double calculation of the elliptic curve are explained. Here, the calculation quantity by one multiplication is represented by 1Mul, and the calculation quantity by one square multiplication is represented by 1Sq. Moreover, in an ordinary microprocessor, 1Sq ≈0.8Mul is satisfied.

According to the above-mentioned examples, the calculation quantity of the addition on the elliptic curve represented in the case of P≠Q is obtained by counting the numbers of the multiplication and the square multiplication in the equations 8~16 and is 12Mul+4Sq. This is obvious because the calculation quantities of the addition in the equations 8, 9, 10, 11, 14, 15 and 16 are 1Mul+1Sq, 1Mul+1Sq, 2Mul, 2Mul, 2Mul+2Sq, 2Mul and 2Mul, respectively.

Additionally, according to the above-mentioned examples, the calculation quantity of the double calculation on the elliptic curve represented in the case of P=Q is obtained by counting the numbers of the multiplication and the square multiplication in the equations 17~22 and 4Mul+6Sq. This is obvious because the calculation quantities of the square multiplication in the equations 17, 18, 19, 21 and 22 are 1Mul+ 1Sq, 1Mul+3Sq, 1Sq, 1Mul+1Sq and 1Mul, respectively.

Moreover, in the above-mentioned counting of the number, for example, since the equation 14$H^3$ can be unfolded to $H^3 = H^2 \times H$, the calculation quantity of $H^3$ is assumed to be 1Mul+1Sq, and since the equation 18 $Z_1^4$ can be unfolded to $Z_1^4 = (Z_1^2)^2$, the calculation quantity of $Z_1^4$ is assumed to be 2Sq.

Moreover, as for the equation 14$H^2_1$ in the above-mentioned process of calculating $H^3$, $H^2$ is calculated, and therefore the calculation quantity of $H^2$ is not counted again. Additionally, at the time of counting the number of multiplication, the number of multiplication that is carried out by multiplying a certain value by a small value is not counted. Hereafter, the reason is explained. The small values mentioned here are, in the equations 8~22, the small fixed values that are objects for multiplication and, to be more specific, are the values such as 2, 3, 4, 8 and so forth. These values can be represented in binary with 4 bits at most. On the other hand, the other variable numbers have the value of 160 bits ordinarily.

Generally, in a microprocessor, the multiplication of the multiplier and the multiplicand is carried out by the repetition of the shift of the multiplicand and addition. In other words, for each bit of the multiplier represented in binary, in the case that this bit is 1, in order that the least significant bit of the multiplicand represented in binary matches the position where this bit exists, by shifting the multiplicand, one bit string is obtained. In relation to all the bits of the multiplier, all of at least one bit string obtained by this means are added.

For example, in the multiplication of the multiplier of 160 bits and the multiplicand of 160 bits, the multiplicand of 160 bits is shifted 160 times, 160 bit strings are obtained and the obtained 160 bit strings are added. On the other hand, in the multiplication of the multiplier of 4 bits and the multiplicand of 160 bits, the multiplicand of 160 bits is shifted for 4 times, 4 bit strings are obtained and the obtained 4 bit strings are added.

Since the multiplication is carried out as is represented above, in the case that the multiplication is carried out by multiplying a certain value by a small value, the number of the above-mentioned repetition becomes small. Accordingly, the calculation quantity can be regarded as small, and therefore, it is not counted as the number of the multiplication. As is explained above, in the case of carrying out the double calculation of the elliptic curve, the equation 18 includes the parameter a of the elliptic curve. As the value of this parameter a, for example, when a small value is adopted, the calculation quantity of the double calculation on the elliptic curve can be reduced by 1Mul and becomes 3Mul+6Sq. Moreover, as for the addition, even though the parameter of the elliptic curve is changed, the calculation quantity does not change.

The scalar multiplication on the elliptic curve is carried out as follows.

(Prior Art 1)

Suppose p is a prime number of 160 bits, an elliptic curve on the finite field GF (p) is E, and an arbitrary element on E (GF (p)) is G. Calculate k*G based on these parameters. Here, let binary representation be $$k = k[159] \times 2^{159} + \ldots + k[2], \times 2^2 + k[1] \times 2 + k[0]$$

$$= [k[159], \ldots, k[2], k[1], k[0]] \ (k[0], \ldots, k[159] = 0 \text{ or } 1)$$

Step 1: Suppose c=159 and S=0.

Step 2: When k[c]=1, suppose S←S+G.

Step 3: Suppose c←c−1.

Step 4: When c<0, output S and finish. Other than that, suppose S←S+S and return to Step 2.

Suppose the probability of k[c]=1 is ½, let one elliptic curve addition be EAdd, one elliptic curve double calculation EDob, the above-mentioned calculation quantity is 80×EAdd+160×EDob. Generally, when p and k are a prime number of n bits and an integer of n bits respectively, the calculation quantity is 1/2×n×EAdd+n×EDob.

In the above-mentioned scalar multiplication, in the case of calculating $(2^i)*G (i=1, 2, \ldots, 159)$ in advance and of storing the result in a table, calculation is possible as follows.

(Prior Art 2)

Suppose p is a prime number of 160 bits, an elliptic curve on the finite field GF (p) is E and an arbitrary element on E (GF (p)) is G. Additionally, suppose the coordinate of $(2^i)*G$ (i=1, 2, ..., 159) is calculated in advance. At this time, calculate k*G based on these parameters.

Step 1: Suppose c=159 and S=O.

Step 2: When k[c]=1, suppose S←S+$2^c$*G.

Step 3: Suppose c←c−1.

Step 4: In the case of c<0, output S and finish. Other than that, return to Step 2.

In the above-mentioned method, since an elliptic curve addition is not performed, the calculation quantity is 80×EAdd.

Generally, when p and k are a prime number of n bits and an integer of n bits respectively, the calculation quantity is ½×n×EDob. Like this, since the calculation of $(2^i)*G$ is performed in advance, the calculation quantity can be reduced. The prior Art 1 can be used in the scalar multiplication of the base point G of the elliptic curve in 3. Elgamal signature is used because the base point G is a system parameter.

5. A Montgomery-Type Elliptic Curve

The above-mentioned elliptic curve is only the elliptic curve whose equation is $y^2 = x^3 + a \times x + b$. This elliptic curve is called a Weierstrass-type. On the other hand, an elliptic curve whose equation is Em: $B \times y^2 = x^3 + A \times x^2 + x$ is called a Montgomery-type elliptic curve. Take a point G on this elliptic curve Em, when it is point multiplied by $n_1$ and it is point multiplied by $n_2$, represented respectively by $n_1*G = (X_1, Y_1, Z_1)$, $n_2*G = (X_2, Y_2, Z_2)$ and $(n_1 - n_2)*G = (X_3', Y_3', Z_3')$, seek $$(n_1+n_2)*G = (X_3, Y_3, Z_3) = n_1*G + n_2*G$$

as follows.

(i) In the case of n1≠n2 (addition)

(Step 1-1) Calculation of Intermediate Value $$U_1 = X_1 + Z_1$$

$$U_2 = X_2 + Z_2$$

$$V_1 = X_1 - Z_1$$

$$V_2 = X_2 - Z_2$$

(Step 1-2) Calculation of $(n_1+n_2)*G = (X_3, Y_3, Z_3)$ $$X_3 = Z_3' \times (V_1 \times U_2 + U_1 \times V_2)^2$$

$$Z_3 = X_3' \times (V_1 \times U_2 - U_1 \times V_2)^2$$

(ii) In the case of $n_1=n_2$ (double calculation)

(Step 2-2) Calculation of Intermediate Value $$U_1=Z_1+Z_1$$

$$V_1=X_1-Z_1$$

(Step 2-2) Calculation of $(n_1+n_2)*G=(X_3, Y_3, Z_3)$ $$X_3=V_1^2 \times U_1^2$$

$$Z_3=(4 \times X_1 \times Z_1) \times (V_1^2+(A+2)/4 \times (4 \times X_1 \times Z_1))$$

When "$(A+2)/4$" of Step 2-2 is ignored because it is calculable in advance, the calculation quantity is 4×Mul+2×Sq (In the case of $Z_3'=1$, 3×Mul+2×Sq) for addition and 3×Mul+2×Sq for double calculation, respectively. As is stated in 4, the calculation quantity for addition and double calculation of a point on a Weierstrass-type elliptic curve is 12×Mul+4×Sq and 4×Mul+6×Sq, respectively. Consequently, addition and double calculation of the point on a Montgomery-type elliptic curve is faster. Moreover, (−1) multiplication of $(X_1, Y_1, X_1)$ is also $(X_1, -Y_1, Z_1)$ on a Montgomery-type elliptic curve. Additionally, on a Montgomery-type elliptic curve, y coordinate cannot be obtained. A Montgomery-type elliptic curve is described in detail in "Speeding the Pollard and Elliptic Curve Methods of Factorization" (written by P. L. Montgomery, Math. of Comp. 48, 1987, pp. 243-264).

As is described above, a Montgomery-type elliptic curve can perform speed-up calculation. But in addition of $n_1*G$ to $2*G$, since a coordinate of $(n_1-n_2)*G$ is required, in scalar multiplication, it is impossible to perform binary unfold on a Montgomery-type elliptic curve like on a Weierstrass-type elliptic curve. For example, in the case of calculating 5*G, since 5=2×2+1, after 2*G is calculated, 2*(2*G)=4*G is calculated and further (4*G)+G is calculated. Whereas, in addition of (2*2*G) to G, the difference between these points, namely, (2×2−1)*G=3*G must be obtained. Consequently, the scalar multiplication method like Prior Art 1 cannot be used.

Therefore, the calculation is performed as follows.

(Prior Art 3)

Let p be a prime number of n bits, E be a Montgomery-type elliptic curve on GF (p) and G be an element of E (GF (p)). Calculate k*G as $k=2^{n-1}+K[1] \times 2^{n-2}+ \ldots +K[n-2] \times 2+k[n-1]$.

Define S[i] and T[i] as follows.

$$S[i]=(2^i+k[1] \times 2^{i-1}+ \ldots +k[i-1] \times 2+k[i])*G$$

$$T[i]=S[i]+G$$

Step 1: Suppose i=1 and S[0]=G.

Step 2: Calculate T[0]=2*G.

Step 3: Judge whether k[i+1]=0 or not, and in the case of k[i+1]=0, do as follows.

$$S[i+1]=2*S[i]$$

$$T[i+1]=S[i]+T[i]$$

Other than that, calculate as follows.

$$S[i+1]=S[i]+T[i]$$

$$T[i+1]=2*T[i]$$

Step 4: Suppose i←i+1

Step 5: Judge whether i>n−1 or not, and in the case of i>n−1, output S[n] as k*G. Other than that, return to Step 3.

FIG. 2 is a calculation flowchart that shows the calculation procedures of scalar multiplication in the Prior Art 3 graphically. Here, FIG. 2 shows repetitions of addition and double calculation, from right to left. Moreover, in FIG. 2, solid line arrows show addition on the elliptic curve, dotted line arrows show double calculation on the elliptic curve, the value circled on the arrow shows the order of addition (the total number of addition so far), and the value parenthesized on the arrow shows the order of multiplication (the total number of multiplication so far). For example, the first addition (addition of number 1 circled) shows that 3*G is calculated by the addition of G and 2*G on the elliptic curve. Additionally, the first double calculation (multiplication of number 1 parenthesized) shows that 2*G is calculated by the double calculation against G on the elliptic curve.

By this method, since the difference between the two elements that are the objects of addition (addition elements) is always G (a known quantity), there is no need to calculate the difference, therefore, the calculation quantity is the net time required to perform the addition and the double calculation, namely, n×EAdd+n×EDob.

To be more specific, since G is a known quantity and therefore it is possible to think that Z coordinate is 1, EAdd=3×Mul+2×Sq and EDob=3×Mul+s×Sq. Here, Mul and Sq are quantity of multiplication and square on GF (p), respectively and generally Sq=0.8×Mul. When these equations are substituted, the calculation quantity of Prior Art 3 is $$n \times (3 \times Mul+2 \times Sq)+n \times (3 \times Mul+2 \times Sq)=6 \times n \times Mul+4 \times n \times Sq=46/5 \times n \times Mul.$$

Here, compared with the Prior Art 2 that calculates $(2^i)*G$ in advance (uses a table), the calculation method of the Prior Art 3 is not an algorithm that uses the point of $(2^i)*G$, and therefore, the calculation quantity is not reduced as much as the Prior Art 2 and the merit that calculates $(2^i)*G$ in advance is small. Additionally, in the scalar multiplication, there is no method in which calculation of a scalar-multiplied point like $(2^i)*G$ in advance is effective. Consequently, a Montgomery-type elliptic curve is high-speed in the method that does not have the table of the scalar-multiplied points like the Prior Art 3. However, but there is a problem that no effective method exists in the case of having the table.

In other words, there is a problem that the conventional scalar multiplication method of the Montgomery-type elliptic curve is not effective in the case of having the table of points multiplied by exponentiation of two for a given point.

Moreover, as is apparent because of the above explanation, in the addition and the double calculation on the Montgomery-type elliptic curve, x coordinate (in the case of a projection coordinates that is a 3-term coordinates, x coordinate and z coordinate) can be obtained, but there is a problem that y coordinate cannot be obtained. Consequently, the conventional scalar multiplication on a Montgomery-type elliptic curve cannot be applied to the elliptic curve encryption that needs y coordinate of a scalar-multiplied point.

SUMMARY OF THE INVENTION

Accordingly, it is the first object of this invention to provide a high-speed elliptic curve calculation device that can use effectively a table that stores coordinates of a certain scalar multiple points like points multiplied by exponentiation of two to a certain point G and so forth in a scalar multiplication method using a Montgomery-type elliptic curve.

Additionally, it is the second object of this invention to provide an elliptic curve calculation device and so forth that can generate not only the x coordinates but also the y coordinates of the scalar multiple points obtained by the scalar multiplication.

In order to achieve the first object, the elliptic curve calculation device according to the present invention is a calculation device that receives an arbitrary integer k of n bits and outputs scalar-multiplied point k*G on a Montgomery-type elliptic curve E on a finite field F, where G is a predetermined point on the elliptic curve, the calculating device comprising a scalar multiplication unit operable to calculate the scalar-multiplied points k*G by repeating addition on the elliptic curve E, wherein either of G, 2*G, $2^2$*G, ..., $2^{n-1}$*G is the first addition element.

Here, it is acceptable that the device for calculation on the elliptic curve further includes: a calculation procedure generation unit operable to generate a calculation procedure of repeating addition on the elliptic curve E, wherein the scalar multiplication unit calculates the scalar-multiplied points k*G complying with a calculation procedure generated by the calculation procedure generation unit.

Additionally, it is acceptable that the addition is a first calculation that calculates $(2^m+u)$*G from $(2^{m-1}+u)$*G, $2^{m-1}$*G and u*G or a second calculation that calculates $(2^{m+1}-u)$*G from 2*G, $(2^m-u)$*G and u*G or a third calculation that calculates u*G from $2^m$*G, $-(2^m-u)$*G and $(2^{m+1}-u)$*G, where m and u are natural numbers.

Additionally, it is acceptable that the calculation procedure generation unit generates the calculation procedure by associating the addition on the elliptic curve with at least one of the first, second and third calculations in accordance with values of each bit of the k.

Additionally, it is acceptable that the calculation procedure unit generates the calculation procedure, when the value of bit of the k is 0, by associating the addition that corresponds to the bit to at least the first calculation and when the value of bit of k is 1, by associating the addition that corresponds to the bit to at least the second calculation.

Additionally, it is acceptable that the calculation procedure generation unit generates, as a calculation procedure, representation mode information that identifies, for each addition in repeating addition on the elliptic curve E, whether the second addition element added to the first addition element is expressed in plus representation $(2^{m-1}+u)$*G in the first calculation or minus representation $(2^m-u)$*G in the second calculation, and wherein the scalar multiplication unit calculates the first, second or third calculations based on the representation mode information for each addition in the repeating addition on the elliptic curve E.

Additionally, it is acceptable that the representation mode information indicates one of four expression change patterns of the second addition element:
 a) from plus representation to plus representation,
 b) from plus representation to minus representation,
 c) from minus representation to minus representation, or
 d) from minus representation to plus representation, and
that the representation mode information that indicates the number in which the second addition element appears in succession in either representation mode of the plus representation or the minus representation in repeating addition on the elliptic curve E.

Additionally, it is acceptable that the scalar multiplication unit has a table memorizing unit that memorizes at least part of G, 2*G, $2^2$*G, ..., $2^{n-1}$*G and performs addition on the elliptic curve E with a point memorized in the table memorizing unit as the first addition element.

Additionally, it is acceptable that the elliptic curve calculation device according to the present invention is the elliptic curve calculation device according to the present invention is a calculation device that receives an arbitrary integer k of n bits and outputs scalar-multiplied point k*G on a Montgomery-type elliptic curve E on a finite field F, where G is a predetermined point on the elliptic curve, the calculating device comprising a scalar multiplication unit operable to calculate the scalar-multiplied points k*G by repeating addition on the elliptic curve E, wherein either of 2*G, 3*G, 6*G, 12*G ..., $(2^{n-1}+2^{n-2})$*G is the first addition element.

Here, it is acceptable that the elliptic curve calculation device further includes: a calculation procedure generation unit operable to generate a calculation procedure that indicates a repetition procedure of addition on the elliptic curve E, and wherein the scalar multiplication unit calculates the scalar-multiplied points k*G complying with the calculation procedure generated by the calculation procedure generation unit.

Additionally, it is acceptable that the addition is a first calculation that calculates $(2^m+u)$*G from a first addition element $(2^{m-1}+2m^{-2})$*G, a second addition element $(2m^{-2}+u)$*G and the difference between the first addition element and the second addition element $(2^{m-1}-u)$ or a second calculation that calculates $(2^{m+1}-u)$*G from a first addition element $(2^m+2^{m-1})$*G, a second addition element $(2^{m-1}-u)$*G and the difference between the first addition element and the second addition element $(2^m+u)$, where m and u are natural numbers.

Additionally, it is acceptable that the calculation procedure generation unit generates, as the calculation procedure, division object information that indicates whether the result obtained by addition on the elliptic curve E by the first or second calculation should be a second addition element or the difference between a first addition element and a second addition element in the next repeating addition.

Additionally, it is acceptable that the scalar multiplication unit has the table memorizing unit that memorizes at least part of 2*G, 3*G, 6*G, 12*G, ..., $(2^{n-1}+2^{n-2})$*G and performs addition on the elliptic curve E with a point memorized in the table memorizing unit as a first addition element.

Additionally, in order to achieve the second object, the elliptic curve calculation device according to the present invention is the elliptic curve calculation device further including: a Y coordinate calculation unit operable to calculate y coordinates of the scalar-multiplied points k*G.

Here, it is acceptable that the first addition element is either of G, 2*G, $2^2$*G, ..., $2^{n-1}$*G, and the scalar multiplication unit calculates x and z coordinates of the scalar-multiplied points k*G by repeating the addition on the elliptic curve E that uses the x coordinate of the first addition element using a three-term projection coordinate (x, y, z), and the Y coordinate calculation unit calculates the y coordinates of the scalar-multiplied points k*G from the x and z coordinates of the scalar-multiplied points k*G, the x and z coordinates of a second addition element added to a first addition element that is used to calculate the scalar-multiplied points k*G and the x and y coordinates of the first addition element, using the 3-term projection coordinate (x, y, z).

Additionally, it is acceptable that the first addition element is either of 2*G, 3*G, 6*G, 12*G, ..., $(2^{n-1}+2^{n-2})$*G, and the scalar multiplication unit calculates x and z coordinates of the scalar-multiplied points k*G by repeating the addition on the elliptic curve E that uses the x coordinate of the first addition element using a three-term projection coordinate (x, y, z), and the Y coordinate calculation unit calculates the y coordinates of the scalar-multiplied points k*G from the x and z coordinates of the scalar-multiplied points k*G, the x and z coordinates of a second addition element added to a first addition element that is used to calculate the scalar-multiplied points k*G and the x and y coordinates of the first addition element, using the 3-term projection coordinate (x, y, z).

Furthermore, the present invention can be realized as an encryption device and a decryption device using the elliptic curve calculation device, as a method for calculating on the elliptic curve using the above-mentioned unit as a step, as a program that causes a computer to function as the above-mentioned unit, and as a recording medium in which such a program is recorded and that a computer can read out.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 1 is a sequence diagram that shows the procedures of the digital signature mode by ElGamal signature.

FIG. 2 is a calculation flowchart that shows the calculation procedures of scalar multiplication in the Prior Art 3 graphically.

FIG. 8 is a calculation flowchart that shows a method of scalar multiplication (approach 2 developed from approach 1).

FIG. 9 is a diagram that compares and explains the calculation methods of the first embodiment and the Prior Art 3.

FIG. 13 is a calculation flow chart that shows a method of scalar multiplication by the elliptic curve calculation device.

DESCRIPTION OF THE PREFERRED EMBODIMENTS

The elliptic curve calculation device according to the embodiments of the present invention will be explained below with reference to the figures.

The First Embodiment

1. The Structure and the Operations of the Elliptic Curve Calculation Device 200

Figure 3:
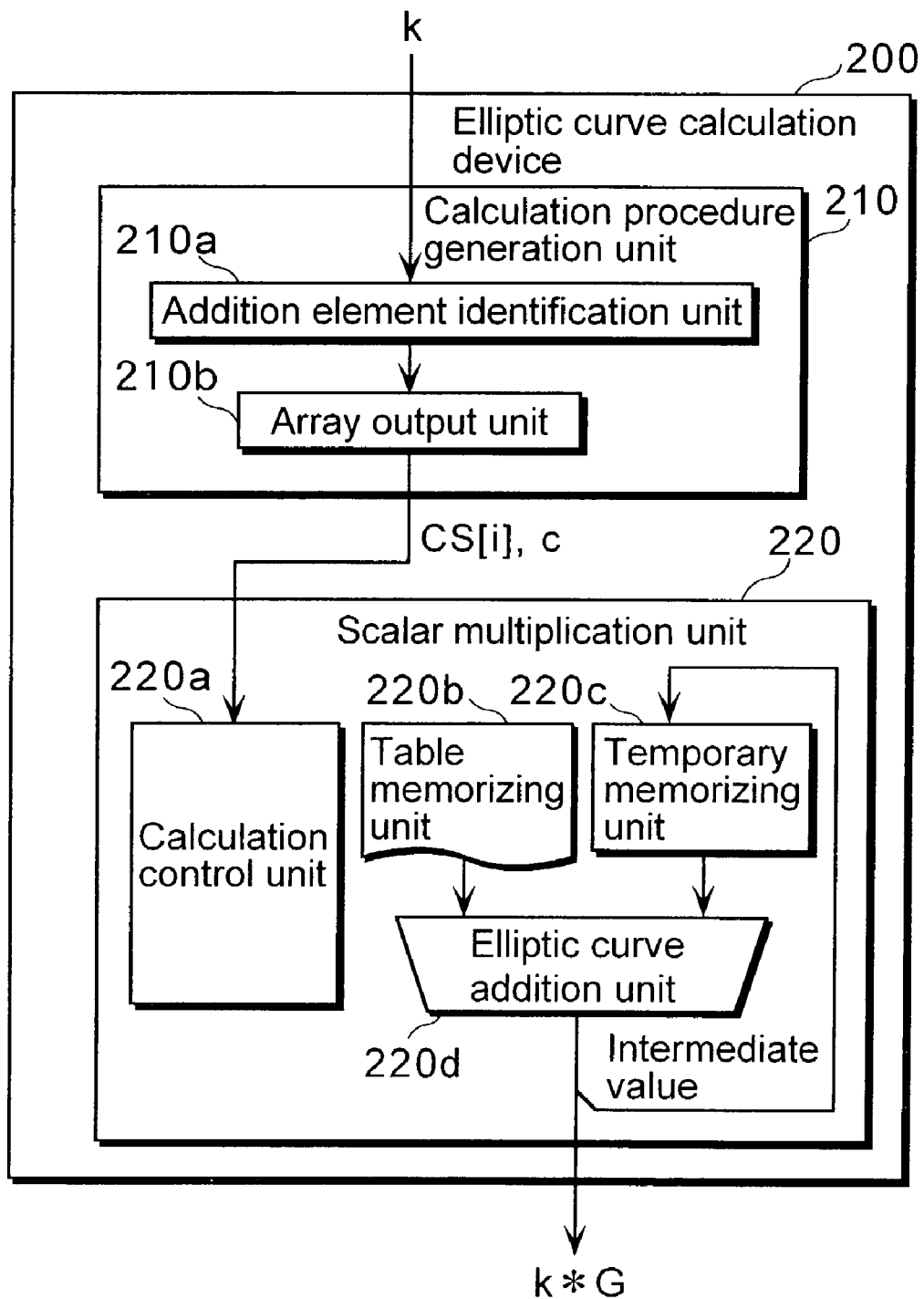
FIG. 3 is a function block diagram that shows the structure of the elliptic curve calculation device according to the first embodiment of the present invention.

FIG. 3 is a function block diagram that shows the structure of the elliptic curve calculation device 200 according to the first embodiment. This elliptic curve calculation device 200 is a calculation device that is realized by logic circuits like a computer device or LSI and so forth that execute a special purpose program, and to which a parameter p (a prime number) of a Montgomery-type elliptic curve E: $B \times y^2 = x^3 + A \times x^2 + x$ on the finite field GF (p), elements A and B on GF (p), a point G that belongs to E (GF (p)), and the x coordinate of points multiplied by exponentiation of two against the point G, $(2_i)*G$ (i=1, 2, ..., n−1) are given in advance, and that receives an arbitrary number k of n bits and outputs the x coordinate of a scalar-multiplied point against the point G: k*G. The elliptic curve calculation device 200 has a characteristic that it calculates using effectively the points multiplied by exponentiation of two against the point G, $(2^i)*G$, and comprises a calculation procedure generation unit 210 and a scalar multiplication unit 220. Moreover, the above-mentioned number n indicates the bit number of k.

The calculation procedure generation unit 210 is a processing unit that executes a preliminary calculation to generate a calculation procedure to calculate the scalar-multiplied points against the point G, k*G and that comprises an addition element identification unit 210a and an array output unit 210b. The addition element identification unit 210a that identifies addition elements by repeating to divide k*G into an addition form using G multiplied by exponentiation of two, $(2^i)$*G. The array output unit 210b outputs the addition elements identified by the addition element identification unit 210a as an array.

Figure 4:
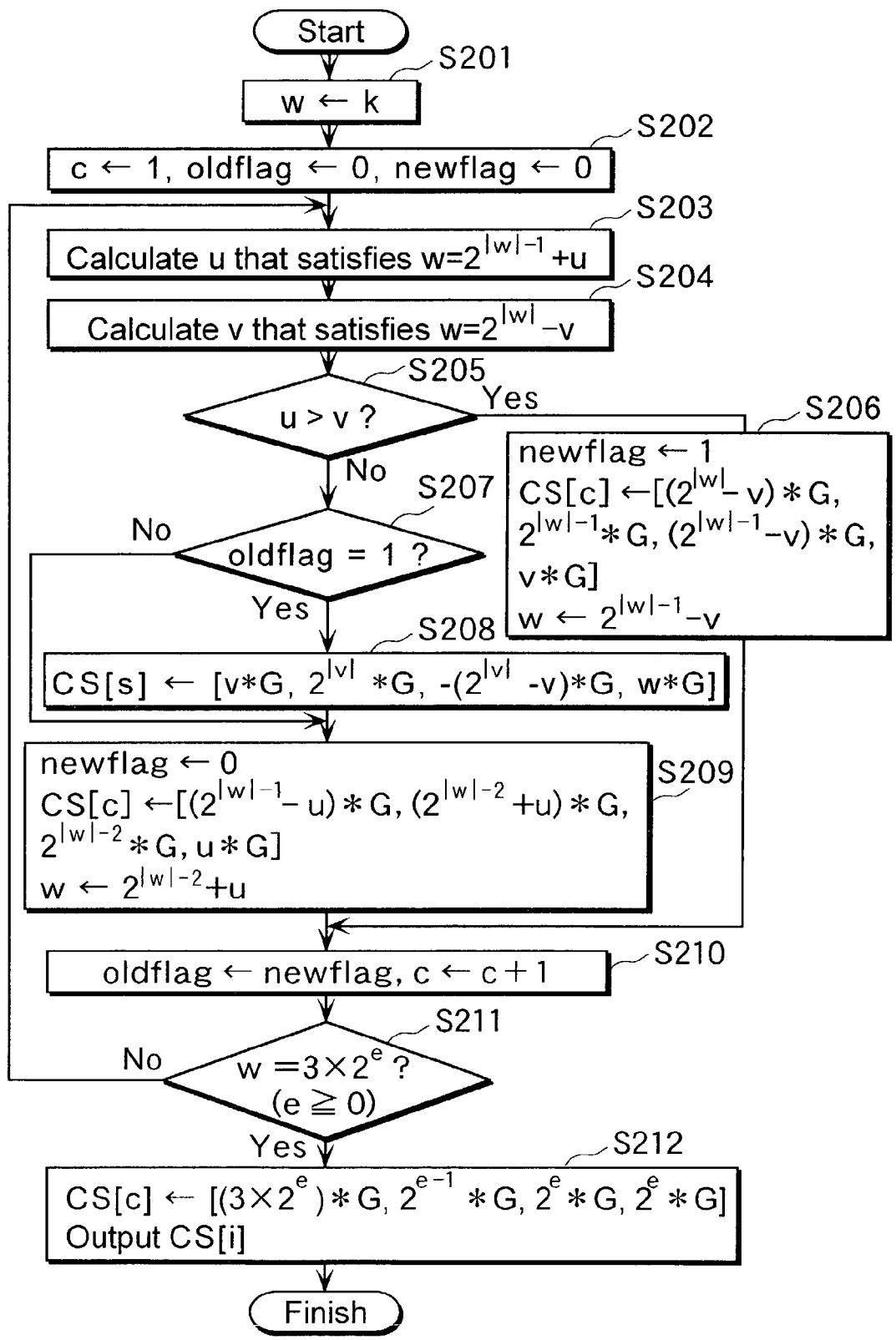
FIG. 4 is a flowchart that shows the operations of a calculation procedure generation unit of the elliptic curve calculation device.

To be more specific, the calculation procedure generation unit 210, as the flowchart indicated in FIG. 4, receives an integer k and outputs the array that shows the calculation procedures: CS[i] (i=1, 2, . . . ). Here, one array CS[i] comprises four elements that identify one addition, namely, an addition result, the first addition element, the second addition element, and the difference between the first addition element and the second addition element. Moreover, at least one of the first addition element and the second element is what is multiplied by exponentiation of two against the point G.

The addition element identification 210a identifies the array CS[i] complying with the procedures below.

Step S201: Suppose w←k. Here, w←k indicates to substitute w into k.

Step S202: Assume counter←1, old flag←0 and new flag←0.

Step S203: Calculate u that satisfies $w=2^{|w|-1}+u$. Here, |w| indicates the bit number of w.

Step S204: Calculate v that satisfies $w=2^{|w|}-v$.

Step S205: Judge whether u>v is satisfied. In the case that it is satisfied, advance on Step S206. In the case that it is not satisfied, advance on Step S207.

Step S206: Suppose new flag is 1 and define the calculation procedures CS[c] as the value of Type I, namely, $[(2^{|w|}-v)*G, 2^{|w|-1}*G, (2^{|w|-1}-v)*G, v*G]$ and suppose $w \leftarrow 2^{|w|-1}-v$. Advance on S210.

Here, the calculation procedures [$x_1$*G, $x_2$*G, $x_3$*G, $x_4$*G] indicate to calculate $x_1$*G that is elliptic curve addition of $x_2$*G to $x_3$*G using $x_2$*G, $x_3$*G, $x_4$*G ($=x_2$*G$-x_3$*G).

Step S207: Judge whether old flag=1 is satisfied. In the case that it is satisfied, advance on Step S208. In the case that it is not satisfied, advance on Step S209.

Step S208: Define the calculation procedures CS[c] as the value of Type II, namely, $[v*G, 2^{|v|}*G, -(2^{|v|}-v)*G, w*G]$ and assume c←c+1.

Step S209: Suppose new flag is 0 and define the calculation procedures CS[c] as the value of Type III, namely, $[(2^{|w|-1}+u)*G, (2^{|w|-2}+u)*G, 2^{|w|-2}*G, u*G]$ and suppose $w \leftarrow 2^{|w|-2}+u$.

Step S210: Assume old flag←new flag, c←c+1, w←.

Step S211: Judge whether $w=3 \times 2^e (e \geq 0)$ is satisfied. In the case that it is satisfied, advance on Step S212. In the case that it is not satisfied, return to S203.

Step 212: Define CS[c] as the value of Type IV, namely, $[(3 \times 2^e)*G, 2^{e-1}*G, 2^e*G, 2^e*G]$. Lastly, the array output unit 210b outputs all the calculation procedures CS[i] (i=1, 2, . . . ) identified by the addition element identification unit 210a and c to the scalar multiplication unit 220 and finishes.

Figure 5:
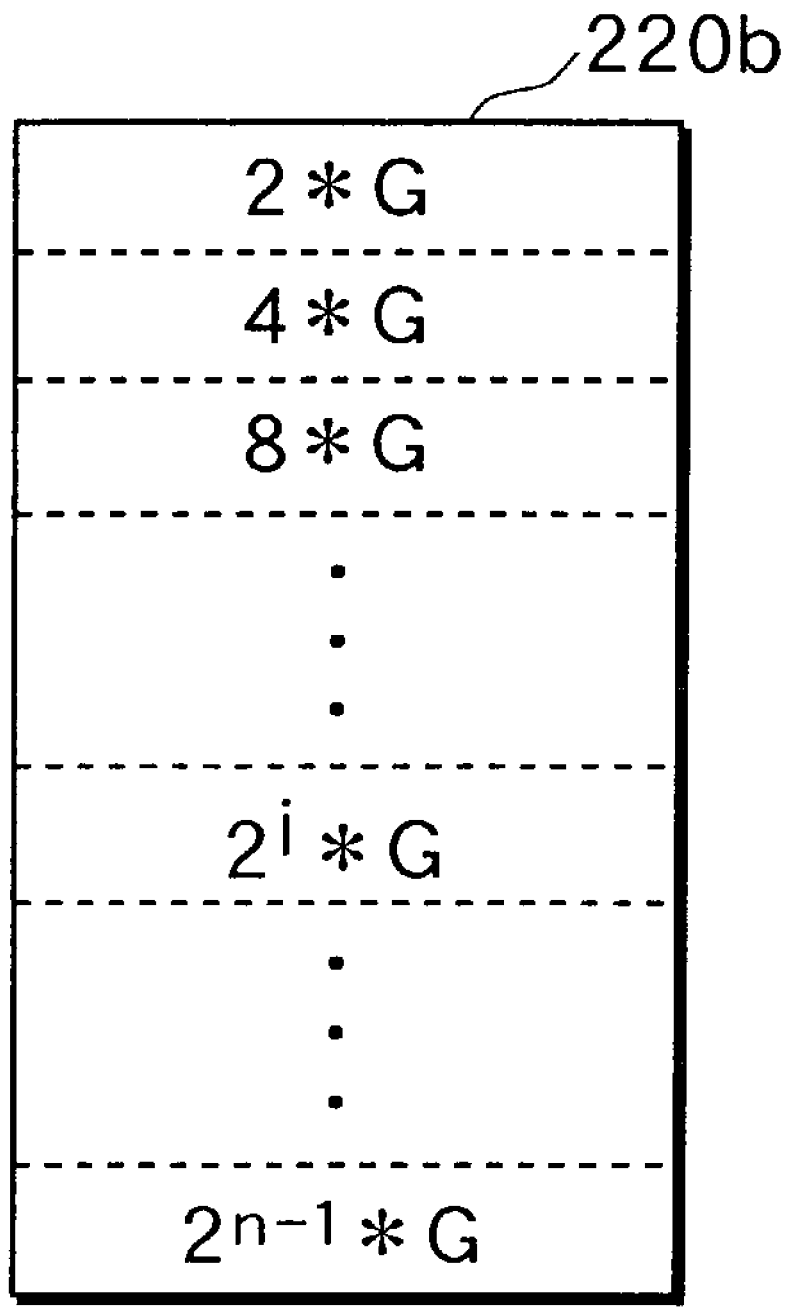
FIG. 5 is a diagram that shows stored data of a table memorizing unit of the elliptic curve calculation device.

The scalar multiplication unit 220 is a calculation unit that calculates and outputs the final calculation result k*G by repeating addition on the elliptic curve based on the calculation procedures and the counter c outputted by the calculation procedure generation unit 210 and comprises a table memorizing unit 220b that memorizes in advance what are multiplied by exponentiation of two against the point G ($2^i$*G; i=1, 2, . . . ; but only x coordinate) as is shown in FIG. 5; a temporary memorizing unit 220c that is working memory; an elliptic curve addition unit 220d that is an adder to perform addition on the elliptic curve; and a calculation control unit 220a that controls each component 220b~220d complying with the calculation procedures CS[i] from the calculation procedure generation unit 210. Moreover, the reason why only the x coordinates of the points multiplied by exponentiation of two against the point G are stored in the table memorizing unit 220b is, as is apparent from the explanation above of the Montgomery-type elliptic curve, the addition and the double calculation on the Montgomery-type elliptic curve do not need y coordinates.

Figure 6:
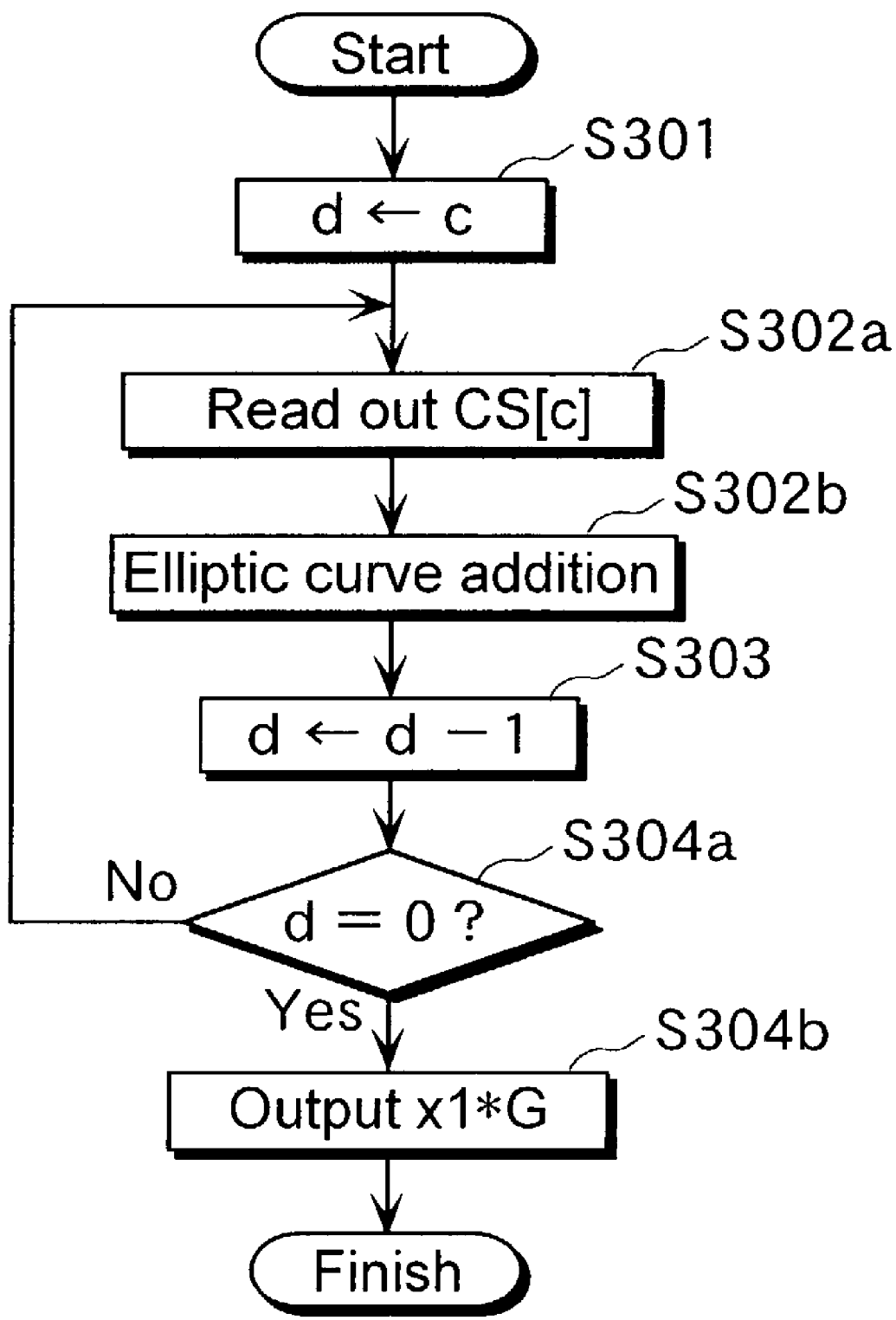
FIG. 6 is a flowchart that shows the operations of a scalar multiplication unit of the elliptic curve calculation device.

This scalar multiplication unit 220 calculates k*G complying with the flowchart shown in FIG. 6. To be more specific, the calculation control unit 220a calculates and controls by the steps below.

Step S301: The calculation control unit 220a substitutes c into a counter d.

Step S302: The calculation control unit 220a reads out CS[c] (S302a), complies with the calculation procedures [$x_1$*G, $x_2$*G, $x_3$*G, $x_4$*G], has the elliptic curve addition unit 220d execute the elliptic curve addition, and has the elliptic curve addition unit 220d calculate the point $x_1$*G($=x_2$*G$+x_3$*G) (S302b). At this moment, the calculation control unit 220a uses the values read out from the table memorizing unit 220b for $2^i$*G (exponentiation of two), stores the obtained addition result $x_1$*G in the temporary memorizing unit 220c, and controls the elliptic curve addition unit 220d to use the obtained addition result $x_1$*G in the next calculation.

Step S303: Suppose d←d-1.

Step S304: Judge whether d=0 is satisfied (S304a). In the case that it is satisfied, the calculation control unit has the elliptic curve addition unit 220d output the finally calculated result $x_1$*G and finishes (S304b). In the case that it is not satisfied, return to Step S302.

Here, the addition method on the elliptic curve used in the steps above is indicated below.

P+Q=($X_3, Y_3, Z_3$) is obtained from P=($X_1, Y_1, Z_1$), Q=($X_2, Y_2, Z_2$), and the difference between the two points P−Q=($X_{3'}, Y_{3'}, Z_{3'}$) as is shown below.

(Step 1-1) Calculation of Intermediate Values $$U_1 = X_1 + Z_1$$

$$U_2 = X_2 + Z_2$$

$$V_1 = X_1 - Z_1$$

$$V_2 = X_2 - Z_2$$

(Step 1-2) Calculation of P+Q=($X_3, Y_3, Z_3$)

$$X_3 = Z_{3'} \times (V_1 \times U_2 + U_1 V_2)^2$$

$$Z_3 = X_{3'} \times (V_1 \times U_2 - U_1 \times V_2)^2$$

Moreover, as is apparent from these equations, the addition on the Montgomery-type elliptic curve is a calculation concerning only the x coordinate (in the projection coordinate that is a 3-term coordinate, the x coordinate and the z coordinate) because the y coordinate does not appear. The Montgomery-type elliptic curve used in the elliptic curve calculation device 200 is described in detail in "Speeding the Pollard and Elliptic Curve Methods of Factorization" (written by P. L. Montgomery, Math. of Comp. 48, 1987, pp. 243-264).

Overall operations of the elliptic curve calculation device 200 constructed as above are as follows.

The elliptic curve calculation device 200 receives an inputted integer k and inputs the inputted integer k into the calculation procedure generation unit 210, which obtains the calculation procedures CS[i] (i=1, 2, . . . ) from the inputted integer k, and inputs the calculation procedures into the scalar multiplication unit 220. The scalar multiplication unit 220 calculates k*G, the scalar-multiplied points against the point G on the elliptic curve from the inputted calculation procedures CS[i] (i=1, 2, . . . ) and outputs k*G.

2. Operations of the Elliptic Curve Calculation Device 200 to a Concrete Example of Value The example of the value in the case of k=120 is indicated below.

For a start, processing of the calculation procedure generation unit 210 is explained.

The processing of the value of the counter c is indicated below.

(When the counter c=1)

Step S203: u←38 because w=102=$2^6$+38

Step S204: v←26 because w=102=$2^7$−26

Step S205: Advance on Step S206 because 38>26.

Step S206: new flag←1, CS[1]←[($2^7$−26)*G(=102*G), $2^6$*G, ($2^6$−26)]*G(=38*G), $2^6$*G], w←$2^6$−26=38, advance on Step S210.

Step S210: old flag←new flag=1, c←c+1

Step S211: Since w=38 and it cannot be represented by $3\times2^e$, return to Step S203.

(When the counter c=2)

Step S203: Since w=38=$2^5$+6, u←6

Step S204: Since w=38=$2^6$−26, v+26

Step S205: Since 6<26, advance on Step S207.

Step S207: Advance on Step S208 because old flag=1.

Step S208: CS[2]←[26*G, $2^5$*G, −($2^5$−26)*G(=−6*G), ($2^6$−26)*G(=38*G)], c←c+1

Step S209: new flag←0, CS[3]←[($2^5$+6)*G(=38*G), ($2^4$+6)*G(=22*G), $2^4$*G, 6*G], w←$2^4$+6=22

Step S210: old flag←new flag=0, c←c+1

Step S211: Since w=22 and it cannot be represented by $3\times2^e$, return to Step S203.

(When the Counter C=4)

Step S203: Since w=22=$2^4$+6, u←6.

Step S204: Since w=22=$2^5$−10, v←10.

Step S205: Since 6<10, advance on Step S207.

Step S207: Since old flag=0, advance on Step S209.

Step S209: new flag←0, CS[4]4←[($2^4$+6)*G(=22*G), ($2^3$+6)* G(=14*G), $2^3$*G, 6*G], w←$2^3$+6=14

Step S210: old flag new←flag=0, c←c+1

Step S211: Since w=14 and it cannot be represented by $3\times2^e$, return to Step S203.

(When the counter c=5)

Step S203: Since w=14=$2^3$+6, u←6.

Step S204: Since w=14=$2^4$−2, v←2.

Step S205: Advance on Step S206 because 6>2.

Step S206: Since new flag←1, CS[5]←[($2^4$−2)*G(=14*G), $2^3$*G, ($2^3$−2)*G(=6*G), $2^3$*G], w←$2^3$−2=6, advance on Step S210.

Step S210: old flag←new flag=1, c←c+1

Step S211: Since w=6 and it can be represented by w=3×2, advance on Step S212.

Step S212: CS[6]←[(3×2)*G(=6*G), $2^2$*G, 2*G, 2*G], and finish.

As just described, the output of the calculation procedure generation unit is $CS[1]=[102*G, 2^6*G, 38*G, 26*G]$ $CS[2]=[26*G, (2^5)*G −6*G, 38*G]$ $CS[3]=[38*G, 2^2*G, 2^4*G, 6*G]$ $CS[4]=[22*G, 14*G, 2^3*G, 6*G]$ $CS[5]=[14*G, 2^3*G, 6*G, 2*G]$ $CS[6]=[6*G, 2^2*G, 2*G, 2*G]$ and c=6.

Next, processing of the scalar multiplication unit 220 is explained.

For a start, substitute c=6 to d. The processing to the counter d is indicated below.

(When the counter d=6)

Step S302: Since CS [6]=[6*G, $2^2$*G, 2*G, 2*G], 6*G is obtained by performing the elliptic curve addition of $2^2$*G, 2*G, and the difference 2*G.

Step S303: d←d−1=5

Step S304: Since d=5, return to S302.

(When the counter d=5)

Step S302: Since CS [5]=[14*G, $2^3$*G, 6*G, 2*G], 14*G is obtained by executing the elliptic curve addition of $2^3$*G, 6*G and the difference 2*G. Here, since 6*G has already been calculated when the counter d=6, the calculation result is used.

Step S303: d←d−1=4

Step S304: Since d=4, return to S302.

(When the counter d=4)

Step S302: Since CS [4]=[22*G, 14*G, $2^3$*G, 6*G], $2^2$*G is obtained by executing the elliptic curve addition of 14*G, $2^3$*G, and the difference 6*G. Here, since 14*G and 6*G have already been calculated when the counter d=5, 6, respectively, the calculation results are used.

Step S303: d←d−1=3

Step S304: Since d=3, return to Step S302.

(When the counter d=3)

Step 302: Since CS [3]=[38*G, 22*G, $2^4$*G, 6*G], 38*G is obtained by executing the elliptic curve addition of 22*G, $2^4$*G and the difference 6*G. Here, since 22*G and 6*G have already been calculated when the counter d=4, 6, respectively, the calculation results are used.

Step S303: d←d−1=2

Step S304: Since d=2, return to Step S302.

(When the counter d=2)

Step 302: Since CS [2]=[26*G, $2^5$*G, −6*G, 38*G], 26*G is obtained by executing the elliptic curve addition of $2^5$*G, −6*G and the difference 38*G. Here, since 38*G has already been calculated when the counter d=3 and −6*G is what y coordinate of 6*G obtained by the calculation when d=6 is multiplied by (−1) the calculation results are used.

Step S303: d←d−1=1

Step S304: Since d=1, return to Step S302.

(When the counter d=1)

Step S302: Since CS [1]=[102*G, $2^6$*G, 38*G, 26*G], 102*G is obtained by executing the elliptic curve addition of $2^6$*G, 38*G, and the difference 26*G. Here, since 38*G and 26*G have already been calculated when the counter d=3, 4, respectively, the calculation results are used.

Step S303: d←d−1=0

Step S304: Since d=0, output 102*G and finish.

As is described above, in the above-mentioned value examples, the elliptic curve calculation device 200 can obtain correctly the scalar-multiplied point, 102*G.

3. Explanation Using a Calculation Flowchart

Next, the operations of the elliptic curve calculation device 200 according to the first embodiment are explained complying with a calculation flowchart.

Figure 7:
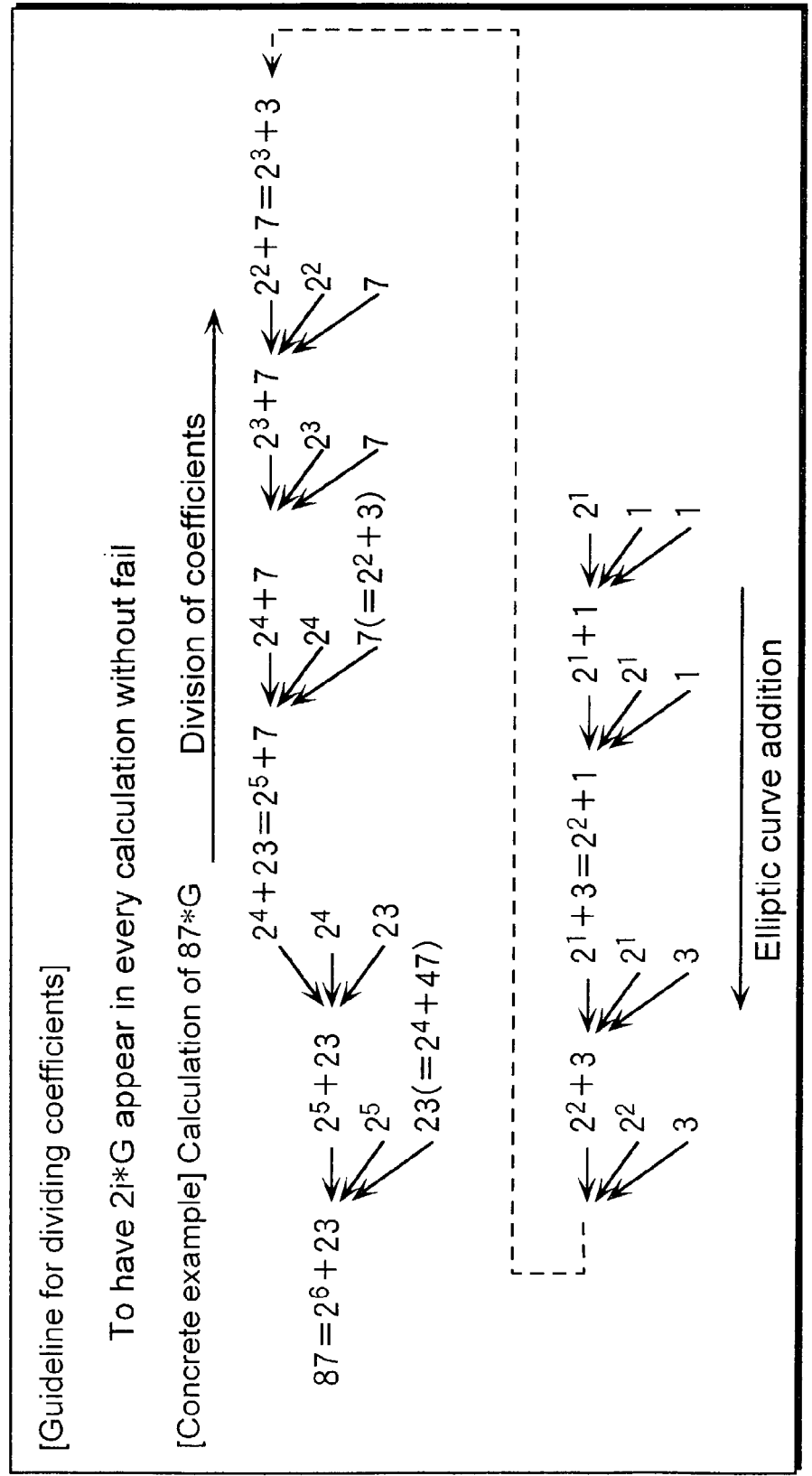
FIG. 7 is a calculation flowchart that shows a method of scalar multiplication (basic thinking; approach 1).

FIG. 7 is the calculation flowchart that indicates the method for scalar multiplication (basic thinking, approach 1) by the elliptic curve calculation device 200 according to the first embodiment. As is indicated in the upper part of FIG. 7 [Guideline for dividing coefficients], in calculating k*G, namely, multiplying a point G by a scalar, the calculation procedure generation unit 210 of the elliptic curve calculation device 200 of the present embodiment repeats to divide a coefficient k by two in advance and, at this moment, divides the coefficient k in order that a coefficient multiplied by exponentiation of two appears every time (hereafter, dividing a coefficient like this is called "the coefficient division").

To be more specific, like a calculation flowchart indicated in the lower part of FIG. 7 [Concrete example], in order for one of the coefficients of the elliptic curve addition to be the exponentiation of two, from the larger digit to the smaller digit, dividing the scalar coefficient k by two is repeated. Moreover, in FIG. 7, only the coefficients of the point G are indicated (in other words, the representation "*G" is omitted; similarly in the calculation flowcharts below). Additionally, the solid line arrows indicate addition on the elliptic curve and three addition elements are two addition elements (one of them is the exponentiation of two) that are objects of addition and the difference between the two addition elements.

For example, in FIG. 7, 87*G, namely, ($2^6$+23)*G is divided into the first addition element ($2^5$+23)*G and the second addition element $2^5$*G and, at the same time, the difference $2^3$*G is calculated. At this moment, one addition element $2^5$*G is divided in order that it becomes the exponentiation of two. Next, the other addition element ($2^4$+23)*G that is not the exponentiation of two is similarly divided into the first addition element ($2^4$+23)*G and the second addition element $2^4$*G and, at the same time, the difference 23*G is calculated. At this moment also, the division is made in order that one addition element $2^4$*G becomes the exponentiation of two. In doing this, until the division becomes impossible, the calculation procedures are decided by repeating to divide by two the addition element that is not the exponentiation of two.

Using the calculation procedures thus decided, the scalar multiplication unit 220 of the elliptic curve calculation device 200 obtains the final result k*G by repeating the elliptic curve addition from the smaller digits to the larger digits. To be more specific, for a start, using $2^1$*G, 1*G and 1*G, the scalar multiplication unit 220 performs the elliptic curve addition of $2^1$*G to 1*G, and obtain the result ($2^1$+1)*G. Next, using the just obtained results ($2^1$+1)*G, $2^1$*G, and 1*G, the scalar multiplication unit 220 performs the elliptic curve addition of ($2^1$+1)*G to $2^1$*G, repeats the elliptic curve addition (here, repetition of the total nine times of addition), and calculates the final result 87*G.

Moreover, in each elliptic curve addition, using the values that have been already calculated (the values stored in the table memorizing unit 220b), the calculation of what are multiplied by exponentiation of two becomes needless. Additionally, there is no need to newly calculate the values of difference that are required in the elliptic curve addition (the difference between the first addition element and the second addition element) because the values must appear in the process of the elliptic curve addition so far. In other words, it is enough to store the values that appeared in the past and to reuse them. For example, the value of difference 23*G that is required in the final elliptic curve addition in FIG. 7 is equal to ($2^4$+7)*G that is calculated in the second previous elliptic curve addition, and therefore, it is not necessary to recalculate it.

FIG. 8 is a calculation flowchart that shows the method of the scalar multiplication by the elliptic curve calculation device 200 according to the first embodiment (the thought adopted by the embodiment; Approach 2; what is developed from Approach 1). Here, as is indicated in the upper part of FIG. 8, in order to shorten (to represent by the fewer times of addition) the addition representation (the representation by total nine times of addition) by the approach 1, not only plus representation but also minus representation are introduced as the representation mode as the addition elements. Moreover, the plus representation is a representation mode by an addition form of $2^n$+c and the minus representation is a representation mode by a deduction form of $2^{n+1}$−d.

In other words, as the value that is the object of division, the plus representation ($2^n$+c)*G and the minus representation ($2^{n+1}$−d)*G become the candidates and the representation mode whose absolute value of the term (c, −d and so forth) except the exponentiation of two in the coefficient is smaller is adopted.

To be more specific, like a calculation flowchart shown in the lower part of FIG. 8 [Concrete example], for example, in the case that $2^5$+23 is obtained as the coefficient that is the object of the division, the value is compared with the minus representation $2^6$−9 that is equal to the value and the representation mode whose absolute value of the term except the exponentiation of two (23 and −9) is smaller is adopted. In this case, it is $2^6$−9. As a result, the difference between the two addition elements obtained after the coefficient division is smaller and the total number of the division is reduced. As is shown in FIG. 8, the calculation procedures need nine times (occasions) of addition in the Approach 1 while the number of times of addition is reduced to seven times in the Approach 2.

4. The Effects of the First Embodiment

As is apparent from the processing of the scalar multiplication unit 220, in the repetition of the elliptic curve addition, $2^i*G$ appears every counter value, and the elliptic curve calculation device 200 according to the present embodiment uses effectively the table of the coordinates of $2^i*G$ ($i=1, 2, \ldots, n-1$). As a result, the calculation quantity is reduced and the calculation speed is faster than the conventional methods. The calculation quantity in detail is different depending on k when k is n bits. The average is $$(5/4 \times n-3) \times \text{EAdd}.$$

Here, EAdd is the calculation quantity of the elliptic curve addition.

Being different from Prior Art 3, since the difference between the two points U cannot be calculated in advance, the Z coordinate is not necessarily 1. As a result, EAdd=4×Mul+ 2×Sq and EDob=3×Mul+2×Sq. Moreover, Mul and Sq are the multiplication and the square of GF (p), respectively. Generally, Sq=0.8×Mul. When these equations are substituted, the calculation quantity of the elliptic curve calculation device 200 is $$(5/4 \times n-3) \times (4 \times \text{Mul}+2 \times \text{Sq}) = (5 \times n-12) \times \text{Mul}+ (5/2 \times n-6) \times \text{Sq} = (7 \times n-84/5) \times \text{Mul}.$$

and the calculation quantity of the Prior Art 3 is $$n \times (3 \times \text{Mul}+2 \times \text{Sq})+n \times (3 \times \text{Mul}+2 \times \text{Sq}) = 6 \times n \times \text{Mul}+4 \times n \times \text{Sq} = 46/5 \times n \times \text{Mul}$$

Consequently, the elliptic curve calculation device 200 is about 1.3 times faster than the Prior Art 3.

FIG. 9 is a diagram that compares the calculation method of the Prior Art 3 shown in FIG. 2 with that of the first embodiment (the lower part of FIG. 8). As is apparent from FIG. 9, for example, the calculation of 87*G needs 6 times of addition and 5 times of double calculation by the Prior Art 3, while it needs 7 times of addition only by the first embodiment. In other words, the calculation quantity of the Prior Art 3 and that of the first embodiment are 50.6:39.2 and the calculation speed of the first embodiment is about 1.3 times faster than that of the Prior Art 3.

As is stated above, by the first embodiment, it is possible to realize the fast elliptic curve calculation, and therefore, the practical value of the present invention is extremely high.

The Second Embodiment

Next, an elliptic curve calculation device according to the second embodiment of the present invention is explained.

1. The Structure and Operations of the Elliptic Curve Calculation Device 300

Figure 10:
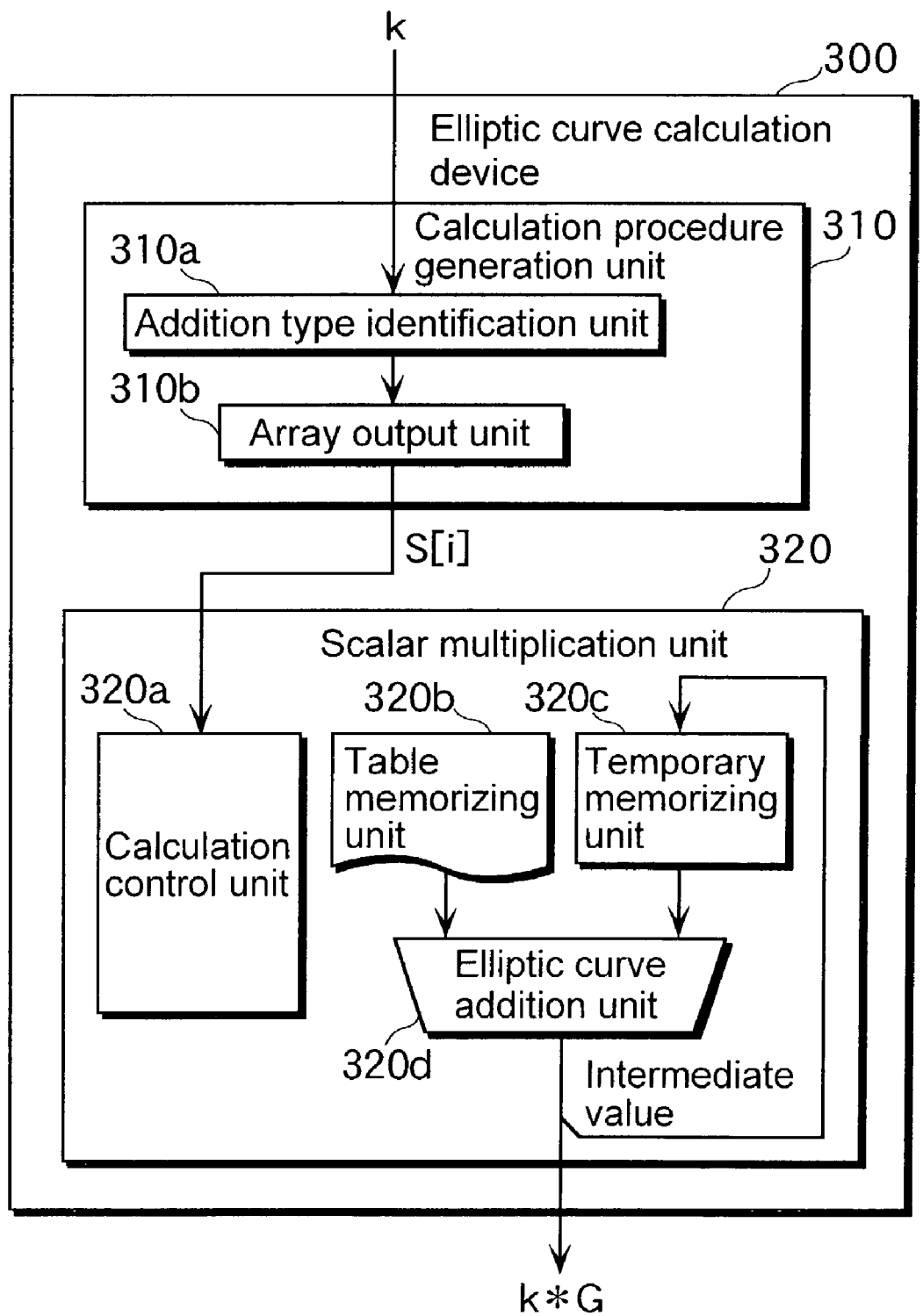
FIG. 10 is a function block diagram that shows the structure of the elliptic curve calculation device according to the second embodiment of the present invention.

FIG. 10 is a block diagram that shows the structure of the elliptic curve calculation device 300 according to the second embodiment. This elliptic curve calculation device 300 is, similarly to the first embodiment, a calculation device that is realized by logic circuits like a computer device or LSI and so forth that execute a special purpose program, and to which a parameter p (a prime number) of a Montgomery-type elliptic curve E: $B \times y^2 = x^3 + A \times x^2 + x$ on the finite field GF (p), elements A and B on GF (p), a point G that belongs to E (GF (p)), and the x coordinate of points multiplied by exponentiation of two against the point G: $(2^i)*G(i=1, 2, \ldots, n-1)$ are given in advance, and that receives an arbitrary number k of n bits and outputs the x coordinate of a scalar-multiplied point against the point G, k*G. The elliptic curve calculation device 300 has a characteristic that it calculates effectively using the points multiplied by exponentiation of two against the point G, $(2^i)*G$, and comprises a calculation procedure generation unit 310 and a scalar multiplication unit 320.

This elliptic curve calculation device 300, for the scalar multiplication of the point G, generates calculation procedures based on a preliminary calculation (a calculation suitable for a calculating machine) using binary representation and executes the scalar multiplication of the point G complying with the generated calculation procedures. In this point, the elliptic curve calculation device 300 is different from the first embodiment that does not consider processing efficiency by the calculating machine.

The calculation procedure generation unit 310 is a processing unit that executes a preliminary calculation to generate a calculation procedure to calculate the scalar-multiplied points against the point G, k*G and that comprises an addition type identification unit 310a and an array output unit 310b.

The addition type identification unit 310a repeats to divide k *G into an addition form that uses what are multiplied by exponentiation of two against the point G: $2^i*G$ and that identifies the type for switching the representation modes of the obtained addition element (addition type). The array output unit 310b outputs the addition type identified by the addition type identification unit 310a as an array.

Figure 11:
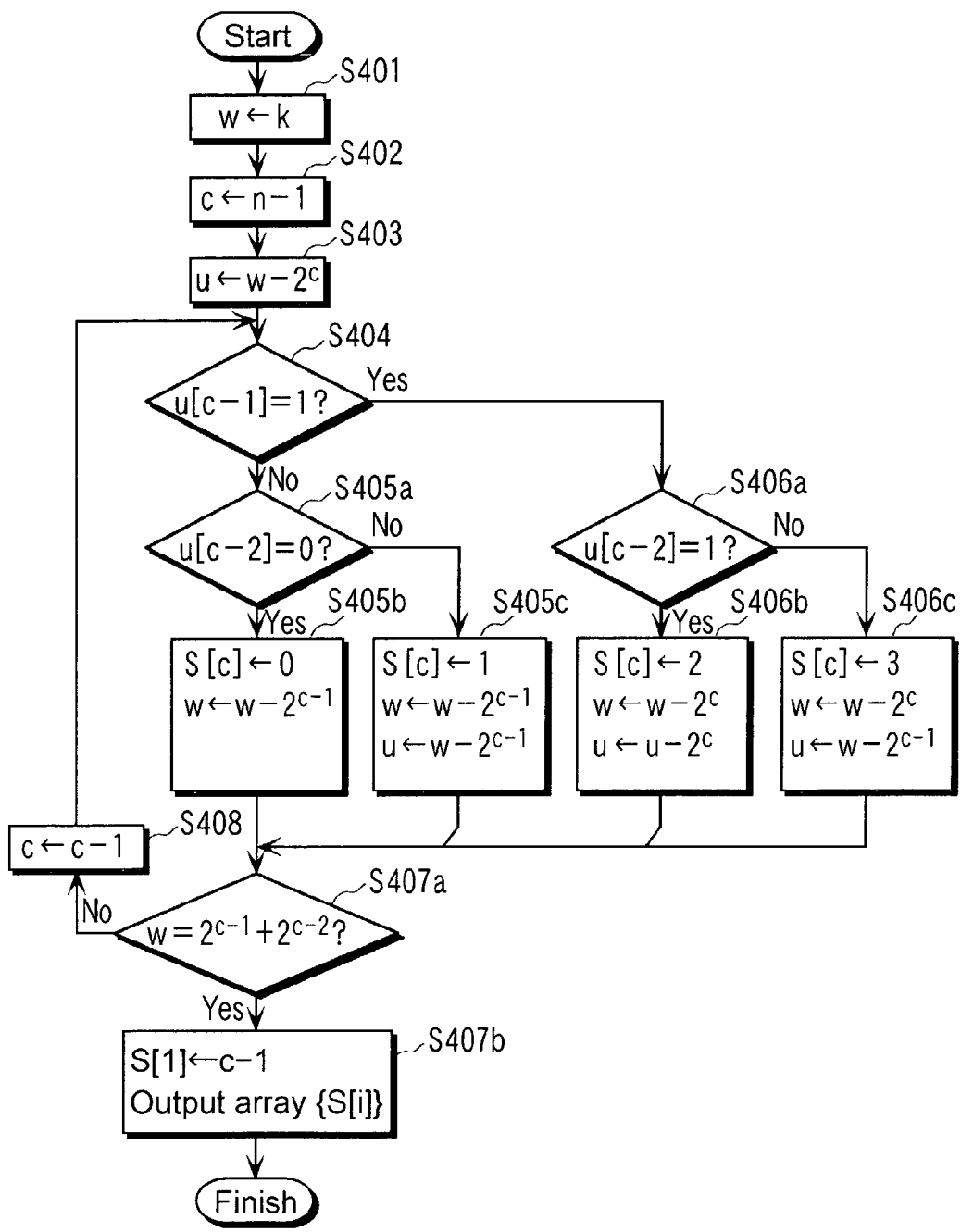
FIG. 11 is a flowchart that shows the operations of a calculation procedure generation unit of the elliptic curve calculation device.

To be more specific, like the flowchart indicated in FIG. 11, the calculation procedure generation unit 310 receives an integer k and outputs the array {S[i]} (S[i] is the ith number of the array, $1 \leq i \leq |k|$). Here, the array S[i] focuses on the ith type of addition in the repeated addition to calculate k*G, namely, the representation mode of the coefficient of the addition element (or the value obtained as a result of addition) that is not what are multiplied by exponentiation of two against the point G and the array S[i] is set to "0" in the case that the coefficient becomes a plus representation from a plus representation by the addition, is set to "1" in the case that the coefficient becomes a minus representation from a plus representation by the addition, is set to "2" in the case that the coefficient becomes a minus representation from a minus representation by the addition, and is set to "3" in the case that the coefficient becomes a plus representation from a minus representation by the addition.

In FIG. 11, the addition type identification unit 310a identifies the array {S[i]} complying with the procedures below. Moreover, in the description below, when $$k=k[n-1] \times 2^{n-1}+k[n-2] \times k[n-2] \times 2^{n-2}+ \ldots +k[1] \times 2+ k[0]$$

suppose the bit representation of k is [k [n−1], k[n−2], ..., k[1], k[0]].

Step S401: Suppose w←k. Moreover, w←k indicates to substitute k into w.

Step S402: Suppose the counter c←n−1.

Step S403: Suppose u←w−$2^c$.

Step S404: Judge whether u [c−1] is 1 or not. When it is 1, advance on to S406. Other than that, advance on the next step.

Step S405: Judge whether u [c−2] is 0 or not (S405a). When it is 0, suppose S [c]←0 and w←w−$2^{c-1}$ (S405b). When it is 1, suppose S [c]←1, w←w−$2^{c-1}$, and u←w−$2^{c-1}$ (S405c). Advance on Step S407.

Step S406: Judge whether u [c−2] is 1 or not (S406a). When it is 1, suppose S [c]←2, w←w−$2^c$, u←u−$2^c$ (S406b). When it is 0, suppose S [c]←3, w←2−$2^c$, and u←w−$2^{c-1}$ (S406c).

Step S407: Judge whether $w=2^{c-1}+2^{c-2}$ is satisfied (S407a). In the case that this equation is satisfied, the addition type identification unit 310a supposes S [1]←c−1, and the array output unit 310b outputs the array {S [i]} to the scalar multiplication unit 320 and finishes (S407b). Other than that, advance on the next step.

Step S408: Suppose c←c−1. Advance on Step S404.

The scalar multiplication unit 320 is a calculation unit that calculates and outputs the final calculation result k*G by repeating the addition on the elliptic curve based on the calculation procedures S [i] (i=1, 2, . . . ) and comprises a table memorizing unit 320b that memorizes in advance what are multiplied by exponentiation of two against the point G ($2^{i}$*G; i=1, 2, . . . ; but only x coordinate); a temporary memorizing unit 320c that is working memory; an elliptic curve addition unit 320d that is an adder to perform addition on the elliptic curve; and a calculation control unit 320a that controls each component 320b~320d complying with the calculation procedures CS[i] from the calculation procedure generation unit 310.

Figure 12:
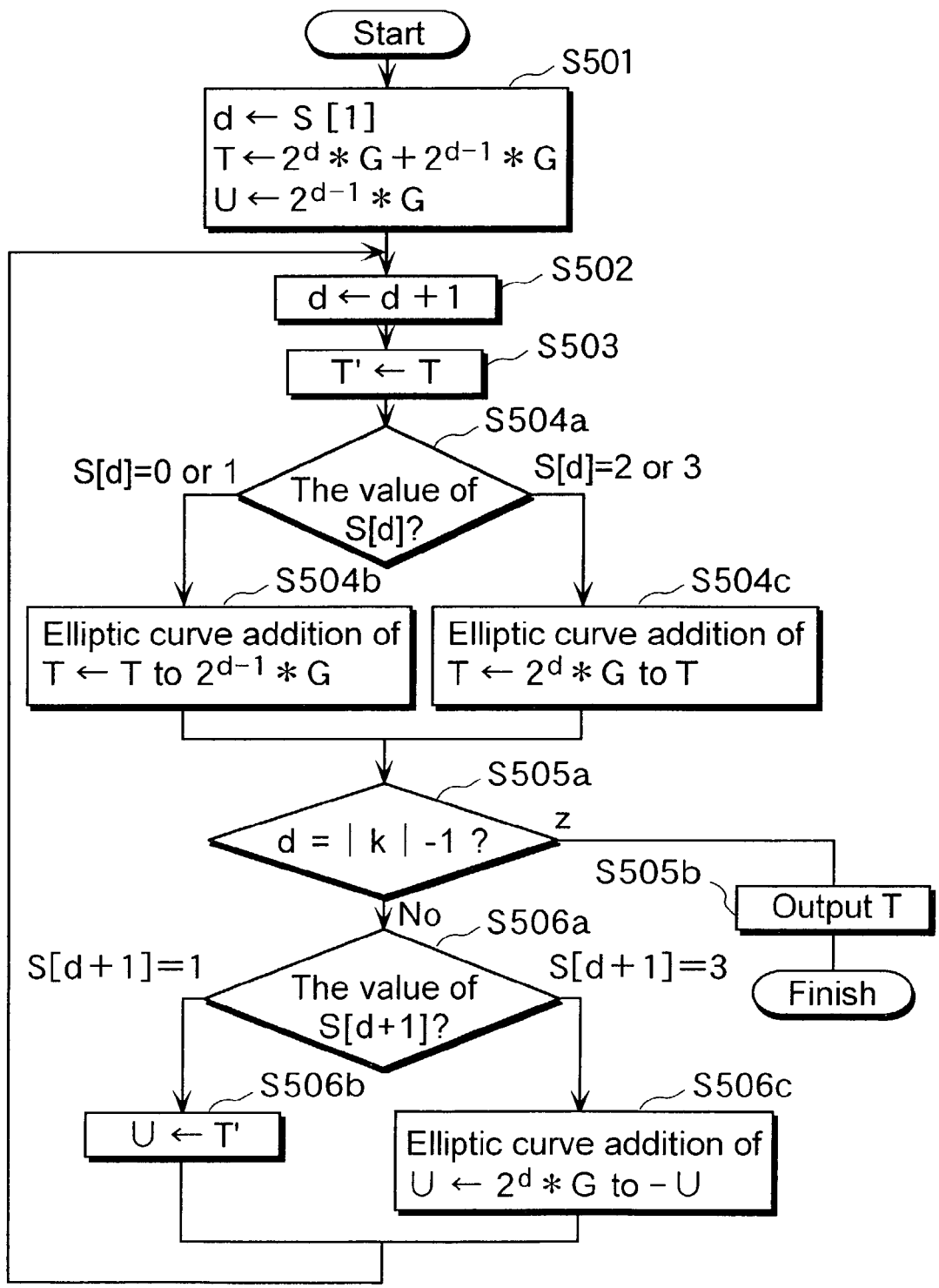
FIG. 12 is a flowchart that shows the operations of a scalar multiplication unit of the elliptic curve calculation device.

This scalar multiplication unit 320 calculates k*G complying with the flowchart shown in FIG. 12. To be more specific, the calculation control unit 320a calculates and controls by the steps below.

Step S501: Assume d←$S_1$. The calculation control unit 320a has the elliptic curve addition unit 320d perform an elliptic curve addition $2^d$*G+$2^{d-1}$*G, substitutes the addition result into T, and assumes U←$2^{d-1}$*G.

Step S502: Assume d←d+1.

Step S503: Assume T'←T.

Step S504: Judge the value of S [d] (S504a) and process as below. (1) When S [d]=0 or 1, the calculation control unit 320a has the elliptic curve addition unit 320d perform an elliptic curve addition of $2^d$*G to T (the difference between the two points is U) and substitutes the addition result into T (S504c).

Moreover, to multiply $2^d$*G and so forth by exponentiation of two, the values read out from the table memorizing unit 320b are used and the obtained addition result is substituted into a variable T by storing the obtained addition result in the temporary memorizing unit 320c.

Step S505: Judge whether d=|k|−1 is satisfied (S505a), in the case that this equation is satisfied, output T (S505b), and finish. Other than that, advance on the next step.

Step S506: Check the value of S [d+1] (S506a). When S [d+1]=1, assume U←T' (S506b). When S [d+1]=3, have the elliptic curve addition unit 320d perform an elliptic curve addition of $2^d$*G to −U (the difference between the two points is T) and substitute the result into U. Advance on Step S502.

Moreover, the concrete calculation methods used in the above-mentioned steps are as explained in the first embodiment.

Overall operations of the elliptic curve calculation device 300 constructed as above are as follows.

The elliptic curve calculation device 300 receives an inputted integer k and inputs the inputted integer k into the calculation procedure generation unit 310, which calculates the array {S [i]} from the inputted integer k, and inputs the calculation procedures into the scalar multiplication unit 320. The scalar multiplication unit 320 calculates k*G, the scalar-multiplied point of the point G on the elliptic curve from the inputted array {S [i]} and outputs k *G.

2. Operations of the Elliptic Curve Calculation Device 300 to a Concrete Example of Value The example of the value in the case of k=120 is indicated below.

For a start, processing of the calculation procedure generation unit 310 is explained.

Since n=7, the initial value of the counter c is 6. The processing of the value of the counter c is indicated below.

(When the counter c=6)

Step S403: u←w−$2^{n-1}$=38.

Step S404: Judge u [c−1]=u [5]. Since u [5]=1 (∵u=$2^5$+6), advance on Step S406.

Step S406: Judge u [c−2]=u [4]. Since u [4]=0, S [6]←3, w←w−$2^c$=102−$2^6$=38, u←w−$2^{c-1}$=38−$2^5$=6.

Step S407: Judge whether $w=2^{c-1}+2^{c-2}$ is satisfied. It is not satisfied.

Step 408: Since c←c−1=5, return to Step S404.

(When the counter c=5)

Step S404: Judge u [c−1]=u [4]. Since u [4]=0, advance on Step S405.

Step S405: Judge u [c−2]=u [3]. Since u [3]=0, S [5]←0, w←w−$2^{c-1}$=38−$2^4$=22. Advance on Step S407.

Step S407: Judge whether $w=2^{c-1}+2^{c-2}$ is satisfied. It is not satisfied.

Step S408: Since c←c−1=4, return to Step S404.

(When the counter c=4)

Step S404: Judge u [c−1]=u [3]. Since u [3]=0, advance on Step S405.

Step S405: Judge u [c−2]=u [2]. Since u [2]=1, S [4]←1, w←w−$2^{c-1}$=22−$2^3$=14, u←w−$2^{c-1}$=14−$2^3$=6. Advance on Step S407.

Step S407: Judge whether $w=2^{c-1}+2^{c-2}$ is satisfied. It is not satisfied.

Step S408: Since c←c−1=3, return to S Step 404.

(When the counter c=3)

Step S404: Judge u [c−1]=u [2]. Since u [2]=1, advance on Step S406.

Step S406: Judge u [c−2]=u [1]. Since u [1]=1, S [3]←2, w←w−$2^c$=14−$2^3$=6, u←u−$2^{c-1}$=6−$2^2$=2. Advance on Step S407.

Step S407: Judge whether $w=2^{c-1}+2^{c-2}$ is satisfied. Since $w=6=2^2+2^1$ and it is satisfied, output the array {S [i]} as S [1]=c−1=2 and finish.

As is stated above, the output of the calculation procedure generation unit 310 is [2, 0, 2, 1, 0, 3].

Next, processing of the scalar multiplication unit 320 is explained.

Since S1=2, d=2. For a start, in Step S501, calculate $2^2$*G+21*G, substitute the calculation result into Q, and obtain U←21*G. Next, in Step S502, suppose d←d+1=3. The processing of the value of d after that is indicated below.

(When d=3)

Step S503: Q'←Q

Step S504: Judge the value of S [d]=S [3]. Since S [3]=2, perform an elliptic curve addition of $2^3$*G to Q (the difference between the two points is $2^3*G-Q=(2^3-(2^{2+21}))$, and substitute the addition result into Q (Q=14*G).

Step S505: Judge whether d=|k|−1=6 is satisfied. It is not satisfied.

Step S506: Judge S [d+1]−S [4]. Since S [4]=1, U←Q' (=6*G). Return to Step S502.

(When d=4)

Step S503: Q'←Q

Step S504: Judge the value of S [d]=S [4]. Since S [4]=0, perform an elliptic curve addition of Q to $2^3*G$ (the difference between the two points is $Q-2^3*G=(14-2^3)*G=6*G=U$) and substitute the addition result into Q (Q=22*G).

Step S505: Judge whether d=|k|−1=6 is satisfied. It is not satisfied.

Step S506: Judge S [d+1]=S [5]. Since S [5]=0, there is no processing here. Return to Step S502.

(When d=5)

Step S503: Q'←Q

Step S504: Judge the value of S [d]=S [5]. Since S [5]=0, perform an elliptic curve addition of Q to $2^4*G$ (the difference between the two points is $Q-2^4*G=(22-2^4)*G=6*G=U$) and substitute the addition result into Q (Q=38*G).

Step S505: Judge whether d=|k|−1=6 is satisfied. It is not satisfied.

Step S506: Judge the value of S [d+1]=S [6]. Since S [6]=3, perform an elliptic curve addition of $2^5*G$ to −U (the difference of the two points is $2^5*G-(-U)=(2^{5+6})*G=38*G$), substitute the addition result into U (U=26*G). Return to Step S502.

(When d=6)

Step S503: Q'←Q

Step S504: Judge the value of S [d]=S [6]. Since S [6]=3, perform an elliptic curve addition of $2^6*G$ to Q (the difference of the two points is $2^6*G-Q=(2^6-38)*G=26*G=U$) and substitute the addition result into Q (Q=102*G).

Step S505: Judge whether d=|k|−1=6 is satisfied. Since it is satisfied, output Q (=102*G) and finish.

As is described above, in the above-mentioned value examples, the elliptic curve calculation device 300 can obtain correctly the scalar-multiplied point, 102*G.

3. Explanation Using a Calculation Flowchart

Next, the operations of the elliptic curve calculation device 300 according to the second embodiment are explained complying with a calculation flowchart.

FIG. 13 is the calculation flowchart that indicates the method for scalar multiplication by the elliptic curve calculation device 300 according to the second embodiment. As is indicated in the upper part of FIG. 13 [Guideline for dividing coefficients], in calculating k *G, namely, multiplying a point G by a scalar, the calculation procedure generation unit 310 of the elliptic curve calculation device 300 of the present embodiment repeats the division of a coefficient k by two in advance and, at this moment, as for the coefficient that is the object of the division, the calculation procedure generation unit 310 focuses attention on the highest two digits of the binary representation of the coefficient, represents the coefficient by a plus representation in the case that the highest two digits are "10", while represents the coefficient by a minus representation in the case that the highest two digits are "11" and then execute the coefficient division. Then the calculation procedure generation unit 310 identifies the addition type (0/1/2/3) that indicates how the representation mode of the object of division (the coefficient) is switched every coefficient division.

To be more specific, like a flowchart indicted in the middle part of FIG. 13[Concrete example], as for the coefficient 102 that is the object of division, since its binary representation is 1100110 and the highest two digits are "11", 102 is represented by a minus representation $2^7-26$ and then is divided by $2^6$ and $2^6-26$ (=38). Subsequently, as for 38 that is the object of division, since its binary representation is 100110 and the highest two digits are "10", 38 is represented by a plus representation $2^5+6$ and then is divided by $2^4$ and $2^{4+6}$. At this point, by the division of the first coefficient (the division of 102), the object of division has changed from a minus representation to a plus representation, and therefore, among the switch types of the representation mode indicated in the lower part of FIG. 13, the corresponding value "3" is set as the value of the array S [i].

Like this, in examples of FIG. 13, since the coefficient that is the object of the division changes, in conjunction with the division, from a minus representation to a plus representation, a plus representation, a minus representation, and minus representation, the outputted array S [i] becomes 3, 0, 1, 2.

Moreover, in the case that the representation mode of the object of the division switches from a minus representation to a plus representation, it is necessary to divide the value of difference of the two addition elements generated by the division. In the example of FIG. 13, the value of difference 26 generated when the object of the division has switched from the minus representation ($2^7-26$) to the plus representation ($2^5+6$) is divided into an indicated addition element.

As is described above, in the second embodiment, the calculation procedure generated by the calculation procedure generation unit 310 S [i] is the switch information of representation mode of the object coefficient in the repeated division against the scalar coefficient k and is the simplified information compared with the first embodiment which outputs all the division elements (addition elements) as the calculation procedure.

4. The Effects of the Second Embodiment

As is apparent from the processing of the scalar multiplication unit 320, in the repetition of the elliptic curve addition, $2^i*G$ appears every addition, similarly to the first embodiment, the elliptic curve calculation device 300 according to the present embodiment uses effectively the table of the coordinates of $2^i*G$ (i=1, 2, . . . , n−1). As a result, the calculation quantity is reduced and the calculation speed is about 1.3 times faster than the Prior Art 3.

The different point from the elliptic curve calculation device 200 according to the first embodiment is that the description of the processing by the elliptic curve calculation device 300 is more suitable for a calculating machine (the processing associated with the binary representation). For this reason, the programming is easier.

As is stated above, by the second embodiment, it is possible to realize the fast elliptic curve calculation and further its processing is suitable for a calculating machine, and therefore, the practical value of the present invention is extremely high.

The Third Embodiment

Next, an elliptic curve calculation device according to the third embodiment of the present invention is explained.

1. The Structure and Operations of the Elliptic Curve Calculation Device 400

Figure 14:
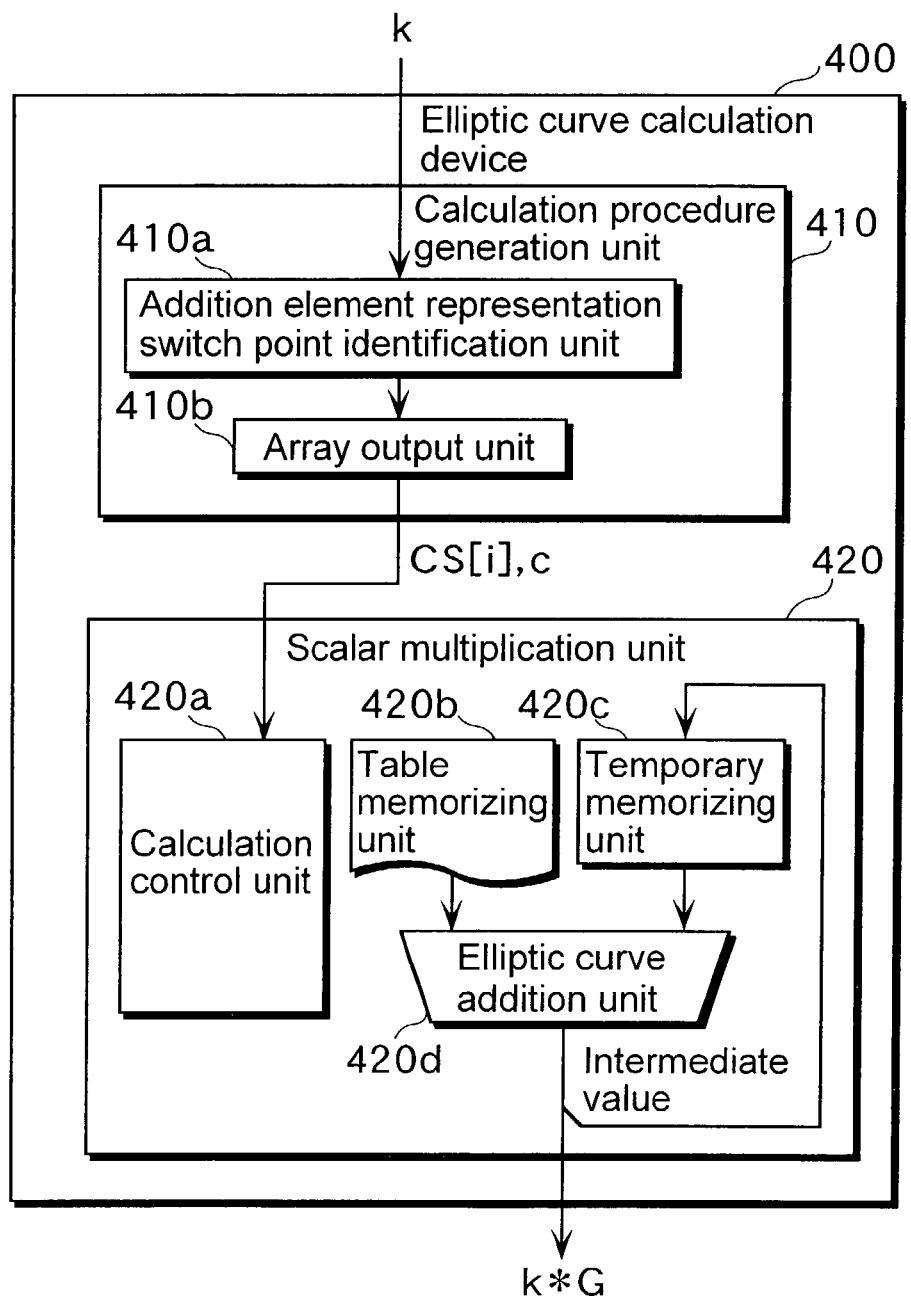
FIG. 14 is a function block diagram that shows the structure of the elliptic curve calculation device according to the third embodiment of the present invention.

FIG. 14 is a block diagram that shows the structure of the elliptic curve calculation device 400 according to the third embodiment. This elliptic curve calculation device 400 is, similarly to the first and second embodiments, a calculation device that is realized by logic circuits like a computer device or LSI and so forth that execute a special purpose program, and to which a parameter p (a prime number) of a Montgomery-type elliptic curve E: $B \times y^2 = x^3 + A \times x^2 + x$ on the finite field GF (p), elements A and B on GF (p), a point G that belongs to E (GF (p)), and the x coordinate of points multiplied by exponentiation of two against the point G: $(2^i)*G$ ($i=1, 2, \ldots, n-1$) are given in advance, and that receives an arbitrary number k of n bits and outputs the x coordinate of a scalar-multiplied point against the point G, k*G. The elliptic curve calculation device 400 has a characteristic that it calculates effectively using the points multiplied by exponentiation of two against the point G, $(2^i)*G$, and comprises a calculation procedure generation unit 410 and a scalar multiplication unit 420.

This elliptic curve calculation device 400 is common to the second embodiment in the point that for the scalar multiplication of the point G, the elliptic curve calculation device 400 generates calculation procedures on the switch of the representation mode for the addition elements based on a preliminary calculation (a calculation suitable for a calculating machine) using binary representation and is different from the second embodiment in the point that the elliptic curve calculation device 400 generates the consecutive number of the same representation mode as the calculation procedure. Hereafter, an explanation is made focusing attention on different points from the second embodiment.

The calculation procedure generation unit 410 is a processing unit that executes a preliminary calculation to generate a calculation procedure to calculate the scalar-multiplied points against the point G, k*G and that comprises an addition element representation switch point identification unit 410a and an array output unit 410b.

The addition element representation switch point identification unit 410a repeats the division of k*G into an addition form that uses what are multiplied by exponentiation of two against the point G, $2^i*G$ and identifies the switch points of the representation mode for the obtained addition elements (the information that how many same representation modes succeed before the representation modes change) and the array output unit 410b outputs the switch points identified by the addition element representation switch point identification unit 410a.

Figure 15:
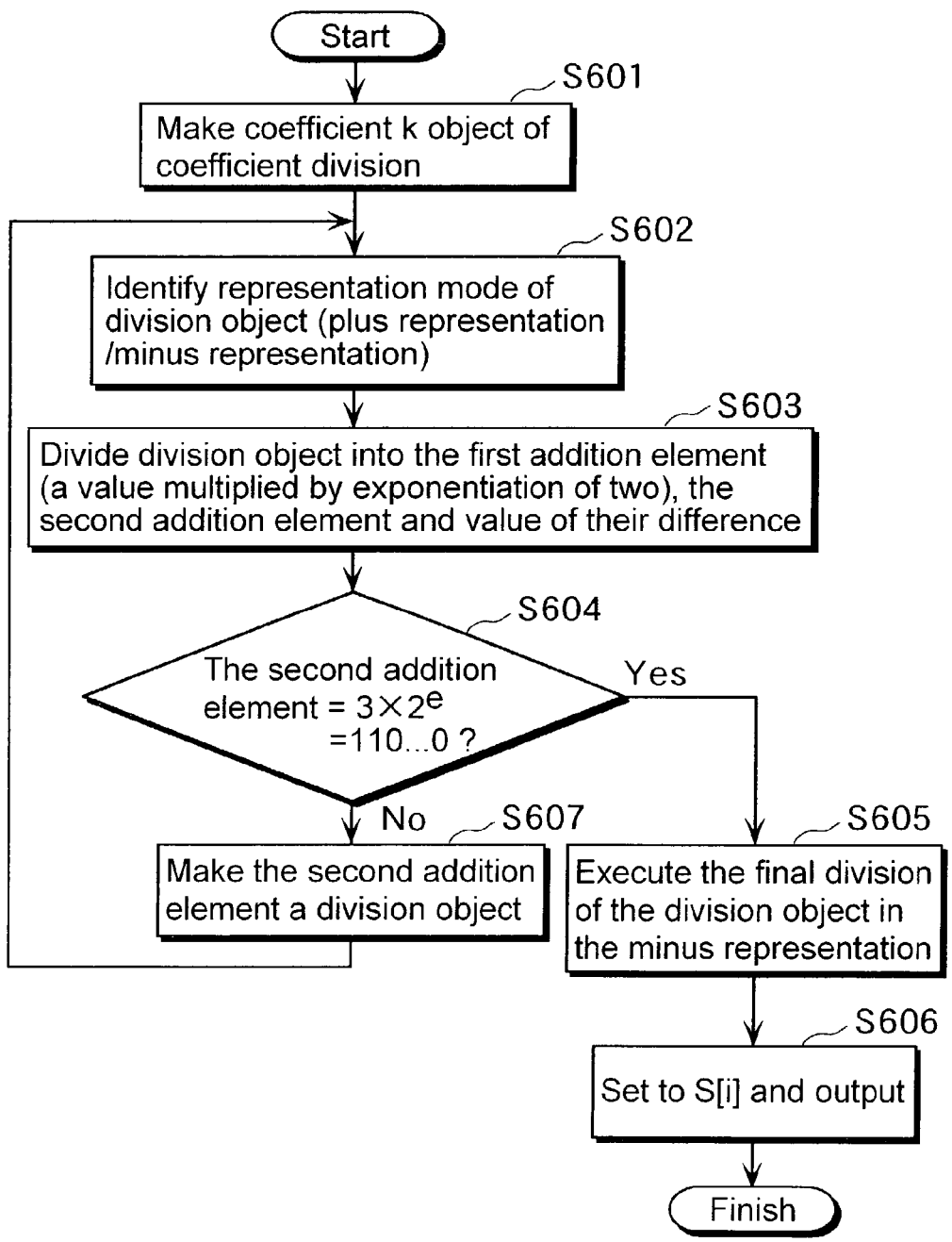
FIG. 15 is a flowchart that shows the operations of a calculation procedure generation unit of the elliptic curve calculation device.

To be more specific, the calculation procedure generation unit 410, like the flowchart indicated in FIG. 15, receives a integer k and outputs an array {S [i]} (i=1, 2, . . . , S [1]+2). Here, the array {S [i]} is composed of values below.

S [1]: The total number of representation mode (in the case that the same representation mode succeeds, suppose the number is one) appeared in the transition sequence of representation mode obtained as a result of the coefficient division. For example, in the case that the representation modes of a division object are −(a minus representation), +(a plus representation), +, −, −, S [1] is 3 (three representation modes, "−", "+", and "−").

S [2]: The number of "0" (a binary representation) included in the addition element obtained at the end of the coefficient division. Moreover, the addition element obtained at the end of the coefficient division must be 10 . . . (representation of the succession of 1 and 0 or more of 0) in the binary representation.

S [3]: The number that the first representation mode of the higher digits succeeds in the transition sequence of representation mode obtained as a result of the coefficient division. For example, in the case that the representation modes of the division object are −, +, +, −, −, S [3] is 1 (the number of the first representation mode "−" is one).

S [4]: The number that the second representation mode of the higher digits succeeds in the transition sequence of representation mode obtained as a result of the coefficient division. For example, in the case that the representation modes of the division object are −, +, +, −, −, S [4] is 2 (the number of the second representation mode "+" is 2).

Hereafter, similarly, the calculation continues until S [S [1]+2].

In FIG. 15, the addition element representation switch point identification unit 410a identifies the array {S [i]} following the procedures below.

Step S601: Make a given k the object of the coefficient division.

Step S602: Identify and memorize the representation mode of the division object by a similar judgment to the second embodiment ([Guideline for dividing coefficients] in FIG. 8) and at the same time, represent the division object in its representation mode.

Step S 603: Divide the division object into the first addition element (a value multiplied by exponentiation of two) and the second addition element, and at the same time, identify the value of their difference.

Step S604: In order to judge whether all the coefficient division is finished or not, judge whether the second addition that is the next division object can be represented by $3 \times 2^e$.

Step S605: In the case of being judged positively in the above Step S604, make the representation mode of next division object a minus representation and execute the final division of the division object.

Step S606: Finally, in a list of the representation modes of the division object obtained by the coefficient division so far, the array output unit 410b sets the number of the representation modes appeared into S [1]; sets the number of "0" (in binary representation) included in the second addition element obtained by the last coefficient division into S [2]; sets the number that the first representation mode of the higher digits succeeds in the transition sequence of representation mode obtained by the coefficient division into S[3]; and similarly sets the number that the second representation mode of the higher digits succeeds into S [4]; . . . , and sets the number that the representation mode of the final division object succeeds into S [S [1]+2], and the array output unit 410b outputs to the scalar multiplication unit 420.

Step S607: In the case of being judged negatively in Step S604, in order to continue further the coefficient division, make the second addition element a new division object and repeat the similar procedures (Step S602~S604).

The scalar multiplication unit 420 is a calculation unit that calculates and outputs the final calculation result k*G by repeating the addition on the elliptic curve based on the calculation procedures {S [i]} and comprises a table memorizing unit 420b that memorizes in advance what are multiplied by exponentiation of two against the point G ($2^i*G$; i=1, 2, . . . ; but only x coordinate); a temporary memorizing unit 420c that is working memory; an elliptic curve addition unit 420d that is an adder to perform addition on the elliptic curve; and a calculation control unit 420a that controls each component 420b~420d complying with the calculation procedures {S [i]} from the calculation procedure generation unit 410.

Figure 16:
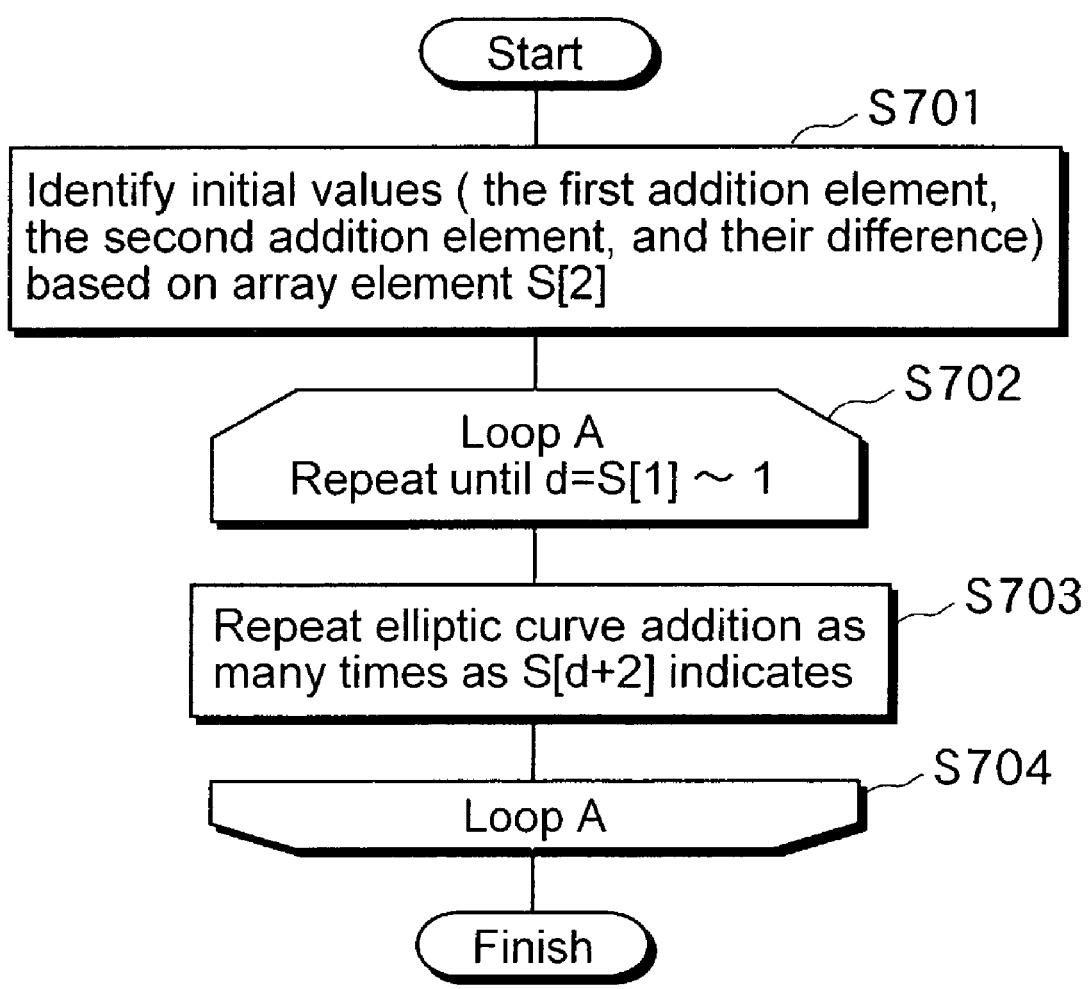
FIG. 16 is a flowchart that shows the operations of a scalar multiplication unit of the elliptic curve calculation device.

This scalar multiplication unit 420 calculates k*G complying with the flowchart shown in FIG. 16. To be more specific, the calculation control unit 420a calculates and controls by the steps below.

Step S701: Identify the first addition element, the second addition element, and their difference that are required to perform the first elliptic curve addition based on the array element S [2] provided by the calculation procedure generation unit 410.

Steps S702~S704: Repeat the same type of elliptic curve addition as many times as the array S [1] provided by the calculation procedure generation unit 410 indicates.

Step S703: In the ith elliptic curve addition in the S [1] times of the elliptic curve addition, repeat the same type of elliptic curve addition as many times as the array element S [i+2] indicates.

2. Operations of the Elliptic Curve Calculation Device 400 to a Concrete Example of Value Next, the operations of the elliptic curve calculation device 400 according to the third embodiment are explained using the concrete example of value and a calculation flowchart.

For a start, processing of the calculation procedure generation unit 410 is explained.

Figure 17:
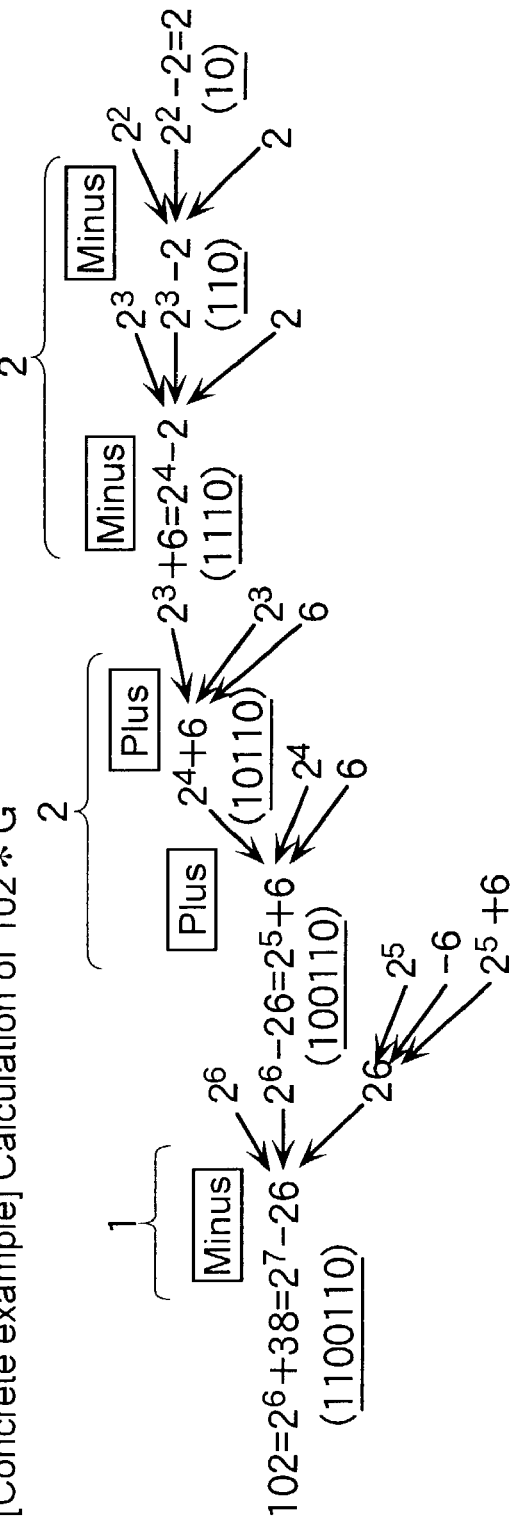
FIG. 17 is a calculation flowchart that shows a generation process of a calculation procedure (an array {S[i]}) by a calculation procedure generation unit of the elliptic curve calculation device.

FIG. 17 is the calculation flowchart that shows the generation process of the calculation procedure (an array {S [i]}) of the calculation procedure generation unit 410. As is understandable when the calculation flowchart indicated in the upper part of FIG. 17 [Concrete example] is compared with the calculation flowchart indicated in FIG. 13, the basic processing of the coefficient division according to the third embodiment is similar to that of the second embodiment. In other words, the calculation procedure generation unit 410 repeats the division of the coefficient k by two, and at this moment, the calculation procedure generation unit 410 represents the coefficient by a plus representation in the case that the highest two digits are "10", while the calculation procedure generation unit 410 represents the coefficient by a minus representation in the case that the highest two digits are "11" and then executes the coefficient division.

Here, the calculation procedure generation unit 410, in the coefficient division, does not generate an array that shows the representation mode switches from what to what, but generates the information that by how many times of steps (division) the representation modes switch as an array {S [i]} as is indicated in the lower part of FIG. 17 [Generation of an array (generation of a calculation procedure)].

To be more specific, as for the coefficient "102", the representation modes transition, in conjunction with the coefficient division, in the order of a minus representation, a plus representation, a plus representation, a minus representation, and a minus representation, the calculation procedure generation unit 410 identifies (1, 2, 2) and sets to the array elements, S [3], S [4], and S [5], respectively. Then, the calculation procedure generation unit 410 sets "3", the total number just set, into the array element S [1], and at the same time, sets "1", the number of "0" included in an addition element "2" ("10" in the binary representation) obtained at the end of the coefficient division, into the array element S [2], and outputs the array {S[i]} that shows the calculation procedure.

Next, processing of the scalar multiplication unit 420 is explained.

Figure 18:
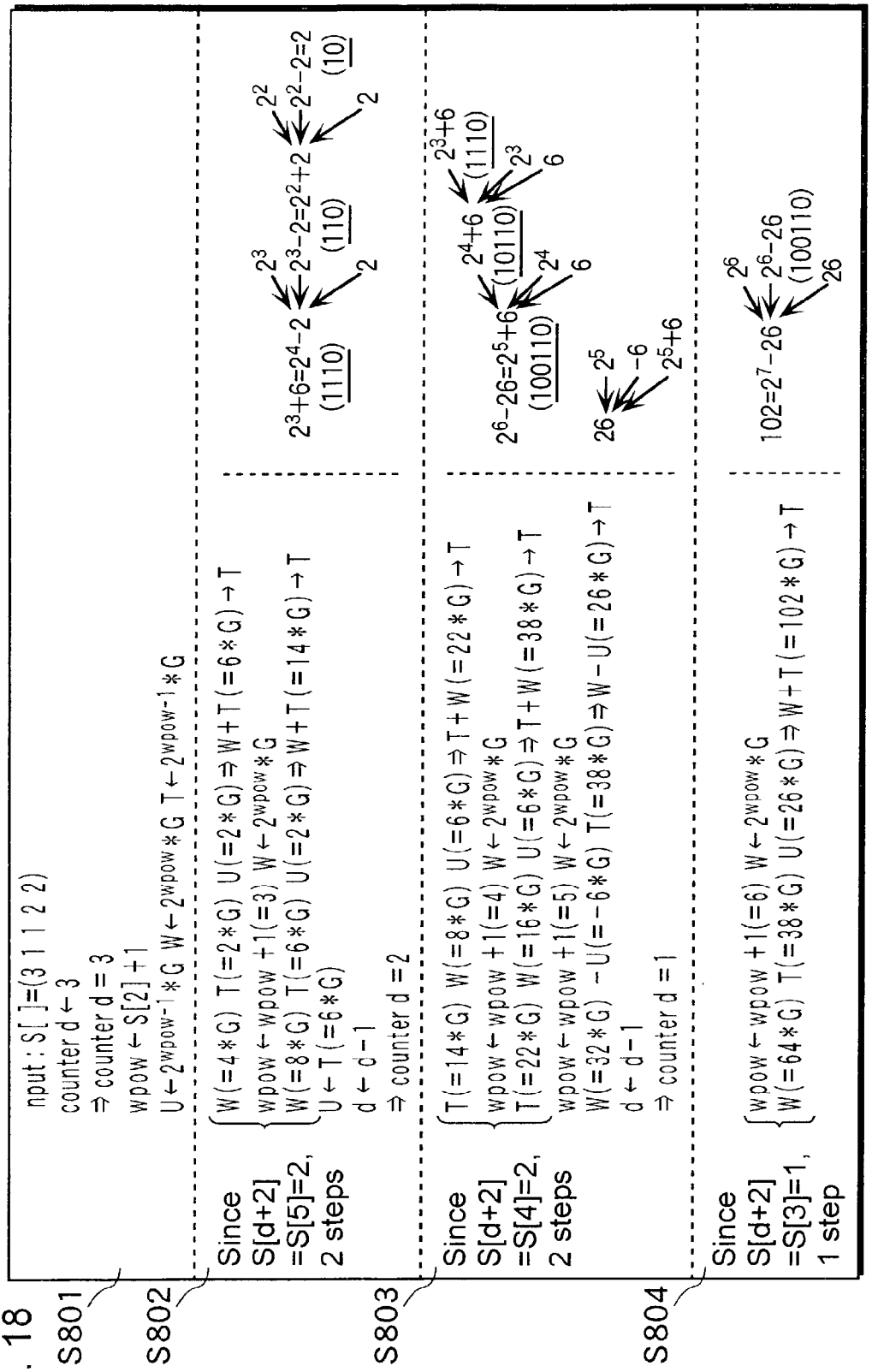
FIG. 18 is a diagram that shows the operations of a scalar multiplication unit corresponding to the concrete example shown in FIG. 17.

FIG. 18 is a diagram that shows the operations of a scalar multiplication unit 420 corresponding to the concrete example shown in FIG. 17. In other words, FIG. 18 shows the calculation process and intermediate values from the time when the scalar multiplication unit 420 receives the array (3, 1, 1, 2, 2) indicated in FIG. 17 and to the time when it calculates the value of 102*G complying with the flowchart indicated in FIG. 16.

After the scalar multiplication unit 420 initializes the repetition number of times d of the same type elliptic curve addition, based on the array element S [1] provided by the calculation procedure generation unit 410, the scalar multiplication unit 420 identifies the first addition element W, the second addition element T, and their difference U and so forth that are required to perform the first elliptic curve addition (Step S801).

Then, since S [3+2]=2, the scalar multiplication unit 420 performs two times of the elliptic curve addition that generate the addition values in the minus representation and updates the difference value U (Step S802).

Subsequently, since S[2+2]=2, the scalar multiplication unit 420 performs two times of the elliptic curve addition that generate the addition values in the plus representation and updates the difference value U (Step S803).

Finally, since S [1+2]=1, the scalar multiplication unit 420 performs one elliptic curve addition in the minus representation and outputs the obtained addition result T as the final result (102*G) (Step S804).

4. The Effects of the Third Embodiment

As is apparent from the processing of the scalar multiplication unit 420, in the repetition of the elliptic curve addition, $2^i*G$ appears every addition, similarly to the first and second embodiments, the elliptic curve calculation device 400 according to the present embodiment uses effectively the table of the coordinates of $2^i*G$ (i=1, 2, ..., n−1). As a result, the calculation quantity is reduced and the calculation speed is about 1.3 times faster than the Prior Art 3.

The different point from the elliptic curve calculation device 200 according to the first embodiment is that the description of the processing by the elliptic curve device 400 is more suitable for a calculation machine (the processing associated with the binary representation). Additionally, the different point from the elliptic curve calculation device 300 according to the second embodiment is that the representation of the calculation procedure by the calculation procedure generation unit 410 is expressed in a compressed and short form. As a result, the programming is easier and the number of intermediate values that is required in the calculation process is suppressed.

As is stated above, by the third embodiment, it is possible to realize the fast elliptic curve calculation and further its processing is suitable for a calculating machine and, at the same time, it is possible to calculate in a smaller working memory area, and therefore, the practical value of the present invention is extremely high.

The Fourth Embodiment

Next, an elliptic curve calculation device according to the fourth embodiment of the present invention is explained.

1. The Structure and Operations of the Elliptic Curve Calculation Device 500

Figure 19:
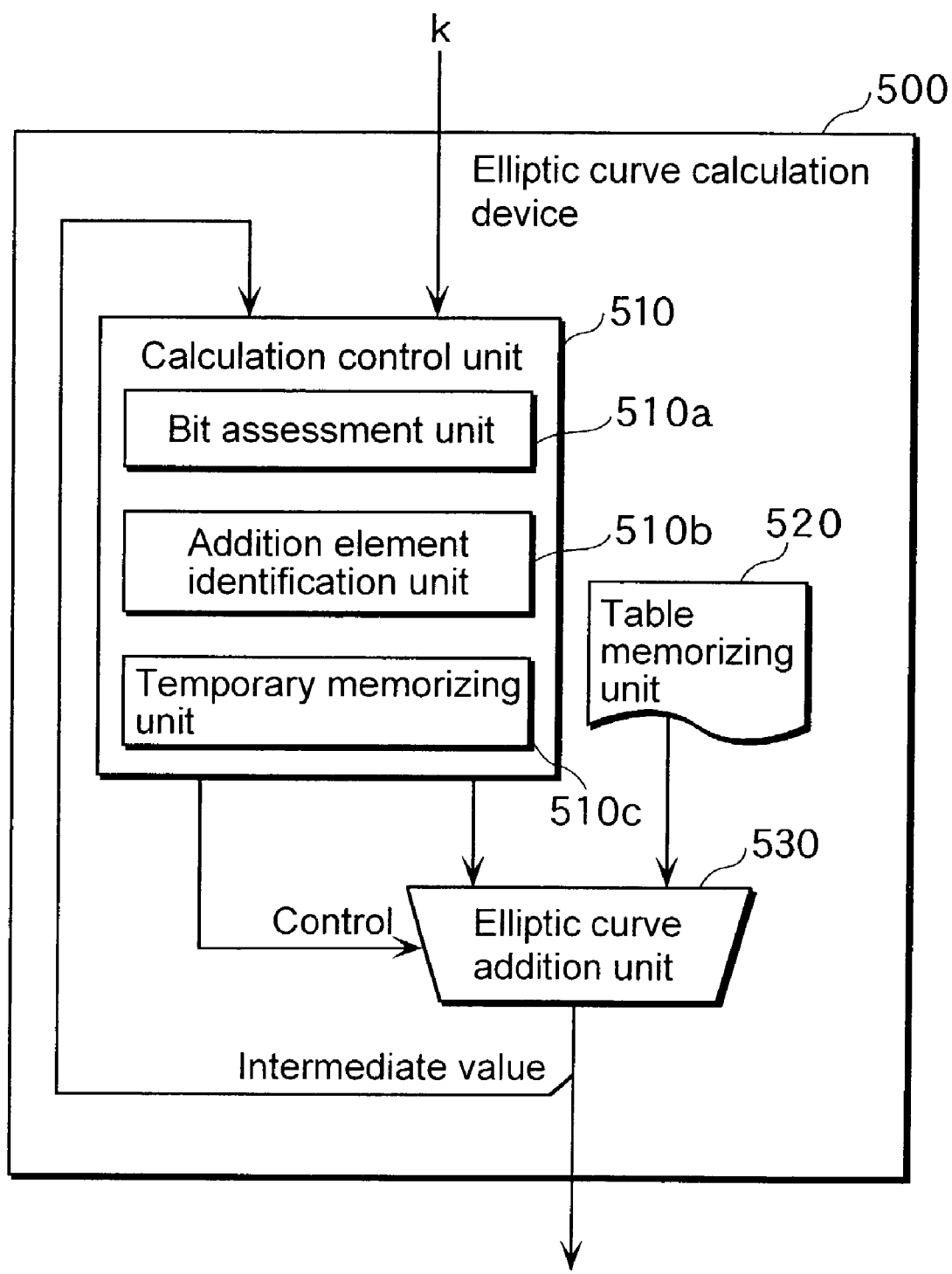
FIG. 19 is a function block diagram that shows the structure of an elliptic curve calculation device according to the fourth embodiment of the elliptic curve calculation device.

FIG. 19 is a block diagram that shows the structure of the elliptic curve calculation device 500 according to the fourth embodiment. This elliptic curve calculation device 500 is, similarly to the embodiments 1~3, a calculation device that is realized by logic circuits like a computer device or LSI and so forth that execute a special purpose program, and to which a parameter p (a prime number) of a Montgomery-type elliptic curve E: $B\times y^2=x^3+A\times x^2+x$ on the finite field GF (p), elements A and B on GF (p), a point G that belongs to E (GF (p)), and the x coordinate of points multiplied by exponentiation of two against the point G: $(2^i)*G$ (i=1, 2, . . . , n−1) are given in advance, and that receives an arbitrary number k of n bits and outputs the x coordinate of a scalar-multiplied point against the point G, k*G. The elliptic curve calculation device 500 has a characteristic that it calculates effectively using the points multiplied by exponentiation of two against the point G, $(2^i)*G$, and comprises a calculation control unit 510, a table memorizing unit 520, and an elliptic curve addition unit 530.

Being different from the embodiments 1~3, this elliptic curve calculation device 500 does not generate a series of calculation procedures in advance based on a preliminary calculation for the scalar multiplication of the point G, but repeats the elliptic curve addition, analyzing a given k from the lower digit to the higher digit, and calculates the final result, k*G. In other words, the elliptic curve calculation device 500 obtains the final result not by the two steps, generation of the calculation procedure and the elliptic curve addition, but only by the elliptic curve addition.

The calculation control unit 510 is a processing unit that performs a temporary processing to calculate k*G for a given coefficient k and controls the elliptic curve addition unit 530 and comprises: a bit assessment unit 510*a* that assesses the value of each bit (1/0) in the binary representation of the coefficient k; a addition element identification unit 510*b* that identifies the three elements that are required to perform an elliptic curve addition (two addition elements and their difference); and a temporary memorizing unit 510*c* that is working memory.

The table memorizing unit 520 is a table that memorizes in advance what are multiplied by exponentiation of two against the point G ($2^i*G$; i=1, 2, . . . ; but only x coordinate) and that is similar to the table memorizing unit 220*b* of the first embodiment and so forth.

The elliptic curve addition unit 530 is an adder and so forth that performs addition on the elliptic curve using the value that the calculation control unit 510 instructs and the value that is read out from the table memorizing unit 520, complying with the control by the calculation control unit 510.

Figure 20:
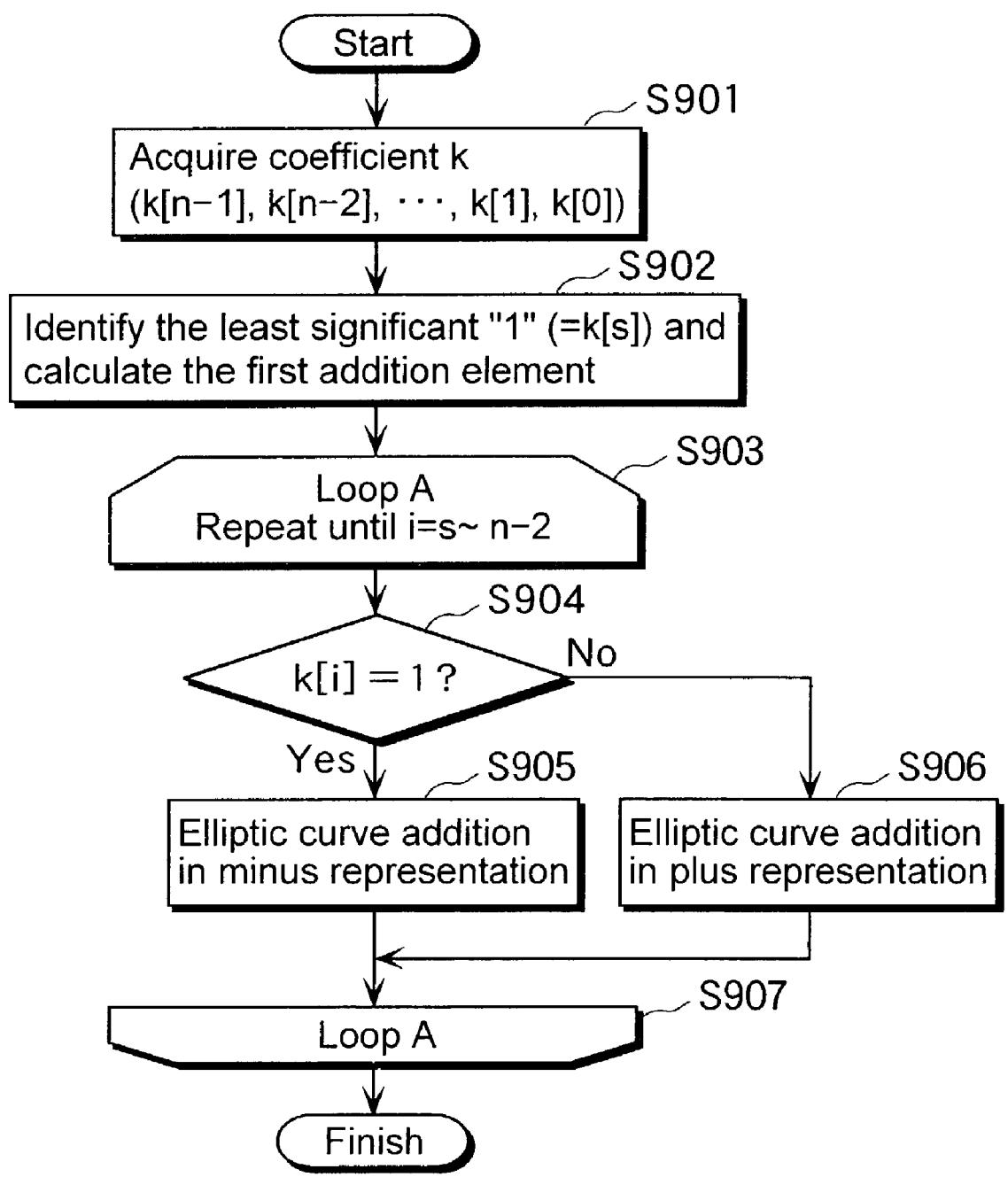
FIG. 20 is a flowchart that shows the operations of the elliptic curve calculation device.

FIG. 20 is a flowchart that shows operations by the elliptic curve calculation device 500 according to the third embodiment.

Step S901: The calculation control unit 510 acquires a coefficient k.

Step S902: Identify the least significant "1" in the binary representation of the acquired coefficient k and suppose its digit is k [s]. Then, identify the value $2^s$ that corresponds with the digit k [s] as the first addition object (the element added to exponentiation of two).

Steps S903~S907: Subsequently, repeat the elliptic curve addition that corresponds with the value of digit k [i] (1/0) consequently from its digit k [s] to the second most significant k [n−2] (Steps S904~S906).

Step S904: To be more specific, for a start, the bit assessment unit 510*a* assesses whether the digit k [i] is 1 or 0.

Step S905: As a result, in the case of being assessed k [s]=1, the addition element assessment unit 510*b* identifies the addition elements with the addition objects in the minus representation. In other words, in the case of representing the addition object as $2^{s+1}-d$, the addition element assessment unit 510*b* generates $2^{s+1}-d$, $2^{s+1}$, and d as the elements required to perform an elliptic curve addition. Then, the addition element assessment unit 510*b* provides the elliptic curve addition unit 530 with these values and a control instruction to perform an elliptic curve addition using them. Moreover, the elliptic curve addition unit 530, as for what are multiplied by exponentiation of two against the point G, uses the values read out from the table memorizing unit 520 complying with the instruction from the addition element identification unit 510*b*.

Step S906: On the contrary, in the case of being assessed k [s]=0, the addition element assessment unit 510*b* identifies the addition elements with the addition object in the plus representation. In other words, in the case of representing the addition object as $2^s+d$, the addition element assessment unit 510*b* generates $2^s+d$, $2^s$, and $d$ as the elements required to perform an elliptic curve addition. Then, the addition element assessment unit 510*b* provides the elliptic curve addition unit 530 with these values and a control instruction to perform an elliptic curve addition using them.

Moreover, the intermediate values and so forth obtained by the elliptic curve addition are memorized in the temporary memorizing unit 510*c* and are used in the next elliptic curve addition.

Figure 21:
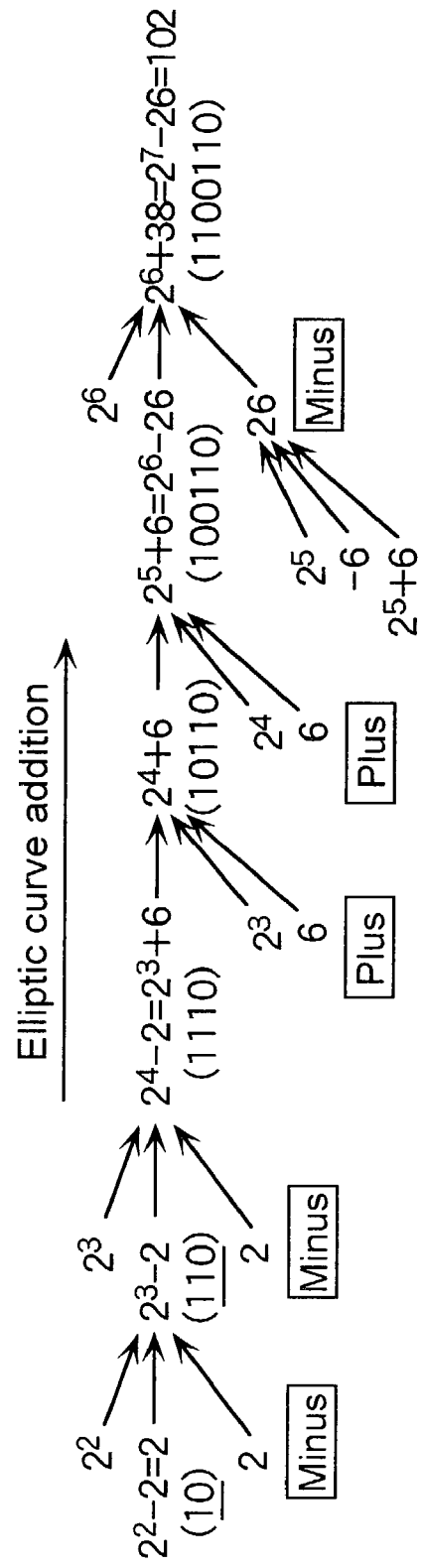
FIG. 21 is a calculation flowchart that shows the operations of the elliptic curve calculation device.

2. Operations of the Elliptic Curve Calculation Device 500 to a Concrete Example of Value FIG. 21 is a calculation flowchart that shows the operations of the elliptic curve calculation device 500 to the concrete example of value. This elliptic curve calculation device 500 repeats the elliptic curve addition of what are multiplied by exponentiation of two against the point G to the obtained result in order to calculate k*G, referring to the coefficient k from the least significant digit in sequence, and at the time, as is indicated in the upper part of FIG. 21 [Guideline for the elliptic curve addition], in the case that the value of the coefficient k [i] on which attention is focused is "1", the elliptic curve calculating device 500 performs the elliptic curve addition after expressing the addition object (the initial value of the addition or the value obtained by the previous elliptic curve addition) in the plus representation while in the case that the value of the coefficient k [i] on which attention is focused is "0", the elliptic curve calculating device 500 performs the elliptic curve addition after expressing the addition object in the minus representation.

To be more specific, as is indicated in the lower part of FIG. 21 [Concrete example], the calculation control unit 510, for a start, identifies the least significant "1" in the binary representation of the given coefficient k (here, k [s]; s=1) and identifies the value 21 corresponding to its digit k [s] as the first addition object (the element added to exponentiation of two).

Subsequently, from its digit k [1] to k [5] in sequence, the elliptic curve calculation device 500 repeats the elliptic curve addition in response to the value of digit k [i] (1/0).

To be more specific, for a start, the bit assessment unit 510*a* assesses the digit k [1]. As a result, in the case of being assessed k [s]=0, the addition element identification unit 510*b* identifies the addition elements with the addition objects in the minus representation. To be more specific, the addition element identification unit 510*b* generates $2^{1+1}-2*G$, $2^{1+1}*G$, and 2*G as the elements required to perform an elliptic curve addition and has the elliptic curve addition unit 530 perform the elliptic curve addition.

Subsequently, the bit assessment unit 510*b* assesses the next higher digit k [2]. As a result, in the case of being assessed k [s]=0, the addition element identification unit 510*b* similarly identifies the addition elements with the addition objects in the minus representation. To be more specific, the addition element identification unit 510$b$ generates $2^{2+1}-2*G$, $2^{2+1}*G$, and $2*G$ as the elements required to perform an elliptic curve addition and has the elliptic curve addition unit 530 perform the elliptic curve addition.

Subsequently, the bit assessment unit 510$b$ assesses the next higher digit k [3]. As a result, in the case of being assessed k [1]=1, the addition element identification unit 510$b$ identifies the addition elements with the addition objects in the plus representation. To be more specific, the addition element identification unit 510$b$ generates $(2^3+6)*G$, $2^3*G$, and $6*G$ as the elements required to perform an elliptic curve addition and has the elliptic curve addition unit 530 perform the elliptic curve addition.

By this means, from k [1] to k [5], the final value k*G is calculated by repeating the elliptic curve addition using the plus representation or the minus representation.

3. The Effects of the Fourth Embodiment

In the repetition of the elliptic curve addition, $2^i*G$ appears every addition, similarly to the embodiments 1~3, the elliptic curve calculation device 500 according to the present embodiment uses effectively the table of the coordinates of $2^i*G$ (i=1, 2, ..., n−1). As a result, the calculation quantity is reduced and the calculation speed is about 1.3 times faster than the Prior Art 3.

Being different from the embodiments 1~3, the elliptic curve calculation device 500 does not perform the preliminary calculation that generates a series of the calculation procedures by one operation. The present embodiment does not generate the calculation procedures by one operation, but generates the calculation procedures (judges the representation modes) of each elliptic curve addition using the scalar multiplication in a distributed manner. In doing this, the preliminary calculation and the scalar multiplication blend together, and only the parameters required of each elliptic curve addition are generated and used, and the size of program and circuit is reduced, and the processing speed can increase.

As is stated above, by the fourth embodiment, it is possible to realize the fast elliptic curve calculation and further its processing is suitable for a calculating machine and, at the same time, it is possible to realize by a smaller program and circuit, and therefore, the practical value of the present invention is extremely high.

The Fifth Embodiment

Next, an elliptic curve calculation device according to the fifth embodiment of the present invention is explained.

1. The Structure and Operations of the Elliptic Curve Calculation Device 600

Figure 22:
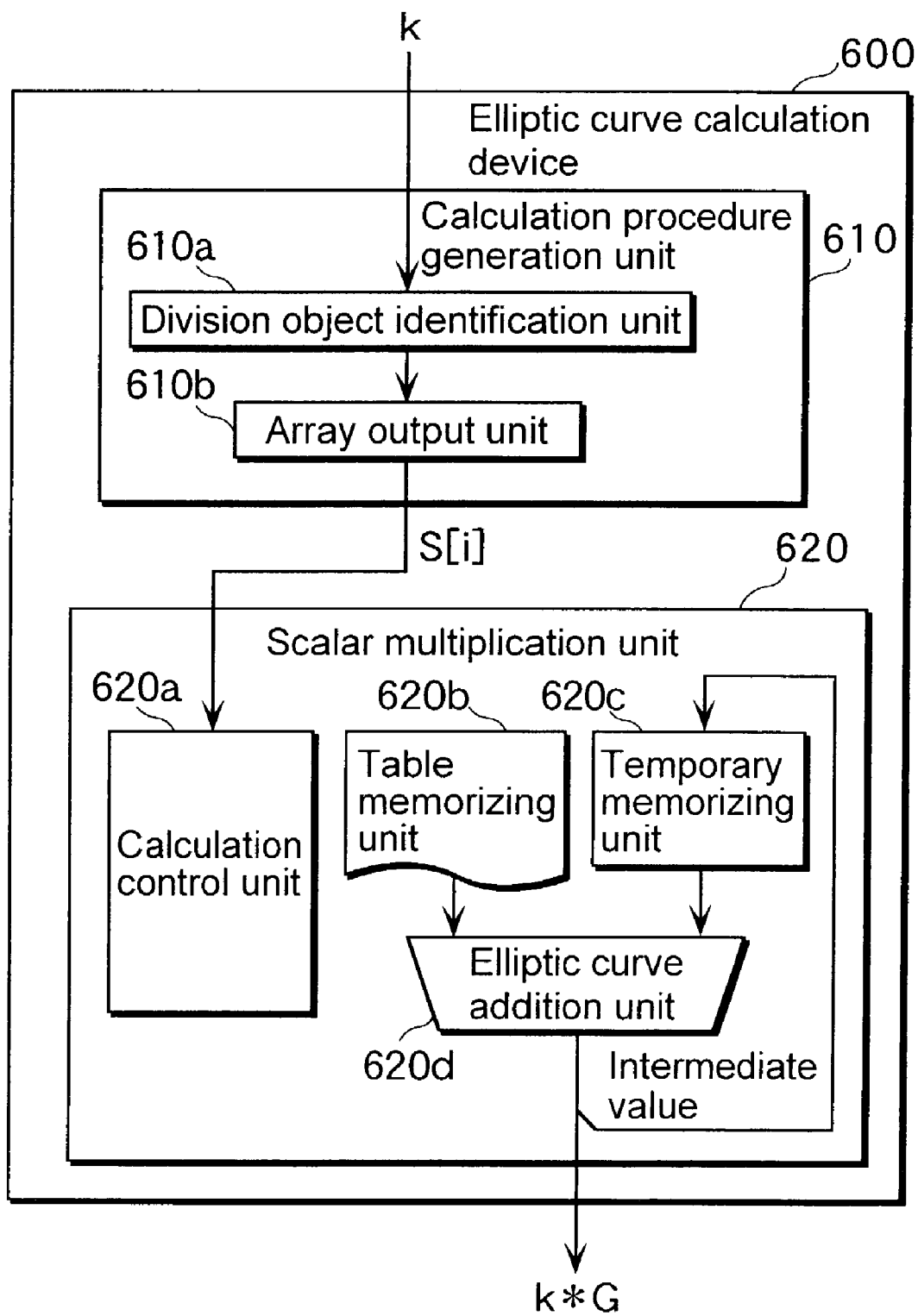
FIG. 22 is a function block diagram that shows the structure of an elliptic curve calculation device according to the fifth embodiment of the elliptic curve calculation device.

FIG. 22 is a block diagram that shows the structure of the elliptic curve calculation device 600 according to the fifth embodiment. This elliptic curve calculation device 600 is, similarly to the first embodiment, a calculation device that is realized by logic circuits like a computer device or LSI and so forth that execute a special purpose program, and to which a parameter p (a prime number) of a Montgomery-type elliptic curve E: $B \times y^2 = x^3 + A \times x^2 + x$ on the finite field GF (p), elements A and B on GF (p), a point G that belongs to E (GF (p)), and the x coordinates of points of a certain multiple against the point G are given in advance, and that receives an arbitrary number k of n bits and outputs the x coordinate of a scalar-multiplied point against the point G, k*G. The elliptic curve calculation device 600 has a characteristic that it calculates using effectively the points of a certain multiple against the point G, and comprises a calculation procedure generation unit 610 and a scalar multiplication unit 620.

This elliptic curve calculation device 600 is common to the first embodiment in the point that it uses the values of a certain multiple against the point G that it holds in advance but the elliptic curve calculation device 600 is different from the first embodiment in the point that these values are $2*G$ and $(2^{i+1}+2^i)*G$ (here, i=0, 1, 2, ..., n−1) while the values that the first embodiment holds in advance are $2^i*G$ (here, i=1, 2, ..., n−1).

The calculation procedure generation unit 610 is a processing unit that executes a preliminary calculation to generate a calculation procedure to calculate the scalar-multiplied points against the point G, k*G and that comprises a division object identification unit 610$a$ that repeats the division of k*G into an addition form using a certain multiple against G, namely, $2*G$ or $(2^{i+1}+2^i)*G$ and, at the same time, identifies the division type, namely, whether the division object at that time is the addition element obtained by a division or the difference of two addition elements, and an array output unit 610$b$ that outputs the division type identified by the division object identification unit 610$a$.

Figure 23:
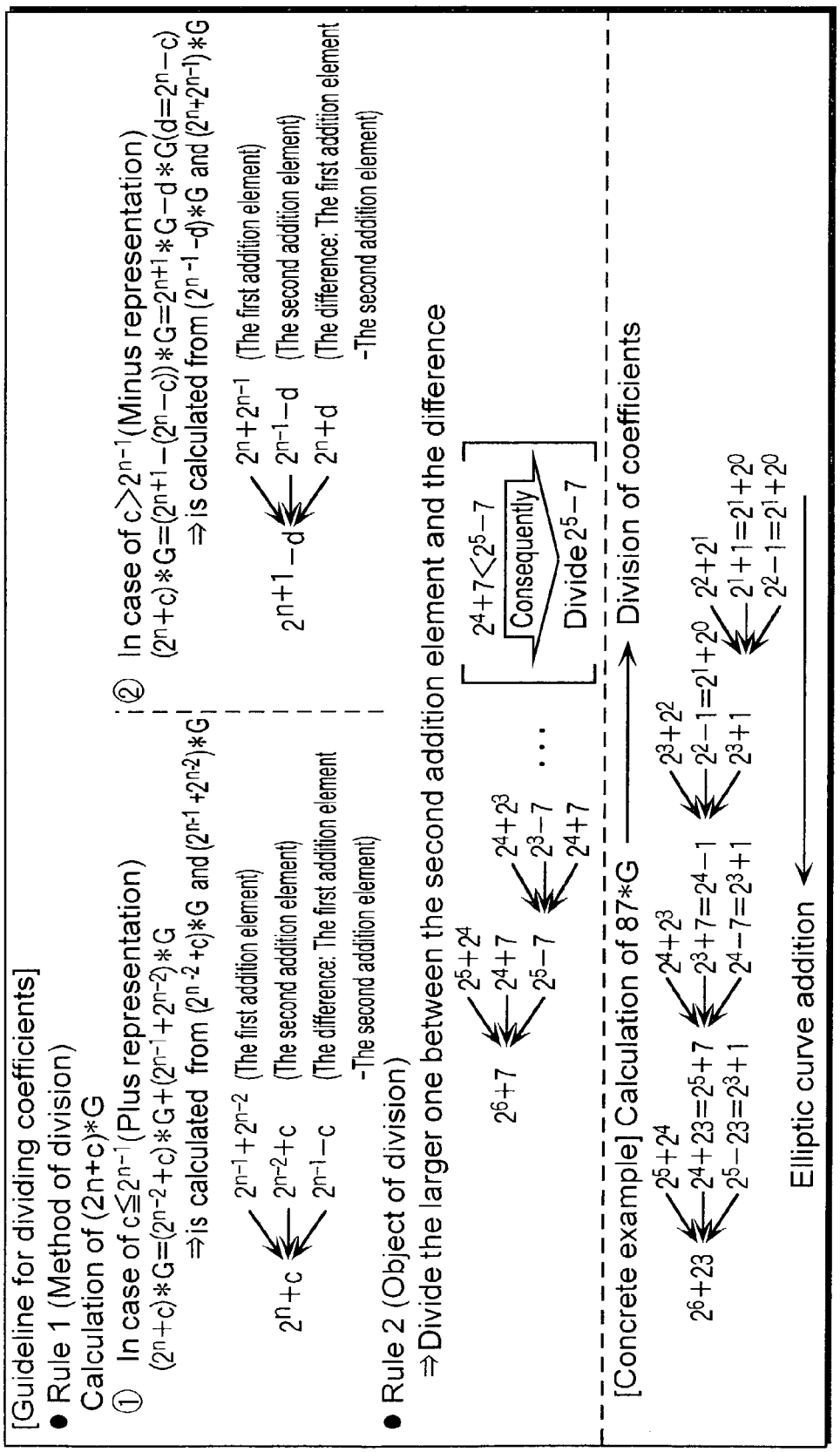
FIG. 23 is a calculation flowchart that shows the method for dividing a coefficient by a calculation procedure generation unit of the elliptic curve calculation device.

FIG. 23 is a calculation flowchart that shows the method for dividing a coefficient by the calculation procedure generation unit 610. In the present embodiment, the calculation procedure generation unit 610$a$ performs the coefficient division complying with the next two rules.

The rule 1 is about the method for division. Here, as the rule 1 of the upper part of FIG. 23 [Guideline for dividing coefficients] indicates, in the case of $c \leq -2^{n-1}$, the division object identification unit 610$a$ divides the division object $(2^n+c)*G$ into the addition elements of the plus representation, namely, $(2^{n-2}+c)*G$ and $(2^{n-1}+2^{n-2})*G$, and in the case of $c > 2^{n-1}$, the division object identification unit 610$a$ divides the division object $(2^n+c)*G$ into the addition elements of the minus representation, namely, $(2^{n-1}+d)*G$ and $(2^n+2^{n-1})*G$ (here, $d=2^n-c$).

Like this, the division object is divided in order that at least one of the addition elements obtained by the division is the sum of the two consecutive exponentiation of two, $(2^{n-1}+2^{n-2})$. In other words, the division object is divided into an addition element whose coefficient is the sum of exponentiation of two, $(2^{n-1}+2^{n-2})$ (hereafter it is called "the first addition element") and an addition element whose coefficient is not sum of exponentiation of two, $(2^{n-1}+2^{n-2})$ (hereafter it is called "the second addition element"). Moreover, the purpose of generating the two consecutive exponentiation of two, $(2^{n-1}+2^{n-2})$ is, as is described later, to perform an elliptic curve addition using effectively a memorizing table that holds the values of coefficient multiple against the point G like this in advance.

The rule 2 is about the division object. Here, the division object identification unit 610$a$ divides, as the rule 2 of the upper part of FIG. 23 [Guideline for dividing coefficients] indicates, the larger one between (i) the second addition element and (ii) the difference between the first addition element and the second addition element. In other words, the division object identification unit 610$a$ compares the second addition element and the above-mentioned difference and repeats the processing to divide the larger one. In doing this, the number of the coefficient division is reduced.

To be more specific, as the rule 2 of FIG. 23 indicates, among the first addition element $(2^5+2^4)$, the second addition element $(2^4+7)$, and the difference $(2^5-7)$ that are obtained by dividing $(2^6+7)$, the division object identification unit 610$a$ compares the second addition element ($2^4+7$) and the difference ($2^5-7$) and repeats the next coefficient division to the larger one ($2^5-7$).

Moreover, the reason why the coefficient division to the value of what is left by the above-mentioned comparison (the smaller one) is needless is that it must appear in the coefficient division that follows (it must become the object of the coefficient division).

A concrete example in the case of dividing a coefficient complying with the above-mentioned two rules is indicated in [Concrete example] of FIG. 23. As for 87*G, for a start, the coefficient (87; $2^6+23$) is divided into the first addition element ($2^5+2^4$) and the second addition element ($2^4+23$) and further their difference ($2^5-23$) is calculated and the first coefficient is finished.

Next, the obtained second addition element ($2^4+23=2^5+7$) is compared with the obtained difference ($2^5-23=2^3+1$) and the coefficient division is performed to the larger one ($2^5+7$). As a result, the first addition element ($2^4+2^3$), the second addition element ($2^3+7$), and their difference ($2^4-7$) are obtained.

By this means, the coefficient division is repeated until both of the coefficients of the second addition element and the difference become the sum of the two consecutive exponentiation of two or two. Moreover, after the coefficient division like this is finished, by repeating the elliptic curve addition in the reverse direction to the coefficient division (from the least significant digit to the most significant digit), referring to the memorizing table that will be described later, and finally a scalar-multiplied point against the point G (87*G) is obtained.

Figure 24:
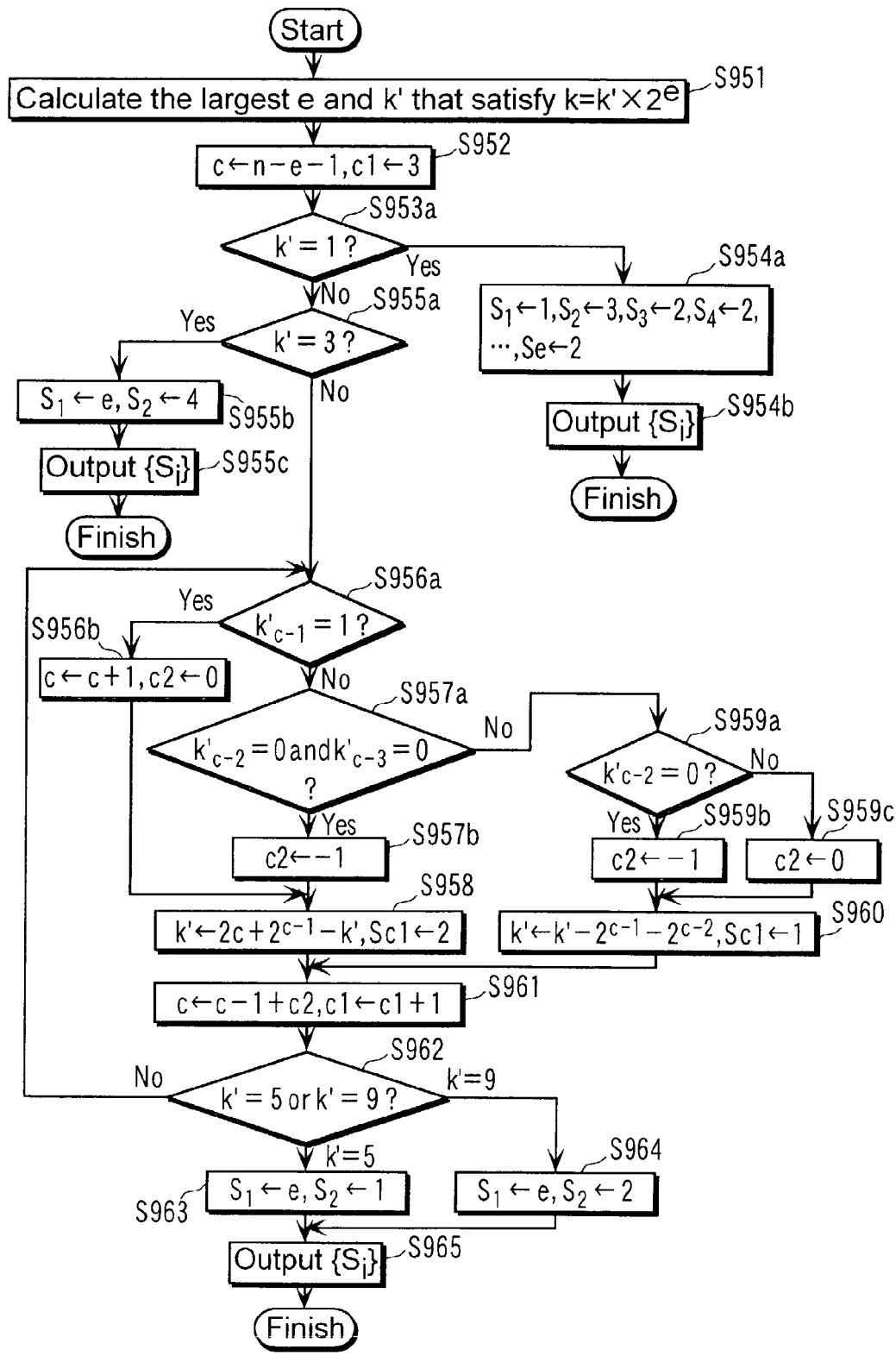
FIG. 24 is a flowchart that shows detailed processing procedures of a calculation procedure generation unit of the elliptic curve calculation device.

FIG. 24 is a flowchart that shows detailed processing procedures of the calculation procedure generation unit 610. Moreover, the calculation procedures generated by the calculation procedure generation unit 610 are expressed by the rules below.

In other words, the calculation procedure generation unit 610 receives an arbitrary integer k of k bits and outputs an array $\{S[i]\}$ (S [i] is the ith number of the array, $1 \leq i \leq |k|$). In the array S [i], S [1] indicates the information about the number of "0" that succeeds from the least significant digit in the binary representation of k, S [2] indicates the division type of the last division object in the coefficient division, and S [i] (i=3, 4, ...) indicates the division type in the ith coefficient division.

To be more specific, S [1] indicates a value e in the case of being expressed as $k=k'\times 2^e$, S [2] indicates the division type in the last division, as is shown below, and S [i] (i=3, 4, ...) indicates, in the ith division, whether what is divided after the division is the second addition object (in this case, S [i]=1 to indicate that it is the first division type) or the difference of the two addition elements (in this case, S [i]=2 to indicate that it is the second division type). Here, as for k [1] and k [2], (1) In the case of k'=1 (it is a special case),
S [1]=1 and S [2]=3, (2) In the case of k'=3 (it is a special case),
S [1]=e and S [2]=4, (3) Other than these (most of the cases),
(a) in the case that the coefficient that is the last division object is $2^2+1$,
S [1]=e and S [2]=2,
(b) in the case that the coefficient that is the last division object is $2^3+1$,
S [1]=e and S [2]=2.

Moreover, in the above-mentioned case (3), it is known that the coefficient that is the last division object is either the above-mentioned (a) or (b).

In FIG. 24, the division object identification unit 610*a* identifies the array $\{S[1]\}$ following the procedures below. Moreover, hereafter, suppose the bit representation of k is [k [n-1], k [n-2], ..., k [1], k[0]] when $k=k[n-1]\times 2^{n-1}+k[n-2]\times 2^{n-2}+...+k[1]\times 2+k[0]$.

Step S951: Calculate k', the largest e that satisfies $k=k'\times 2^e$.

Step S952: Suppose the counter that indicates the position of bit that is processing object is $c \leftarrow n-e-1$ and that the index that designates the element of the array S [i] is $c_1 \leftarrow 3$.

Step S953: Judge whether k'=1. In the case of k'=1, since it corresponds to the above-mentioned case (1), advance on Step S954. Other than that, advance on Step S955.

Step S954: Suppose S [1]$\leftarrow$1, S [2]$\leftarrow$3, S [3]$\leftarrow$2, S [4]$\leftarrow$2, ..., S [e]$\leftarrow$2 (S954*a*), output the array $\{S[i]\}$ (S954*b*), and finish.

Step S955: Judge whether k'=3 (S955*a*). In the case of k'=3, it corresponds to the above-mentioned case (2). Suppose S [1]$\leftarrow$e, S [2]$\leftarrow$4 (S955*b*), output the array $\{S[i]\}$ (S955*c*), and finish.

Step S956: Judge whether k'[c-1]=1 (S956*a*). In the case of k'[c-1]=1, it corresponds to the coefficient division in the minus representation. Suppose $c \leftarrow c+1$ and $c_2 \leftarrow 0$ (S956*b*) and advance on Step S958. Other than that, it corresponds to the coefficient division in the plus representation. Advance on the next step.

Step S957: Judge whether both of k'[c-2]=0 and k'[c-3]=0 hold (S957*a*). In the case that both of them hold, it is the case that what is divided next to this coefficient division is the difference between the two addition elements, and therefore, suppose $c_2 \leftarrow -1$ (S957*b*) and advance on the next step. Other than that, it is the case that what is divided next to this coefficient division is the second addition element, and therefore, advance on Step S959.

Step S958: Suppose $k' \leftarrow 2^c + 2^{c-1} - k'$ and update k'. Set S $[c_1] \leftarrow 2$ and finish the coefficient division by the second division type. Advance on Step S961.

Step S959: Judge whether k'[c-2]=0 is satisfied (S959*a*). In the case that it is satisfied, suppose $c_2 \leftarrow -1$ (S959*b*). In the case that it is not satisfied, suppose $c_2 \leftarrow 0$ (S959*c*).

Step S960: Suppose $k' \leftarrow -2^{c-1} - 2_{c-2}$ and update k'. Set S $[c_1] \leftarrow 1$ and finish the coefficient division by the first division type.

Step S961: In order to move to the next digit, suppose $c \leftarrow c-1+c_2$ and $c_1 \leftarrow c_1+1$.

Step S962: Judge whether k'=5 or k'=9. In the case of k'=5, it corresponds to the above-mentioned case (3) (a), and therefore, advance on the next step. In the case of k'=9, it corresponds to the above-mentioned case (3) (b), and therefore, advance on Step S964. Other than that, since further coefficient division is required, return to Step S956 and repeat the similar processing until the division object becomes "5" or "9".

Step S963: Suppose S [1]$\leftarrow$e and S [2]$\leftarrow$1, output the array $\{S[i]\}$ and finish.

Step S964: Suppose S[1]$\leftarrow$e and S [2]$\leftarrow$2, output the array $\{S[i]\}$ and finish.

The scalar multiplication unit 620 is a calculation unit that calculates and outputs the final calculation result k*G by repeating the addition on the elliptic curve based on the calculation procedures S [i] (i=1, 2, . . . ) and comprises a table memorizing unit 620b that memorizes in advance a certain multiple against the point G; a temporary memorizing unit 620c that is working memory; an elliptic curve addition unit 620d that is an adder to perform addition on the elliptic curve; and a calculation control unit 620a that controls each component 620b~620d complying with the calculation procedures S [i] from the calculation procedure generation unit 610.

Figure 25:
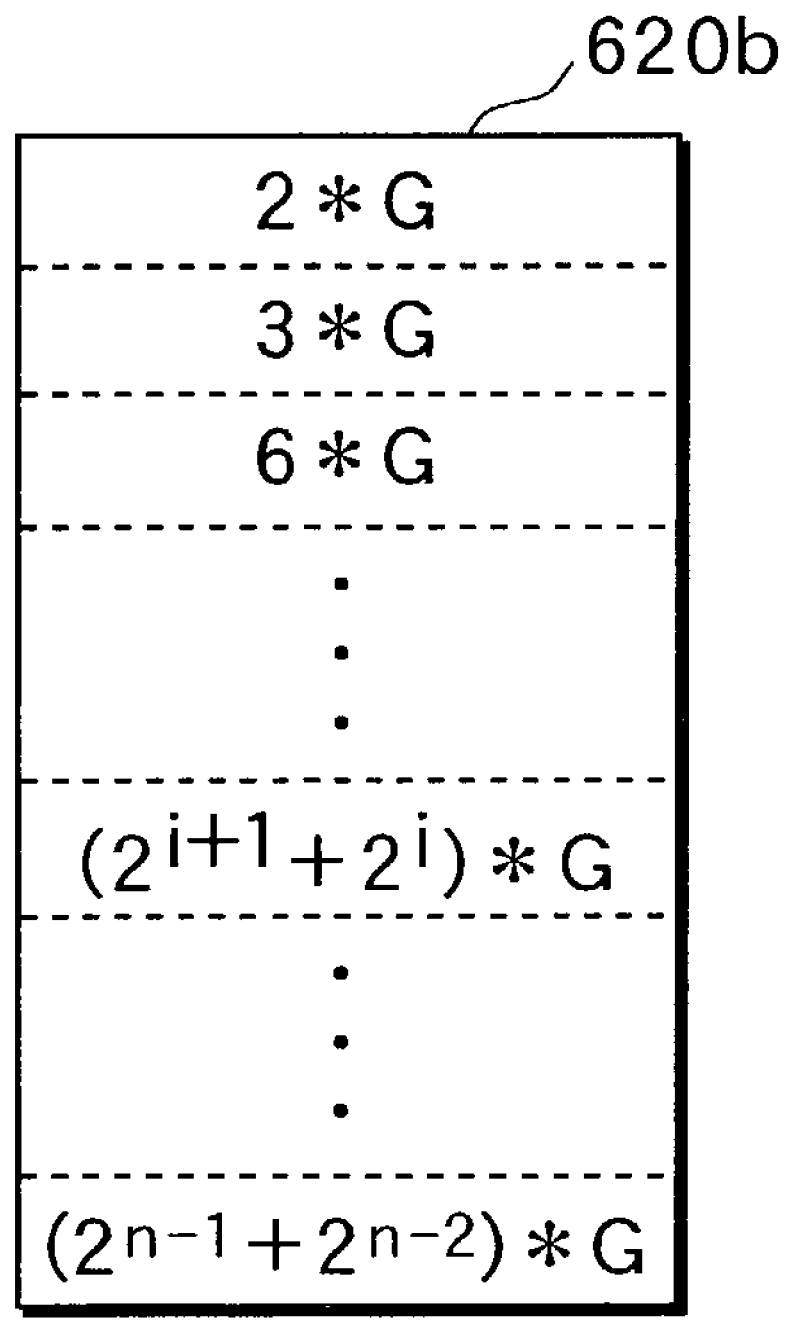
FIG. 25 is a diagram that shows stored data of a table memorizing unit of the elliptic curve calculation device.

The table memorizing unit 620b, as FIG. 25 shows, is a ROM and so forth that memorize in advance the x coordinates of the points of a certain multiple against n pieces of the point G, namely, the x coordinates of 2*G and $(2^{i+1}+21)$*G (here, i=0, 1, 2, . . . , n−2). In other words, the number of values memorized is almost the same but the values are different.

This calculation control unit 620a controls the components 620b~620d in order that each component repeats the elliptic curve addition in the reverse procedures against the calculation flow (the coefficient division) in FIG. 23 by the calculation procedure generation unit 610, namely, from the lower digits to the higher digits, referring to the values stored in the table memorizing unit 620b, and each component calculates k*G. To be more specific, the calculation control unit 620a executes the calculation and the control, following the steps below in order that the scalar multiplication unit 620 operates, following the flowchart of FIG. 26.

Step S971: For a start, assess S [2]. In the case of S [2]=4, it corresponds to the above-mentioned case (2), refer to the table memorizing unit 620b for k*G (S971b), output (S971c), and finish.

Step S972: Suppose e←S [1] (S972a), and then judge whether k [n−2]=1 (S972b). In the case that it is satisfied, suppose the counter that indicates the required number of times (digits) is $c_1$←n−e (S972c). Other than that, suppose $c_1$←n−e−1 (S972d).

Step S973: Judge whether S [2]=3 (S973a). In the case that it is satisfied, it corresponds to the above-mentioned case (1). Suppose U←G, V←2*G, and $c_2$←1 (S973b) and advance on Step S975. Other than that, advance on Step S974. Moreover, in the present flow, U is the parameter that stores the second addition element and V is the parameter that stores the difference between the first addition element and the second addition element. Additionally, 2*G is the value read out from the table memorizing unit 620b.

Step S975: As is stated above, after the initial values U and V are determined, suppose W←$(2^{c_2}+2^{c_2-1})$*G, referring to the table memorizing unit 620b. W is the parameter that stores the first addition element. Moreover, $(2^{c_2}+2^{c_2-1})$*G is the value read out from the table memorizing unit 620b.

Step S976: Judge whether S [$c_1$]=1 is satisfied. In the case that it is satisfied, advance on the next step in order to generate the elliptic curve addition corresponding to the first division type, namely, U, the second addition element. Other than that, advance on Step S978 in order to generate the elliptic curve addition corresponding to the second division type, namely, V, the difference between the two addition elements.

Step S977: Have the elliptic curve addition unit 620d calculate U←W+U (the difference is V) by performing an elliptic curve addition.

Step S978: Suppose T←V, and after that, have the elliptic curve addition unit 620d calculate V←W+U (the difference is V) and suppose U←T.

Step S979: Judge whether $c_1$=3. In the case it is satisfied, advance on Step S981 in order to perform the last elliptic curve addition.

Step S980: Suppose $c_1$←$c_1$−1 and $c_2$←$c_2$+1 and return to Step S975 in order to repeat the similar elliptic curve addition until $c_1$=2 is satisfied.

Step S981: Suppose W←$(2^{c_2}+1+2^{c_2})$*G by referring to the table memorizing unit 620b. Have the elliptic curve addition unit 620d calculate U←W+U (the difference is V) (S981a), output the result U as the final result (S981b) and finish.

Moreover, $(2^{c_2}+2^{c_2-1})$*G is a value read out from the table memorizing unit 620b. Additionally, the concrete calculation methods for the elliptic curve addition used in the above-mentioned steps have been explained in the first embodiment.

The overall operation of the elliptic curve calculation device 600 constructed as is described above is as follows.

The elliptic curve calculation device 600 receives an inputted integer k and inputs the inputted integer k into the calculation procedure generation unit 610. The calculation procedure generation unit 610 calculates the array {S [i]} according to the integer k and inputs the inputted array {S[i]} to the scalar multiplication unit 620. The scalar multiplication unit 620 calculates the scalar-multiplied points against the point G on the elliptic curve, k*G by repeating the elliptic curve addition referring to the values stored in the table memorizing unit 620b according to the inputted array {S [1]}, and outputs k*G.

2. Operations of the Elliptic Curve Calculation Device 600 to a Concrete Example of Value Hereafter, the example of value in the case of k=102 shown in FIG. 27 is indicated.

For a start, the processing of the calculation procedure generation is explained.

Here, the mechanical processing (the bit processing) by the calculation procedure generation unit 610 is not explained, but the explanation is made from the viewpoint of the contents of the meaning.

Figure 27:
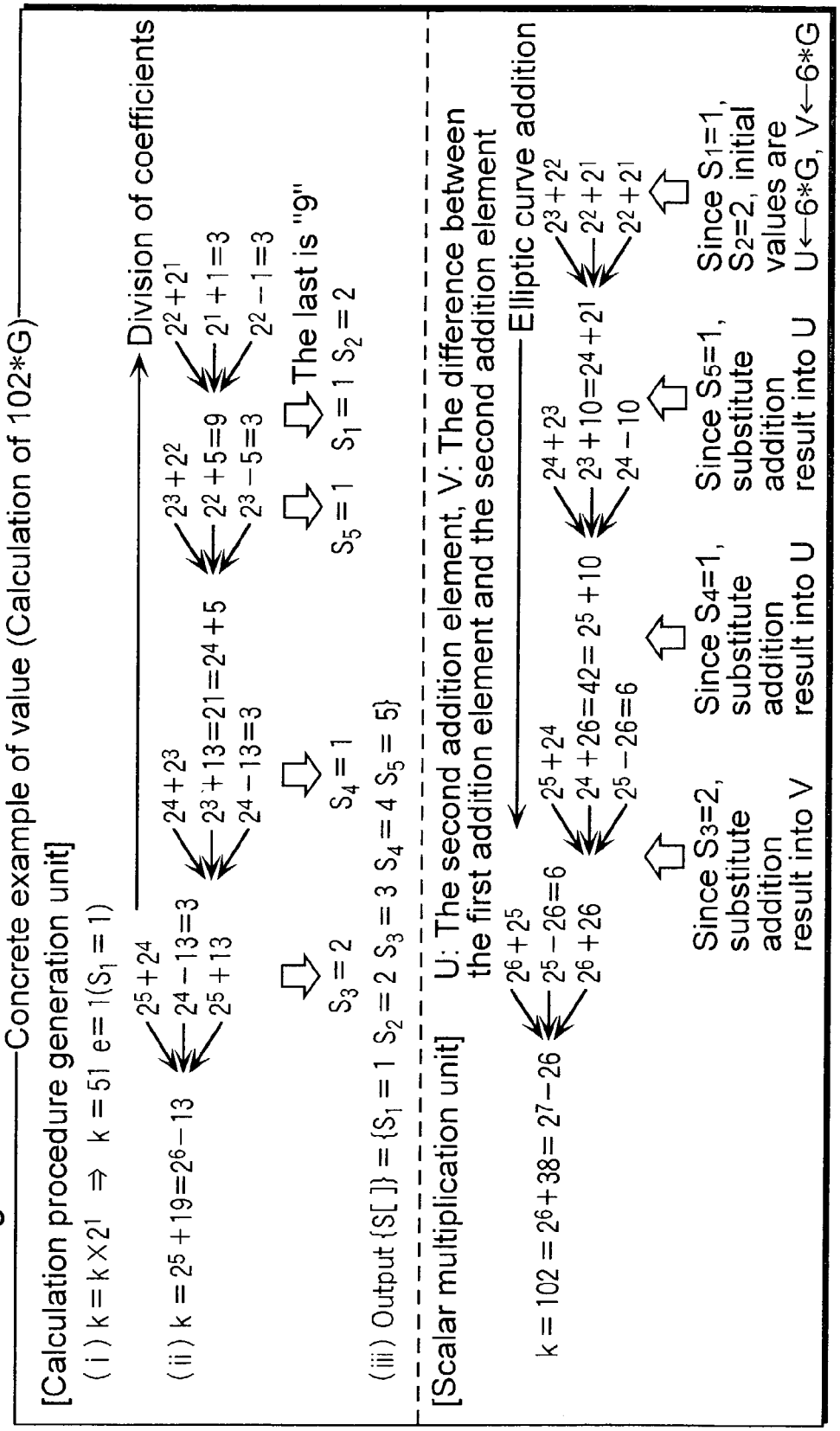
FIG. 27 is a diagram that shows processing of a concrete example of a value by the elliptic curve calculation device.

As is shown in [Calculation procedure generation] of FIG. 27, the division object identification unit 610a identifies k'=51 and e=2 because 102=51×$2^1$ (Step S952). Moreover, since k'=51, k'[5], k'[4], k'[3], k'[2], k'[1] and k'[0] are 1, 1, 0, 0, 1 and 1, respectively.

Next, repeat the coefficient division to k' (Steps S952~S962). For a start, as for k'=51=$2^5$+19, since 19>$2^4$, divide the coefficient division in a minus representation, namely, $2^{5+19=26}$−13 into the coefficient of the first addition element ($2^5$+24) and the coefficient of the second addition element ($2^4$−13), and further calculate their difference ($2^5$+13). Then, compare the coefficient of the second addition element ($2^4$−13) and the difference ($2^5$+13). Since the difference is larger, next divide the difference ($2^5$+13). At the same time, decide the array element (S [3]=2) that indicates the coefficient division by the second division type (Step S958).

Next, as for the coefficient ($2^5$+13) that is the division object, since 13≦$2^4$, perform the coefficient division in the plus representation, namely, the division into the coefficient of the first division element ($2^4$+23) and the coefficient of the second division element ($2^3$+13) and further calculate their difference ($2^4$−13). Then, compare the coefficient of the second addition element ($2^3$+13) and the difference ($2^4$−13).

Since the second addition element is larger, next, divide the second addition element ($2^3+13$). At the same time, decide the array element (S [4]=1) that indicates the coefficient division by the first division type (Step S960).

Hereafter, decide the array element S [5]=1 by repeating the similar coefficient division (Step S960) and obtain the final division object "9". Since this division object "9" corresponds to the above-mentioned case (3) (b), decide S [1]=e=1 and S [2]=2 (Step S964).

Finally, the array output unit 610b outputs the values of the arrays S [1], S [2], S [3], S [4] and S [5] obtained by the coefficient division above, namely, {1, 2, 2, 1, 1} to the scalar multiplication unit 620 (Step S965).

Next, as for the processing of the scalar multiplication unit 620 that has obtained the array {S [i]} from the calculation procedure generation unit 610, the mechanical processing (the bit processing) is not explained, but the explanation is made from the viewpoint of the contents of the meaning.

As is shown in [Scalar multiplication] of FIG. 27, the scalar multiplication unit 620, for a start, obtains the second addition element U (6*G) and the difference between the two addition elements (6*G) as the initial values, according to S [2]=2 and S [1]=1 (Step S974c; here, since S [1]=1, each coefficient is multiplied by two).

Then, the scalar multiplication unit 620 reads out the first addition element W ($2^3+2^2$)*G from the table memorizing unit 620b (Step S975). Since S [5]=1 (Step S976), the scalar multiplication unit 620 performs the elliptic curve addition between the first addition element W ($2^3+2^2$)*G referred to from the table memorizing unit 620b and the second addition element U of the initial values (($2^2+2^1$)*G, and makes the result the second addition element U ($2^4+2^1$)*G (Step S977).

Similarly, since S [4]=1 (Step S976), perform the elliptic curve addition between the first addition element W ($2^4+2^3$) *G referred to from the table memorizing unit 620b and the second addition element U ($2^3+10$)*G calculated immediately before, and make the result the second addition element U ($2^5+10$)*G (Step S977).

Subsequently, since S [3]=2 (Step S976), perform the elliptic curve addition between the first addition element W ($2^5+2^4$)*G referred to from the table memorizing unit 620b and the second addition element U ($2^4+26$)*G calculated immediately before, and make the result the value of difference V ($2^6+26$)*G (Step S978)

Finally, perform the elliptic curve addition between the first addition element W ($2^6+2^5$)*G and the second addition element U ($2^5-26$)*G based on the first addition element W ($2^6+2^5$)*G referred to from the table memorizing unit 620b and the value of difference V ($2^6+26$)*G calculated immediately before (Step S981a), and output the result as the final result ($2^7-26$)*G, namely, the result of 102*G (Step 981b).

As is described above, in the fifth embodiment, the calculation procedure S [i] generated by the calculation procedure generation unit 610 indicates the coefficient division in which the values of what are multiplied by exponentiation of two held in advance do not appear but the value scalar-multiplied only by the sum of the two consecutive exponentiation of two. In doing this, the scalar multiple against the point G, k*G is calculated by the fewer times of elliptic curve addition as compared with the first embodiment.

3. The Effects of the Fifth Embodiment

The elliptic curve calculation device 600 according to the fifth embodiment is 1.5 times faster than the embodiments 1~4 for calculating 102*G as is apparent when, for example, the calculation flow for 102*G by the second embodiment shown in FIG. 13 (six times of addition) is compared with that by the fifth embodiment shown in FIG. 27 (four times of addition). In other words, the elliptic curve calculation device 600 is 2.26 times faster than the Prior Art 3.

Additionally, in the case of calculating 87*G, the elliptic curve calculation device 600 that needs only four times of addition is 1.75 times faster than the embodiments 1~4 that needs seven times of addition and 2.26 times faster than the Prior Art 3.

Moreover, the values stored in the table memorizing unit 620b according to the fifth embodiment are different from those according to the embodiments 1~4, but the number is almost the same, ((n−1) pieces of values are stored in the embodiments 1~4 while n pieces of values are stored in the fifth embodiment), and therefore, the storage capacity is almost same.

As is described above, the fifth embodiment can perform the scalar multiplication against the point G faster than the embodiments 1~4 although the size of the memorizing table is almost same and can be applied to the concealment in real-time conversation and so forth, and therefore, the practical value of the present invention is extremely high.

Moreover, in the fifth embodiment, n pieces of a certain multiple against the point G, namely, 2*G and ($2^{i+1}+2^i$)*G (here, i=0, 1, 2, . . . , n−2) are memorized in the table memorizing unit 620b, but it is acceptable that only part of them are memorized. For example, it is acceptable that the scalar multiplication unit 620 calculates 2*G by performing the double calculation and that the table memorizing unit 620b does not store 2*G. In doing this, the number of the values stored in advance in the table memorizing unit 620b is reduced to (n−1), the same number as the embodiments 1~4.

The Sixth Embodiment

Next, an elliptic curve calculation device according to the sixth embodiment of the present invention is explained.

1. The Structure and the Operations of the Elliptic Curve Calculation Device 700

Figure 28:
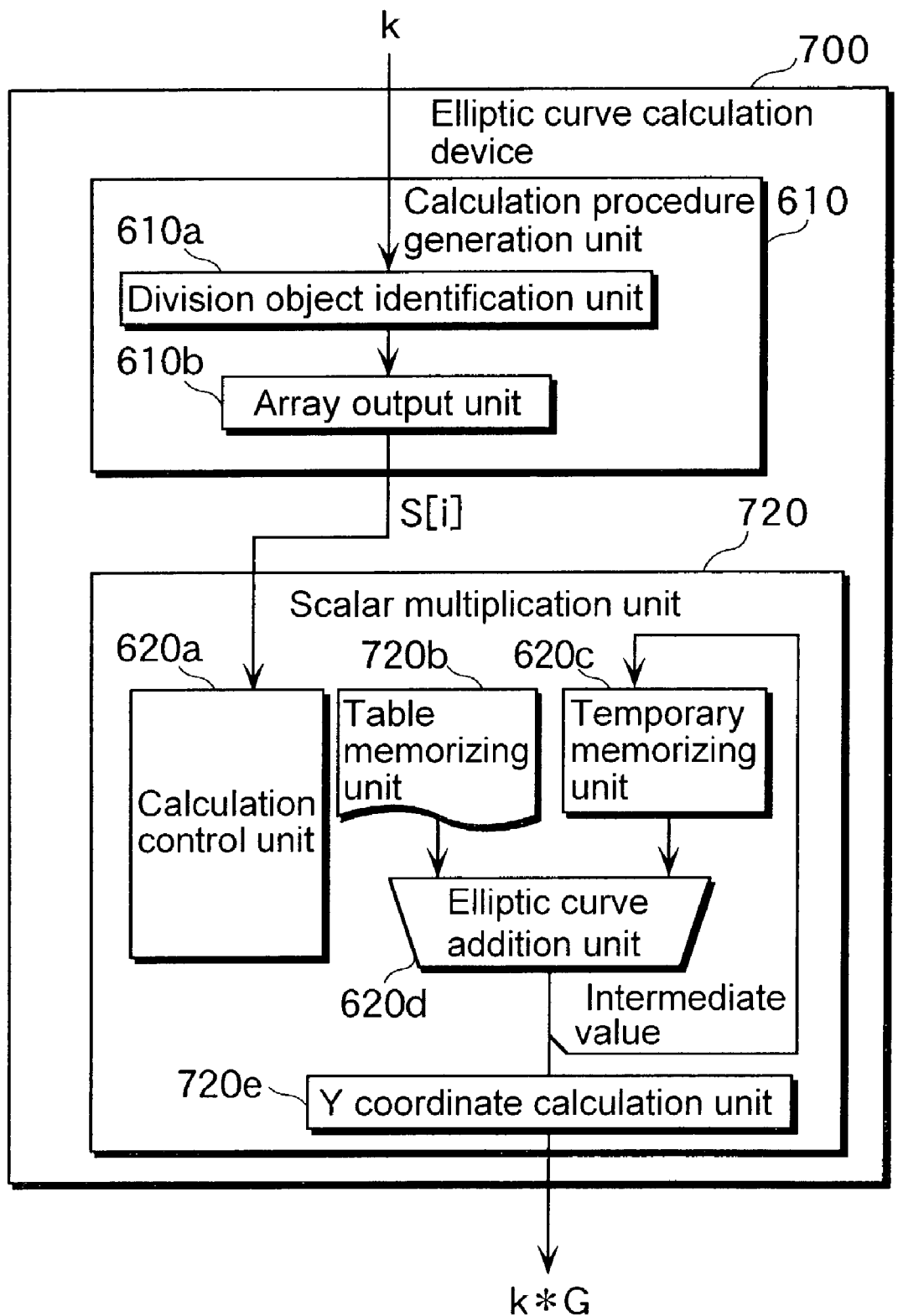
FIG. 28 is a function block diagram that shows the structure of an elliptic curve calculation device according to the sixth embodiment of the present invention.

FIG. 28 is a block diagram that shows the structure of the elliptic curve calculation device 700 according to the sixth embodiment. This elliptic curve calculation device 700 is, similarly to the first embodiment, a calculation device that is realized by logic circuits like a computer device or LSI and so forth that execute a special purpose program, and to which a parameter p (a prime number) of a Montgomery-type elliptic curve E: $B \times y^2 = x^3 + A \times x^2 + x$ on the finite field GF (p), elements A and B on GF (p), a point G that belongs to E (GF (p)), and the points of a certain multiple against the point G are given in advance, and that receives an arbitrary k of n bits and outputs the scalar-multiplied point against the point G, k *G. The elliptic curve calculation device 700 has a characteristic that it calculates using effectively the points of a certain multiple against the point G and, at the same time, outputs not only the x coordinates but also the y coordinates of its scalar-multiplied points, k*G.

In other words, the elliptic curve calculation devices according to the embodiments 1~5 calculate only the x coordinates of the sought scalar-multiplied points k*G but the elliptic curve calculation device 700 according to the sixth embodiment calculates the x coordinates and y coordinates of the sought scalar-multiplied points k*G. The reason is as follows.

Among the encryption systems using an elliptic curve, some need not only the scalar multiplication of a certain point (k*P against the point P, L*Q against the point Q and so forth) but also the addition like k*P+L*Q (for example, the verification of ECDSA and so forth), whereas the Montgomery-type elliptic curve can calculate k*P and L*Q but cannot calculate k*P+L*Q. For that purpose, as for k*P+L*Q, it is required to perform the similar addition to the Weierstrass-type elliptic curve and for the addition, y coordinate is required. In other words, in order to deal with the encryption system that needs to calculate k*P+L*Q, the elliptic curve calculation device 700 calculates not only the x coordinates but also the y coordinates of the scalar-multiplied points k*G.

This elliptic curve calculation device 700 is common to the elliptic curve calculation device 600 according to the fifth embodiment in the points that it repeats to divide k*G into the addition form using a certain multiple against G, namely, 2*G or $(2^{i+1}+2^i)*G$ and that it memorizes 2*G and $(2^{i+1}+2^i)*G$ (here, i=0, 1, 2, ..., n−2) as the values of a certain multiple against the point G that is held in advance. In other words, this elliptic curve calculation device 700 comprises the same calculation procedure generation unit 610 as the elliptic curve calculation device 600 according to the fifth embodiment and a scalar multiplication unit 720 that performs the scalar multiplication with almost the same procedures as the fifth embodiment. Hereafter, for the components that are common to the elliptic curve calculation device 600 according to the fifth embodiment, the same reference characters are attached and their explanation is omitted. The explanation is made focusing attention on the different points.

The scalar multiplication unit 720 is a calculation unit that calculates and outputs the final calculation result k*G by repeating the addition on the elliptic curve based on the calculation procedures S [i] (i=1, 2, ... ) and comprises almost the same components as the scalar multiplication unit 620 but the scalar multiplication unit 720 is different from the scalar multiplication unit 620 in the points that it has an table memorizing unit 720b instead of the table memorizing unit 620b of the fifth embodiment and that it further includes Y coordinate calculation unit 720e.

Figure 29:
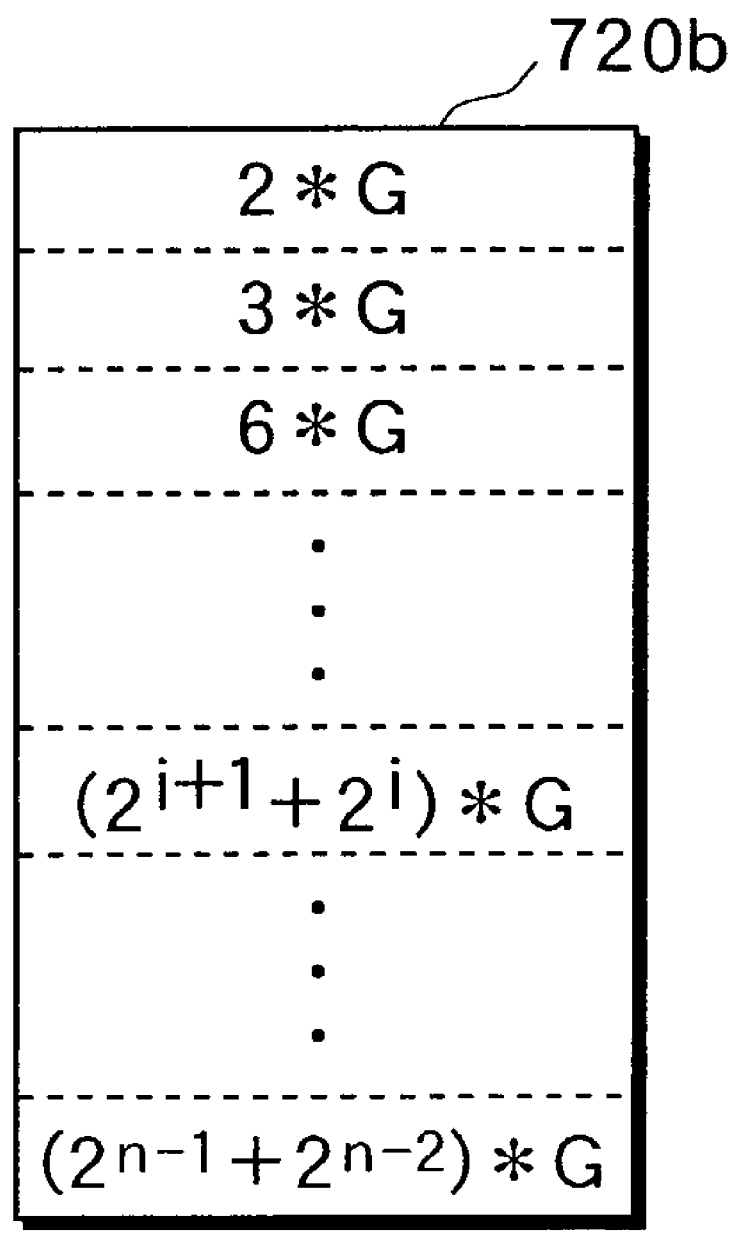
FIG. 29 is a diagram that shows stored data of a table memorizing unit of the elliptic curve calculation device.

The table memorizing unit 720b is a ROM and so forth that memorize in advance the x coordinates and y coordinates of the points of a certain multiple against n pieces of the points G, namely, the x coordinates and y coordinates of 2*G and $(2^{i+1}+2^i)*G$ (here, i=0, 1, 2, ..., n−2) as FIG. 29 shows.

The Y coordinate calculation unit 720e calculates (reconstructs) the y coordinates of the scalar-multiplied points k*G that are sought finally after the elliptic curve addition unit 620d performs the last elliptic curve addition by repeating the scalar multiplication that is similar to the fifth embodiment, complying with the equation of calculating y coordinates and using the coordinates of the elements in the last elliptic curve addition (points P, $P_1$ and $P_2$ in the case of $P_1+P_2 \to P$; here the point $P_2$ is the point stored in the table memorizing unit 720b). To be more specific, the y coordinate of the point P is calculated using the x and z coordinates of points P and $P_1$ and the x and y coordinates of the point $P_2$ and complying with the equation of calculating the y coordinate.

Figure 30:
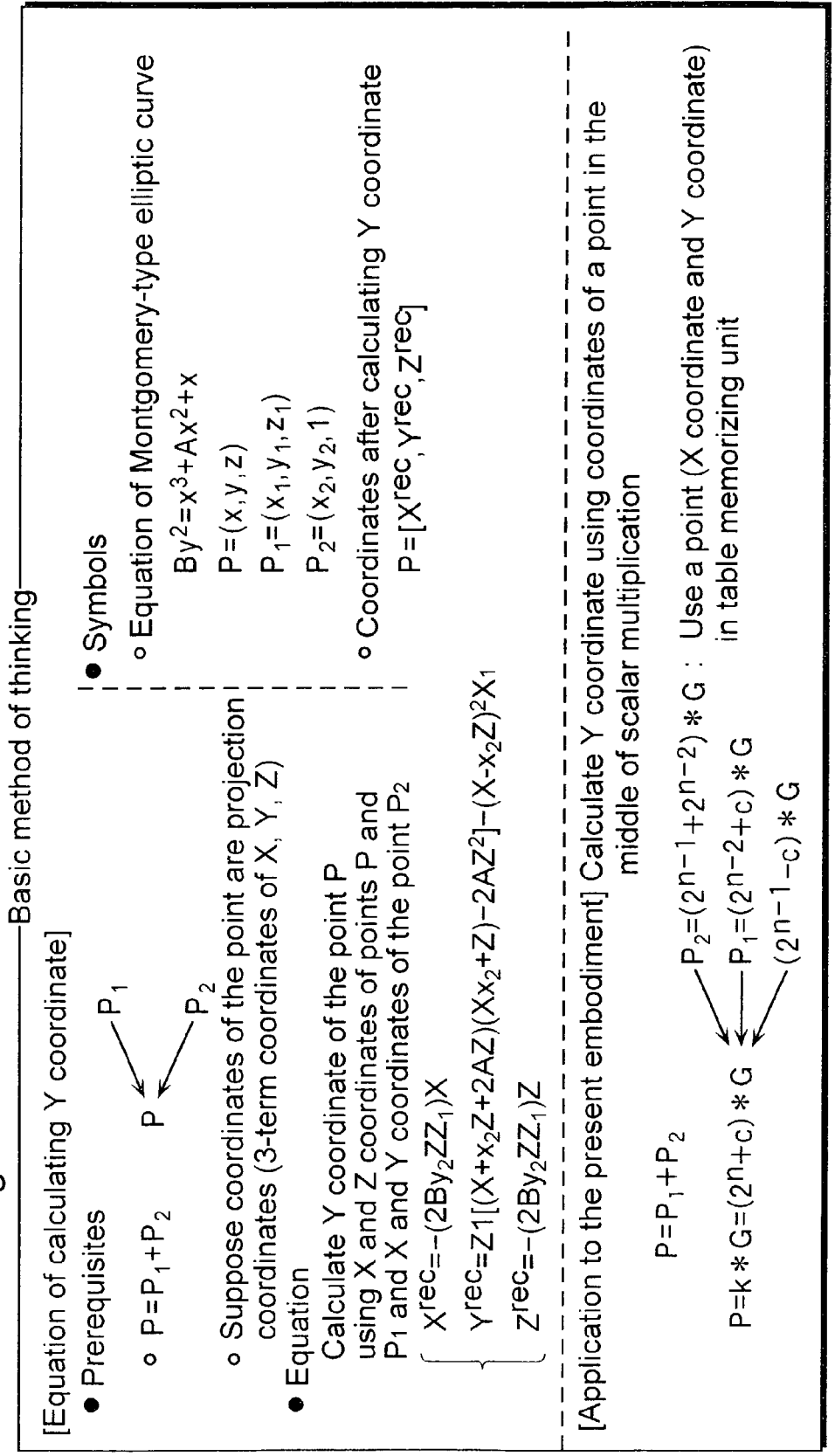
FIG. 30 is a diagram that explains a basic approach of calculating y coordinate by a Y coordinate calculation unit of the elliptic curve calculation device.

FIG. 30 is a diagram that explains the basic approach to calculating the y coordinate by the Y coordinate calculation unit 720e.

In the upper part of FIG. 30 [Equation of calculating Y coordinate], its premises, its symbols and its formulae are shown. Now, seek the final scalar-multiplied point P (X, Y, Z) by the elliptic curve addition of the point $P_1$ ($X_1$, $Y_1$, $Z_1$) to the point $P_2$ ($x_2$, $y_2$, 1) on the Montgomery-type elliptic curve: $Bxy^2=x^3+Axx^2+x$. Here, the coordinates of each point are represented by projection coordinates (a group of three terms, X, Y, Z). Additionally, the point $P_2$ is the point whose x coordinate and y coordinate are stored in the table memorizing unit 720b in advance.

At this point, suppose the coordinates of the point P after calculating y coordinate are ($X_{rec}$, $Y_{rec}$, $Z_{rec}$), these coordinates are represented by the equations below.

$X_{rec}=-(2 \times B \times y_2 \times Z \times Z_1) \times X$ $Y_{rec}=Z_1 \times [(X+x_2 \times Z+2 \times A \times Z) \times (X \times x_2+Z)-2 \times A \times Z^2]-(X-x_2 \times Z)^2$ $\times X_1$ $Z_{rec}=-(2 \times B \times y_2 \times Z \times Z_1) \times Z$ In other words, the coordinates required to calculate the Y coordinate of the point P are the X coordinates and the Z coordinates of the points P and $P_1$ and the X coordinate the Y coordinate of the point $P_2$.

In the lower part of FIG. 30 [Application to the present embodiment], processing procedures of Y coordinate calculation unit 720e using the above-mentioned [Equation of calculating Y coordinate] are indicated. In other words, to calculate the final point P=k*G=($2^n$+c)*G, the elliptic curve addition unit 620d performs an elliptic curve addition using the point $P_2=(2^{n-1}+2^{n-2})*P$ and the point $P_1=(2^{n-1}+c)*P$ and their difference $(2^{n-1}-c)*P$, and immediately after that, the Y coordinate calculation unit 720e calculates the Y coordinate using the X coordinates and the Z coordinates of the points P and $P_1$ and the X coordinates and the Y coordinates of the point $P_2$ and complying with the above-mentioned equation of calculating Y coordinate.

Figure 26:
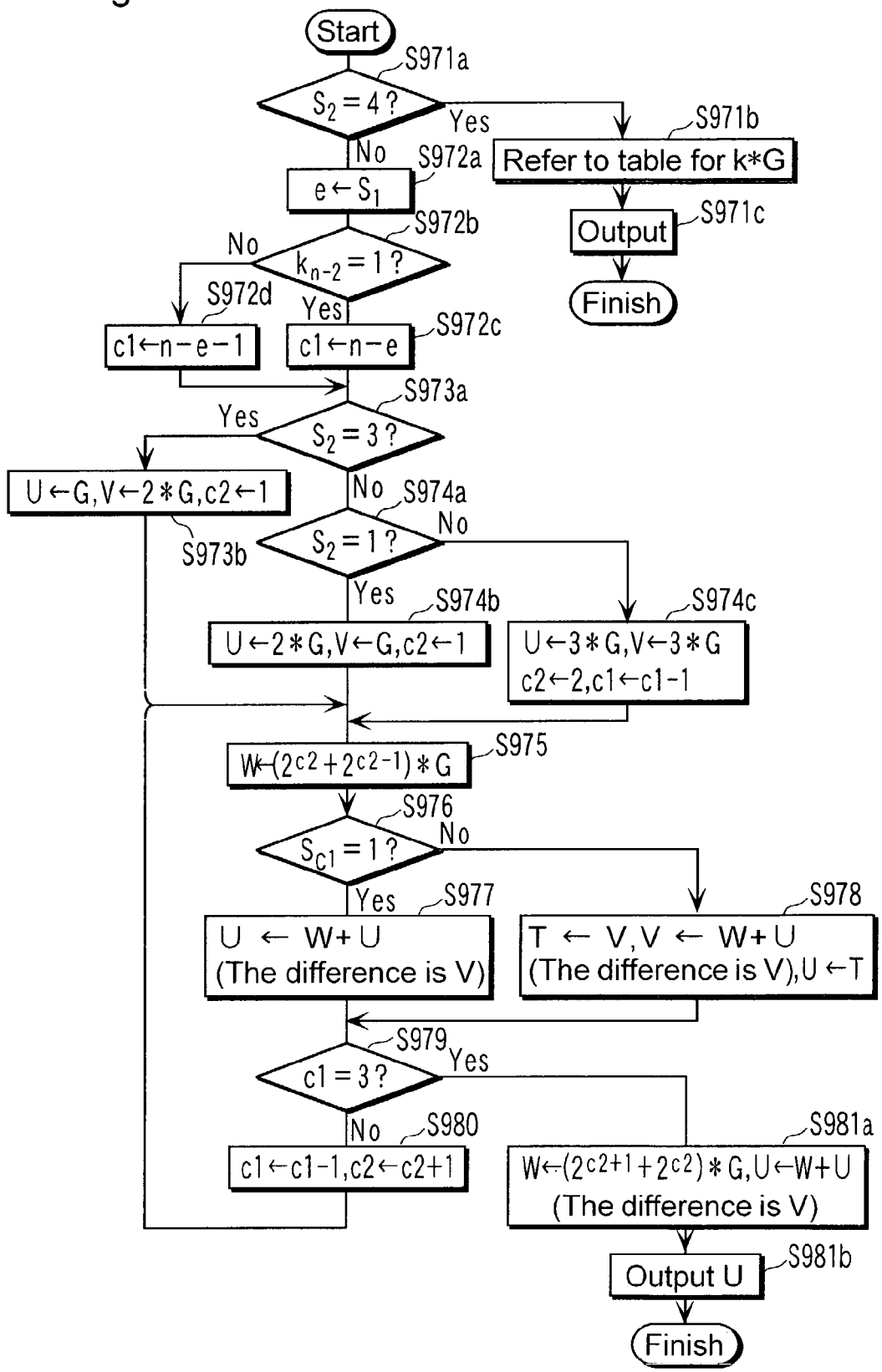
FIG. 26 is a flowchart that shows the operations of a scalar multiplication unit of the elliptic curve calculation device.
Figure 31:
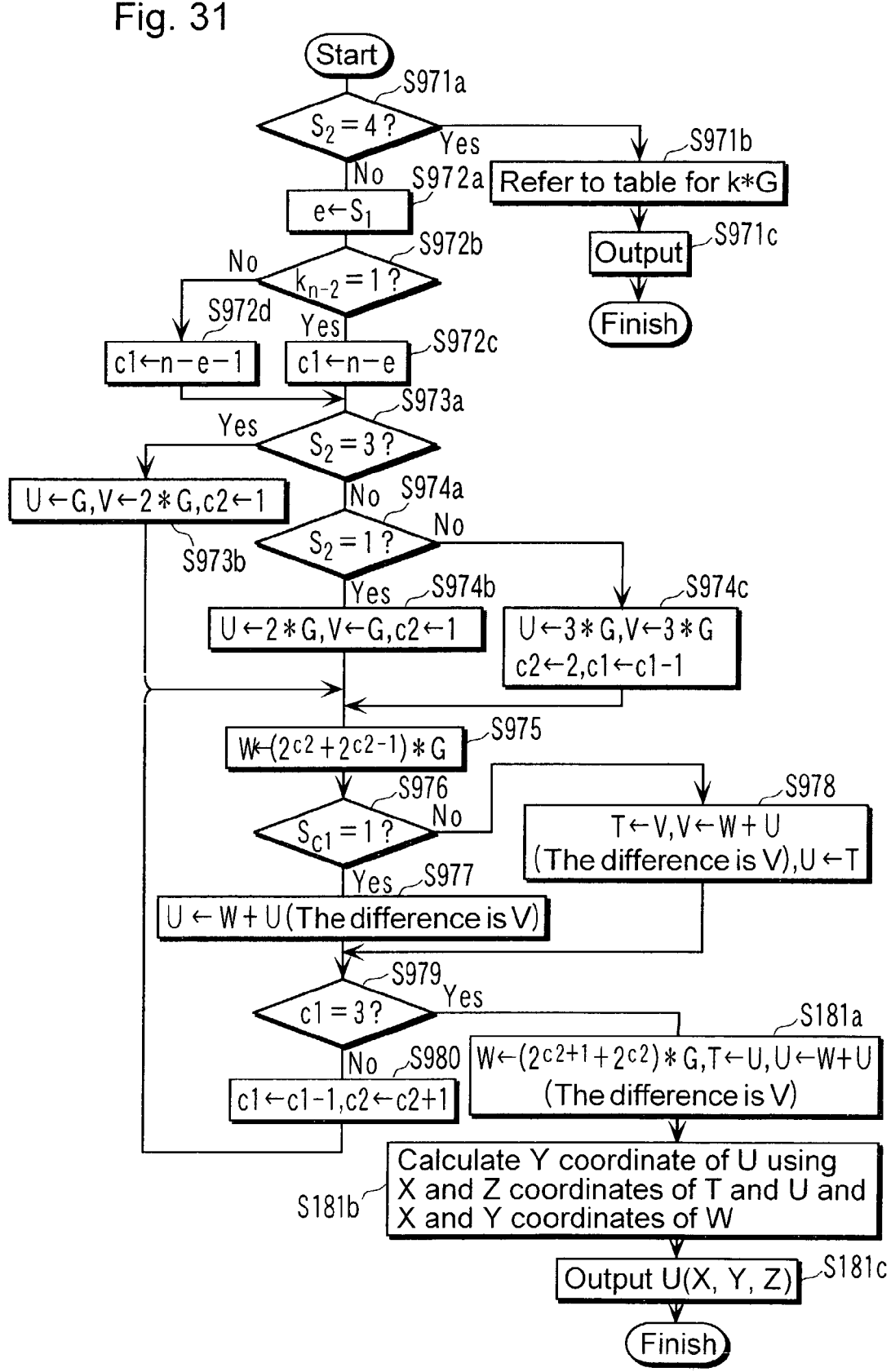
FIG. 31 is a flowchart that shows the operations of a scalar multiplication unit of the elliptic curve calculation device.

FIG. 31 is a flowchart that shows operations of the scalar multiplication unit 720 and corresponds to the flowchart of the scalar multiplication unit 620 of the fifth embodiment (FIG. 26). The different points from the flowchart of FIG. 26 are the last elliptic curve addition (S181a) and the Y coordinate calculation (S181b).

Under the control of the calculation control unit 620a, the elliptic curve addition unit 620d performs the final elliptic curve addition (S181a). In other words, the elliptic curve addition unit 620d, referring to the table memorizing unit 720b, substitutes the point $(2^{c2}+1+2^{c2})*G$ into the value W, substitutes the value U calculated by an elliptic curve addition performed immediately before into the value T and, after that, performs an elliptic curve addition of these values W and U (the difference is V), and substitutes the obtained result into the value U (S181a).

Then, finally, the Y coordinate calculation unit 720e calculates the Y coordinate of the value U using the X coordinates and the Z coordinates of the above-mentioned values T and U and the X coordinate and the Y coordinate of the above-mentioned value W (the coordinates stored in the table memorizing unit 720b) and complying with the above-mentioned equation of calculating Y coordinate (S181b), and outputs the obtained value U (X, Y and Z coordinates (S181c).

As is described above, the scalar multiplication unit 620, as for the repetition of the scalar multiplication (the elliptic curve addition) against the point G (S971a~S181a), repeats the calculation of the x coordinate (the x coordinate and the z coordinate in the 3-term projection coordinates) of the point G, similarly to the embodiments 1~5, and in calculating the Y coordinate immediately after performing the elliptic curve addition to obtain the final point k*G (S181b), and calculates the Y coordinate of the point k*G using the X coordinates and Z coordinates of each of the point k*G (U) and the second addition element (U) that is used to calculate the point k*G and X and Y coordinates of the first addition element (W; the point stored in the table memorizing unit 720b) that is used to calculate the point k* G.

Figure 32:
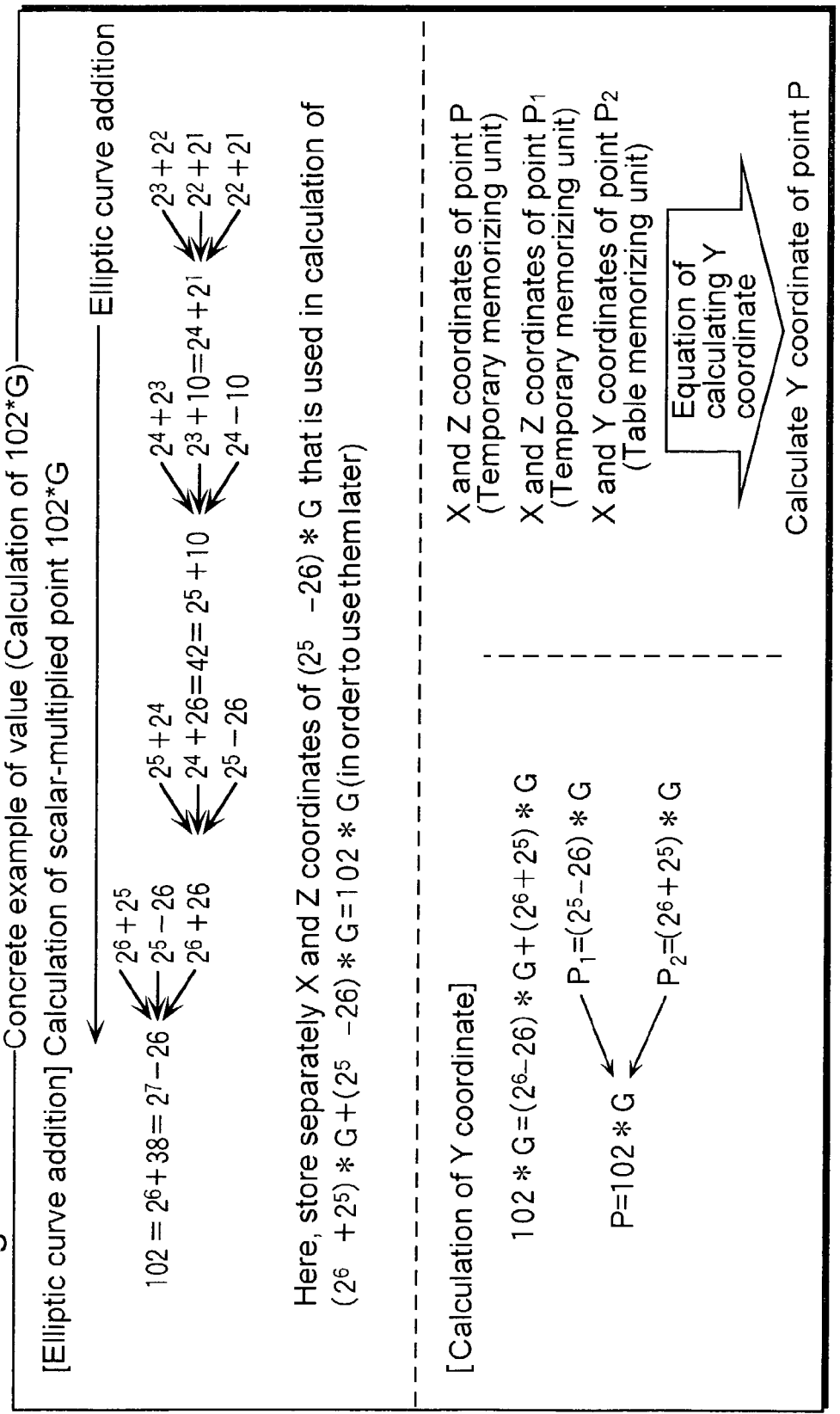
FIG. 32 is a diagram that shows processing of a concrete example of a value by the elliptic curve calculation device.

2. Operations of the Elliptic Curve Calculation Device 700 to a Concrete Example of Value Hereafter, the value example in the case of k=102 shown in FIG. 32 is indicated. Moreover, since the processing of the calculation procedure unit 710 is similar to the processing of the fifth embodiment (the upper part of FIG. 27), its graphic representation is omitted in FIG. 32.

The upper part of FIG. 32 [Elliptic curve addition] indicates the calculation example by the scalar multiplication unit 720. In other words, by repeating the elliptic curve addition from the lower digits to the higher digits, the repetition of calculation of the scalar-multiplied points (the x coordinates and the z coordinates) against the point G is indicated. The calculation procedures are similar to the case of the fifth embodiment (the lower part of FIG. 27). Moreover, the x coordinate and the z coordinate of $(2^5-26)*G$ that is used when 102*G is calculated by the elliptic curve addition of $(2^6+25)*G$ to $(2^5-26)*G$ are stored in the temporary memorizing unit 620c to be used in the next Y coordinate calculation.

In the lower part of FIG. 32 [Y coordinate calculation], the Y coordinate calculation by Y coordinate calculation unit 720e immediately after the final elliptic curve addition is performed is indicated. In other words, Y coordinate calculation unit 720e calculates the y coordinate of 102*G from the x coordinates and z coordinates of 102*G and $(2^5-26)*G$ and the x coordinate and y coordinate of $(2^6+25)$ complying with the above-mentioned equation of calculating Y coordinates.

The scalar multiplication unit 720 outputs 102*G (x, y and z coordinates) obtained by this means.

3. The Effects of the Sixth Embodiment

The elliptic curve calculation device 700 of the sixth embodiment calculates not only the x coordinates (the x coordinates and the z coordinates in the 3-term projection coordinate) of the scalar-multiplied points k*G against the point G that is obtained finally but also the y coordinates of k*G. The calculation added to calculate the y coordinate is only the calculation to calculate the Y coordinate immediately after the final elliptic curve addition.

Consequently, with the elliptic curve calculation device 700 of the sixth embodiment, by adding a minimal quantity of calculation, the effect that the elliptic curve calculation device 700 is applicable to the encryption system that requires the y coordinates of the scalar-multiplied points is realized, added to the effects of the fifth embodiment.

Moreover, the elliptic curve calculation device 700 of the sixth embodiment is what the function to calculate the Y coordinate is added to the elliptic curve calculation device 600 of the fifth embodiment, but the present invention is not limited to such a combination. In other words, it is acceptable that the function to calculate the Y coordinates (the function to have the table memorizing unit memorize not only the x coordinates but also y coordinates and to perform the calculation to calculate the Y coordinates) of the sixth embodiment is added to either of the elliptic curve calculation devices of the embodiments 1~4. In doing this, any of the elliptic curve calculation devices of the embodiments 1~5 can generate the x coordinates and the y coordinates of the scalar-multiplied points and the application range of these elliptic curve calculation devices expand.

The elliptic curve calculation devices of the above-mentioned embodiments, for example, can perform a high-speed scalar multiplication of the base point G that is a system parameter of the public-key encryption using an elliptic curve and effective as a calculation engine for the secret communication using the public-key encryption and the digital signature. The elliptic curve calculation device like this is realized as a program executed by a general-purpose computer or as an IC like LSI and so forth.

Figure 33:
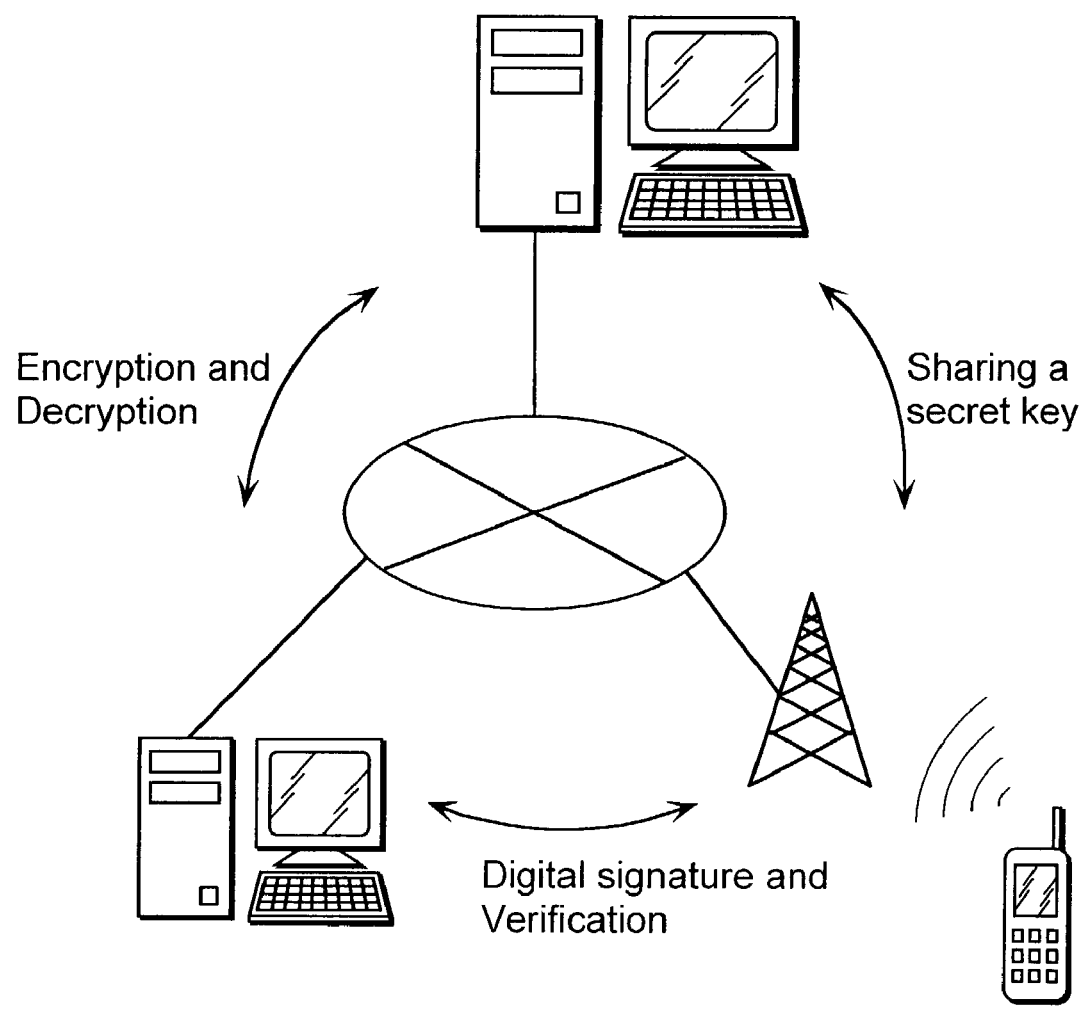
FIG. 33 is a diagram that shows an application example of the elliptic curve calculation device according to the present invention.

In other words, as FIG. 33 indicates, by equipping communication devices like a personal computer, a cellular phone and so forth with the elliptic curve calculation device of the present embodiment and an encryption-decryption device that executes the encryption, the decryption, the digital signature, the digital signature verification or key sharing based on the scalar multiplication by the elliptic curve calculation, the concealment and so forth of the electronic payment, the electronic signature and the electronic mail by the communication network like the Internet and so forth or of the communication data by a cellular phone and so forth can be realized.

As is apparent by the above-mentioned explanation, the elliptic curve calculation device according to the present invention performs the scalar multiplication that satisfies the following conditions.

(1) The calculation on the Montgomery-type elliptic curve that can perform the elliptic curve calculation (addition/double calculation) faster than the Weierstrass-type elliptic curve is performed.

(2) In the scalar multiplication of the base point G that is a system parameter in the elliptic curve encryption, the table that stores either of the values of the points multiplied by a certain coefficient against the point G, namely, the exponentiation of two against the point G, $2^i*G$ or the values of sum of the two consecutive exponentiation of two, $(2^{n-1}+2^{n-2})*G$, is effectively used.

(3) By being equipped with the function to calculate Y coordinate, not only the x coordinates (the x coordinates and the z coordinates in the 3-term projection coordinates) of the scalar-multiplied points, k*G but also the y coordinates can be calculated.

As is explained above, the elliptic curve calculation device according to the present invention can perform the high-speed elliptic curve calculation, can be applied to the encryption system that requires the y coordinates, and can be used widely as a calculation engine in the processing of secret communication, digital signature, sharing the secret key and so forth. Especially, the present invention can significantly increase the speed of the encryption-decryption processing that is required to conceal the electronic payment and the electronic signature using the Internet and the electronic mail and the conversation by the communication devices such as a computer, a cellular phone and so forth. Nowadays the digital communication is widely spread; and the practical value of the present invention is extremely high.

What is claimed is:

1. A device for securing data, the device comprising:
an elliptic curve calculation unit for receiving an arbitrary integer K of n bits and outputting scalar-multiplied points k*G on a Montgomery-type elliptic curve E of $B \times y^2 = x^3 + A \times x^2 + x$ on a finite field F, where G is a predetermined point on the Montgomery-type elliptic curve E, wherein
the elliptic curve calculation unit includes:
a calculation procedure generation unit for expanding the scalar-multiplied points k*G to an addition formula by dividing the scalar-multiplied points k*G into a sum of a first addition element and a second addition element and further repeatedly dividing the second addition element into a first addition element and a second addition element, and for generating a calculation procedure of repeating addition on the Montgomery-type elliptical curve E according to the expanded addition formula, the first addition element being any one of G, 2*G, $2^2$*G, ..., $2^{n-1}$*G, and the second addition element being different from the first addition element, wherein the calculation procedure is an array indicating a sequence in which all addition elements obtained by the dividing are to be added, the array including array elements corresponding in number to the number of the divisions, each of the array elements including information identifying a corresponding addition obtained by the dividing; and a scalar multiplication unit for calculating the scalar-multiplied points k*G according to the calculation procedure generated by the calculation procedure generation unit, the scalar multiplication unit has a table memorizing unit for memorizing at least part of the first addition element, and for performing addition on the Montgomery-type elliptic curve E with a point memorized in the table memorizing unit as the first addition element, and the point memorized in the table memorizing unit is any point of an x-coordinate or any point of the x-coordinate and a z-coordinate; and a utilization unit for executing at least one of encrypting the data, decrypting the data, generating a digital signature for the data, performing digital signature verification for the data, and performing a key sharing for the data, based on the scalar-multiplied points k*G outputted by the elliptic curve calculation unit, and outputting a result of the execution.

2. The device according to claim 1, wherein the addition is a first calculation that calculates $(2^m+u)$*G from $(2^{m-1}+u)$*G, $2^{m-1}$*G and u*G, a second calculation that calculates $(2^{m+1}-u)$*G from 2*G, $(2^m-u)$*G and u*G or a third calculation that calculates u*G from $2^m$*G, $-(2^m-u)$*G and $(2^{m+1}-u)$*G where m and u are natural numbers.

3. The device according to claim 2, wherein, the calculation procedure generation unit generates the calculation procedure by associating the addition on the Montgomery-type elliptic curve E with at least one of the first, second and third calculations in accordance with values of each bit of the k.

4. The device according to claim 3, wherein the calculation procedure generation unit generates the calculation procedure, when a value of a bit of k is 0, by associating the addition that corresponds to the bit to at least the first calculation and when a value of a bit of k is 1, by associating the addition that corresponds to the bit to at least the second calculation.

5. The device according to claim 2, wherein the calculation procedure generation unit generates, as the calculation procedure, representation mode information that identifies, for each addition in repeating addition on the Montgomery-type elliptic curve E, whether a second addition element added to the first addition element is expressed in plus representation $(2^{m-1}+u)$*G in the first calculation or minus representation $(2^m-u)$*G in the second calculation, and wherein the scalar multiplication unit calculates the first, second or third calculations based on the representation mode information for each addition in the repeating addition on the Montgomery-type elliptic curve E.

6. The device according to claim 5, wherein the representation mode information indicates one of four expression change patterns of the second addition element:
a) from plus representation to plus representation,
b) from plus representation to minus representation,
c) from minus representation to minus representation, or
d) from minus representation to plus representation.

7. The device according to claim 5, wherein the representation mode information indicates a number in which the second addition element appears in succession in any representation mode of the plus representation or the minus representation in the repeating addition on the Montgomery-type elliptic curve E.

8. A device for securing data, the device comprising:

an elliptic curve calculation unit for receiving an arbitrary integer k of n bits and outputting scalar-multiplied points k*G on a Montgomery-type elliptic curve E of B×y=$x^3$+A×$x^2$+x on a finite field F, where G is a predetermined point on the Montgomery-type elliptic curve E, wherein the elliptic curve calculation unit includes:

a calculation procedure generation unit for expanding the scalar-multiplied points k*G to an addition formula by dividing the scalar-multiplied points k*G into a sum of a first addition element and a second addition element and further repeatedly dividing the second addition element into a first addition element and a second addition element, and generating a calculation procedure of repeating addition on the Montgomery-type elliptical curve E according to the expanded addition formula, the first addition element being any of 2*G, 3*G, 6*G, 12*G, ..., $(2^{n-1}+2^{n-2})$*G, and the second addition element being different from the first addition element, wherein the calculation procedure is an array indicating a sequence in which all addition elements obtained by the dividing are to be added, the array including array elements corresponding in number to the number of the divisions, each of the array elements including information identifying a corresponding addition obtained by the dividing; and a scalar multiplication unit for calculating the scalar-multiplied points k*G according to the calculation procedure generated by the calculation procedure generation unit, the scalar multiplication unit has a table memorizing unit for memorizing at least part of the first addition element, and for performing addition on the Montgomery-type elliptic curve E with a point memorized in the table memorizing unit as the first addition element, and the point memorized in the table memorizing unit is any point of an x-coordinate or any point of the x-coordinate and a z-coordinate; and a utilization unit for executing at least one of encrypting the data, decrypting the data, generating a digital signature for the data, performing digital signature verification for the data, and performing a key sharing for the data, based on the scalar-multiplied points k*G outputted by the elliptic curve calculation unit, and outputting a result of the execution.

9. The device according to claim 8, wherein the addition is a first calculation that calculates $(2^m+u)$*G from a first addition element $(2^{m-1}+2^{m-2})$*G, a second addition element $(2^{m-2}+u)$*G and a difference between the first addition element and the second addition element $(2^{m-1}-u)$ or a second calculation that calculates $(2^{m+1}-u)$*G from a first addition element $(2^m+$ $2^{m-1})*G$, a second addition element $(2^{m-1}-u)*G$ and a difference between the first addition element and the second addition element $(2^m+u)$, where m and u are natural numbers.

10. The device according to claim 9,
wherein the calculation procedure generation unit generates, as the calculation procedure, division object information that indicates whether a result obtained by addition on the Montgomery-type elliptic curve E by the first or second calculation should be a second addition element or a difference between a first addition element and a second addition element in the next repeating addition.

11. The device according to claim 10,
wherein the calculation procedure generation unit generates the calculation procedure including information about a value k' and a value e if k is represented by k'×2$^e$ as initial information.

12. The device according to claim 11,
wherein the calculation procedure generation unit generates the initial information including information that indicates that k' is any of 1, 3 or another value.

13. The device according to claim 1, further comprising:
a Y coordinate calculation unit for calculating y coordinates of the scalar-multiplied points k*G.

14. The device according to claim 13,
wherein the scalar multiplication unit calculates x and z coordinates of the scalar-multiplied points k*G by repeating the addition on the Montgomery-type elliptic curve E that uses the x coordinate of the first addition element using a three-term projection coordinate (x, y, z), and
wherein the Y coordinate calculation unit calculates the y coordinates of the scalar-multiplied points k*G from the x and z coordinates of the scalar-multiplied points k*G the x and z coordinates of a second addition element added to the first addition element that is used to calculate the scalar-multiplied points k*G and the x and y coordinates of the first addition element, using the 3-term projection coordinate (x, y, z).

15. The device according to claim 8, further comprising:
a Y coordinate calculation unit for calculating y coordinates of the scalar-multiplied points k*G,
wherein the scalar multiplication unit calculates x and z coordinates of the scalar-multiplied points k*G by repeating the addition on the Montgomery-type elliptic curve E that uses the x coordinate of the first addition element using a three-term projection coordinate (x, y, z), and
wherein the Y coordinate calculation unit calculates the y coordinates of the scalar-multiplied points k*G from the x and z coordinates of the scalar-multiplied points k*G, the x and z coordinates of a second addition element added to the first addition element that is used to calculate the scalar-multiplied points k*G and the x and y coordinates of the first addition element, using the 3-term projection coordinate (x, y, z).

16. A device for securing data, the device comprising:
an elliptic curve calculation unit for receiving an arbitrary integer k of n bits and outputting scalar-multiplied points k*G on a Montgomery-type elliptic curve E of $B \times y^2 = x^3 + A \times x^2 + x$ on a finite field F, where G is a predetermined point on the Montgomery-type elliptic curve E, wherein
the elliptic curve calculation unit includes:
a calculation procedure generation unit for expanding the scalar-multiplied points k*G to an addition formula by dividing the scalar-multiplied points k*G into a sum of a first addition element and a second addition element and further repeatedly dividing the second addition element into a first addition element and a second addition element, and generating a calculation procedure of repeating addition on the Montgomery-type elliptical curve E according to the expanded addition formula, the first addition element being any one of G, 2*G, 2$^2$*G, . . . , 2$^{n-1}$*G, and the second addition element being different from the first addition element, wherein the calculation procedure is an array indicating a sequence in which all addition elements obtained by the dividing are to be added, the array including array elements corresponding in number to the number of the divisions each of the array elements including information identifying a corresponding addition obtained by the dividing; and
a scalar multiplication unit for calculating the scalar-multiplied points k*G according to the calculation procedure generated by the calculation procedure generation unit,
a scalar-multiplied point of the point G is added as a first addition element at the addition, and a scalar coefficient of the first addition element is one of m ($\leq$n) kinds of scalars,
the elliptic curve calculation unit has a table memorizing unit for memorizing at least part of the first addition element, and for performing addition on the Montgomery-type elliptic curve E with a point memorized in the table memorizing unit as the first addition element, and
the point memorized in the table memorizing unit is any point of an x-coordinate or any point of the x-coordinate and a z-coordinate; and
a utilization unit for executing at least one of encrypting the data, decrypting the data, generating a digital signature for the data, performing a digital signature verification for the data, and performing a key sharing for the data, based on the scalar-multiplied points k*G outputted by the elliptic curve calculation unit, and outputting a result of the execution.

17. A method for securing data, the method comprising:
an elliptic curve calculation step for receiving an arbitrary integer k of n bits and outputting scalar-multiplied points k*G on a Montgomery-type elliptic curve E of $B \times y^2 = x^3 + A \times x^2 + x$ on a finite field F, where G is a predetermined point on the elliptic curve, wherein
the elliptic curve calculation step includes:
a calculation procedure generation step of: expanding the scalar-multiplied points k*G to an addition formula by dividing the scalar-multiplied points k*G into a sum of a first addition element and a second addition element and further repeatedly dividing the second addition element into a first addition element and a second addition element; and generating a calculation procedure of repeating addition on the Montgomery-type elliptical curve E according to the expanded addition formula, the first addition element being any one of G, 2*G, 2$^2$*G, . . . , 2$^{n-1}$*G, and the second addition element being different from the first addition element, wherein the calculation procedure is an array indicating a sequence in which all addition elements obtained by the dividing are to be added the array including, array elements corresponding in number to the number of the divisions, each of the array elements including information identifying a corresponding addition obtained by the dividing; and a scalar multiplication step of calculating the scalar-multiplied points k*G according to the calculation procedure generated in the calculation procedure generation step, the scalar multiplication step comprises a table memorizing step of memorizing at least part of the first addition element into a table memorizing unit, and performing addition on the Montgomery-type elliptic curve E with a point memorized in the table memorizing unit as the first addition element, and the point memorized in the table memorizing operation is any point of an x-coordinate or any point of the x-coordinate and a z-coordinate; and a utilization step of executing at least one of encrypting the data, decrypting the data, generating a digital signature for the data, performing a digital signature verification for the data, and performing a key sharing of the data, based on the scalar-multiplied points k*G outputted by the elliptic curve calculation step, and outputting a result of the execution.

18. The method according to claim 17, further comprising:
a Y coordinate calculation step of calculating y coordinates of the scalar-multiplied points k*G.

19. A program recorded on a device readable medium for a device for securing data, the program comprising:

an elliptic curve calculation step for receiving an arbitrary integer k of n bits and outputting scalar-multiplied points k*G on a Montgomery-type elliptic curve E of $B \times y^2 = x^3 + A \times x^2 + x$ on a finite field F, where G is a predetermined point on the elliptic curve, wherein the elliptic curve calculation step includes:

a calculation procedure generation step of: expanding the scalar-multiplied points k*G to an addition formula by dividing the scalar-multiplied points k*G into a sum of a first addition element and a second addition element and further repeatedly dividing the second addition element into a first addition element and a second addition element; and generating a calculation procedure of repeating addition on the Montgomery-type elliptical curve E according to the expanded addition formula, the first addition element being any one of $G, 2*G, 2^2*G, \ldots, 2^{n-1}*G$, and the second addition element being different from the first addition element, wherein the calculation procedure is an array indicating a sequence in which all addition elements obtained by the dividing are to be added, the array including array elements corresponding in number to the number of the divisions, each of the array elements including information identifying a corresponding addition obtained by the dividing; and a scalar multiplication step of calculating the scalar-multiplied points k*G according to the calculation procedure generated in the calculation procedure generation step, the scalar multiplication step comprises a table memorizing step of memorizing at least part of the first addition element into a table memorizing unit, and performing addition on the Montgomery-type elliptic curve E with a point memorized in the table memorizing unit as the first addition element, and the point memorized in the table memorizing operation is any point of an x-coordinate or any point of the x-coordinate and a z-coordinate; and a utilization step of executing at least one of encrypting the data, decrypting the data, generating a digital signature for the data, performing a digital signature verification for the data, and performing a key sharing for the data, based on the scalar-multiplied points k*G outputted by the elliptic curve calculation step, and outputting a result of the execution.

20. The program according to claim 19, further comprising:
a Y coordinate calculation step of calculating y coordinates of the scalar-multiplied points k*G.

* * * * *

UNITED STATES PATENT AND TRADEMARK OFFICE
CERTIFICATE OF CORRECTION

PATENT NO. : 7,486,789 B2
APPLICATION NO. : 10/314316
DATED : February 3, 2009
INVENTOR(S) : Yuichi Futa et al.

It is certified that error appears in the above-identified patent and that said Letters Patent is hereby corrected as shown below:

In claim 2, column 43, line 36, please change "$(2^{m+1}-u)*G$ from $2*G$," to --$(2^{m+1}-u)*G$ from $2^m*G$,--.

In claim 8, column 44, lines 18 and 19, please change "$B \times y = x^3 + A \times x^2 + x$" to --$B \times y^2 = x^3 + A \times x^2 + x$--.

Signed and Sealed this

Twenty-fourth Day of November, 2009

David J. Kappos
*Director of the United States Patent and Trademark Office*